(12) United States Patent
Broder et al.

(10) Patent No.: US 8,280,903 B2
(45) Date of Patent: *Oct. 2, 2012

(54) SYSTEM, METHOD AND COMPUTER PROGRAM PRODUCT FOR PERFORMING UNSTRUCTURED INFORMATION MANAGEMENT AND AUTOMATIC TEXT ANALYSIS, INCLUDING A SEARCH OPERATOR FUNCTIONING AS A WEIGHTED AND (WAND)

(75) Inventors: Andrei Z Broder, New York, NY (US); David Carmel, Haifa (IL); Michael Herscovici, Haifa (IL); Aya Soffer, Haifa (IL); Jason Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 802 days.

This patent is subject to a terminal disclaimer.

(21) Appl. No.: 12/138,857

(22) Filed: Jun. 13, 2008

(65) Prior Publication Data
US 2009/0222441 A1 Sep. 3, 2009

Related U.S. Application Data

(63) Continuation of application No. 11/607,080, filed on Nov. 30, 2006, now Pat. No. 7,512,602.

(51) Int. Cl.
*G06F 17/30* (2006.01)
(52) U.S. Cl. ........................................ 707/769; 707/748
(58) Field of Classification Search .................. 707/706, 707/723, 726–730, 735, 737, 739, 748–750, 707/754, 758, 769, 771, 779, 802, 999.004, 707/999.005, 999.101
See application file for complete search history.

(56) References Cited

U.S. PATENT DOCUMENTS

| | | | |
|---|---|---|---|
| 5,297,039 A | 3/1994 | Kanaegami et al. | 707/5 |
| 5,715,445 A | 2/1998 | Wolfe | 707/5 |
| 5,778,378 A | 7/1998 | Rubin | 707/103 R |

(Continued)

FOREIGN PATENT DOCUMENTS

JP 62-070974 4/1987

(Continued)

OTHER PUBLICATIONS

Pathak et al., Effective Information Retrieval Using Genetic Algorithms Based Matching Functions Adaptation, System Science, 2000. Proceedings of the 33rd Annual Hawaii Inter. Conference on, Jan. 4-7, 2000, pp. 1-8 vol. 1.*

(Continued)

*Primary Examiner* — Greta Robinson
(74) *Attorney, Agent, or Firm* — Harrington & Smith

(57) ABSTRACT

Disclosed is a system architecture, components and a searching technique for an Unstructured Information Management System (UIMS). The UIMS may be provided as middleware for the effective management and interchange of unstructured information over a wide array of information sources. The architecture generally includes a search engine, data storage, analysis engines containing pipelined document annotators and various adapters. The searching technique makes use of a two-level searching technique. A search query includes a search operator containing of a plurality of search sub-expressions each having an associated weight value. The search engine returns a document or documents having a weight value sum that exceeds a threshold weight value sum. The search operator is implemented as a Boolean predicate that functions as a Weighted AND (WAND).

15 Claims, 33 Drawing Sheets

U.S. PATENT DOCUMENTS

| | | | | |
|---|---|---|---|---|
| 5,970,490 | A | 10/1999 | Morgenstern | 707/10 |
| 5,983,267 | A | 11/1999 | Shklar et al. | 709/217 |
| 6,081,774 | A | 6/2000 | De Hita et al. | 704/9 |
| 6,105,023 | A | 8/2000 | Callan | 707/5 |
| 6,173,208 | B1 | 1/2001 | Park et al. | 700/83 |
| 6,236,987 | B1 | 5/2001 | Horowitz et al. | 707/3 |
| 6,326,962 | B1 * | 12/2001 | Szabo | 715/762 |
| 6,424,975 | B1 | 7/2002 | Walter et al. | 707/200 |
| 6,470,306 | B1 | 10/2002 | Pringle et al. | 704/3 |
| 6,507,846 | B1 | 1/2003 | Consens | 707/100 |
| 6,523,028 | B1 | 2/2003 | DiDomizio et al. | 707/5 |
| 6,542,889 | B1 | 4/2003 | Aggarwal et al. | 707/5 |
| 6,553,385 | B2 | 4/2003 | Johnson et al. | 707/104.1 |
| 6,574,657 | B1 | 6/2003 | Dickinson | 709/203 |
| 6,621,930 | B1 | 9/2003 | Smadja | 382/224 |
| 6,643,650 | B1 | 11/2003 | Slaughter et al. | 707/10 |
| 6,697,798 | B2 | 2/2004 | Nakamura et al. | 707/3 |
| 6,718,323 | B2 | 4/2004 | Davies et al. | 707/5 |
| 6,738,759 | B1 | 5/2004 | Wheeler et al. | 707/3 |
| 6,763,354 | B2 | 7/2004 | Hosken | 707/6 |
| 6,772,141 | B1 | 8/2004 | Pratt et al. | 707/3 |
| 6,826,566 | B2 * | 11/2004 | Lewak et al. | 1/1 |
| 6,847,966 | B1 | 1/2005 | Sommer et al. | 707/5 |
| 6,910,029 | B1 | 6/2005 | Sundaresan | 707/2 |
| 6,968,338 | B1 | 11/2005 | Gawdiak et al. | 707/100 |
| 7,146,361 | B2 * | 12/2006 | Broder et al. | 707/769 |
| 2002/0062302 | A1 | 5/2002 | Costa | 707/1 |
| 2002/0091671 | A1 | 7/2002 | Prokoph | 707/1 |
| 2002/0184401 | A1 | 12/2002 | Kadel et al. | 709/315 |
| 2004/0024756 | A1 | 2/2004 | Rickard | 707/3 |
| 2004/0049505 | A1 | 3/2004 | Pennock | 707/5 |
| 2004/0181746 | A1 | 9/2004 | McLure et al. | 715/500 |
| 2004/0194009 | A1 | 9/2004 | LaComb et al. | 715/500 |
| 2004/0243556 | A1 | 12/2004 | Ferrucci et al. | 707/3 |
| 2005/0004897 | A1 | 1/2005 | Lipson et al. | 707/3 |
| 2005/0033733 | A1 | 2/2005 | Shadmon et al. | 707/2 |
| 2005/0165600 | A1 | 7/2005 | Kasravi et al. | 704/9 |
| 2005/0246402 | A1 * | 11/2005 | Wu et al. | 707/205 |

FOREIGN PATENT DOCUMENTS

| | | |
|---|---|---|
| JP | 06-068153 | 3/1994 |
| JP | 11-175535 | 7/1999 |
| JP | 11-232303 | 8/1999 |

OTHER PUBLICATIONS

Hamish Cunningham et al., "Uniform Language Resource Access and Distribution in the Context of GATE—a General Architecture for Text Engineering", University of Sheffield, Dept. of Computer Science, Sheffield, UK, 11 pages.

Pathak et al., "Effective Information Retrieval Using Genetic Algorithms Based Matching Functions Adaptation", System Science, 2000, Proceedings of the 33$^{rd}$ Annual Hawaii Inter. Conference on, Jan. 4-7, 2000, pp. 1-8, vol. 1.

Cai et al., Mining Association Rules with Weighted Items, Database Engineering and Applications Symposium, 1998. Proceedings, IDEAS'98 International Jul. 8-10, 1998, pp. 68-77.

Croft et al., "Applications of Multilingual Text Retrieval", System Sciences, 1996, Proceedings of the Twenty-Ninth Hawaii International Conference, Jan. 3-6, 1996, pp. 98-107, vol. 5.

Cunningham, H. et al., "Uniform Language Resource Access and Distribution", University of Sheffield, Department of Computer Science, Sheffield, UK, 5 pages.

* cited by examiner

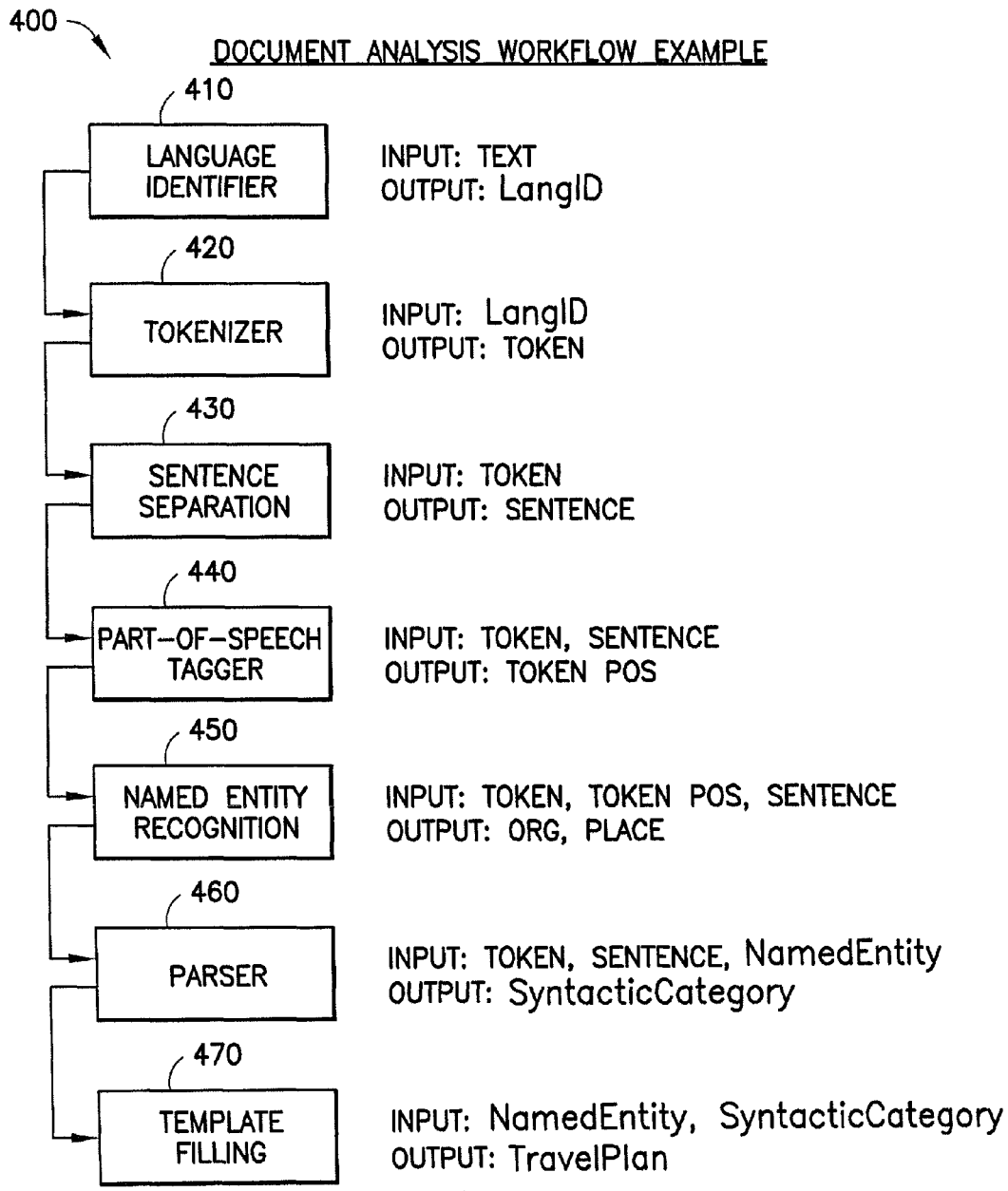
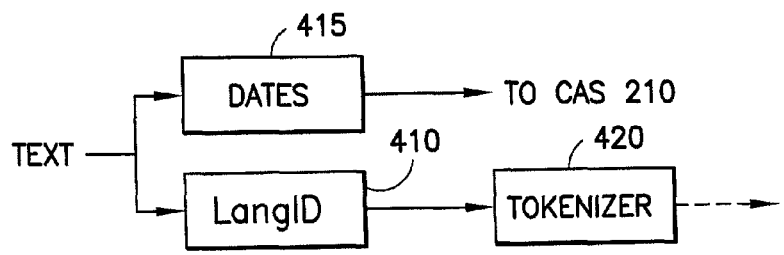
FIG.4A
FIG.4B

TYPE DEFINITION TABLE

| TYPE | PARENT |
|---|---|
| TOP | / |
| ANNOTATION | TOP |
| SENTENCE | ANNOTATION |
| TOKEN | ANNOTATION |
| NamedEntity | ANNOTATION |
| ORG | NameEntity |
| PLACE | NameEntity |
| SYNTACTIC CATEGORY | ANNOTATION |
| NP | SYNTACTIC CATEGORY |
| VP | SYNTACTIC CATEGORY |
| POS | TOP |
| N | POS |
| V | POS |
| ADJECTIVE | POS |
| LangID | TOP |
| EN | LangID |
| ,... | ,... |
| TRAVEL PLAN | TOP |
| ,... | ,... |

FIG.5

FEATURE DEFINITION TABLE

| DOMAIN | FEATURE | RANGE |
|---|---|---|
| TOKEN | POS | POS |
| TravelPlan | DEP | PLACE |
| TravelPlan | ARR | PLACE |
| ,... | ,... | ,... |

FIG.6

COMPONENT LIST

| COMPONENT NAME | INPUT | OUTPUT |
|---|---|---|
| TOKENIZER | TEXT OF LangID | TOKEN |
| LANGUAGE IDENTIFIER | TEXT | LangID |
| PART-OF-SPEECH TAGGER | TOKEN & SENTENCE | Toaken.pos |
| PANES | TOKEN & SENTENCE & NamedEntity | SYNTACTIC CATEGORY |
| TEMPLATE FILLING | NamedEntity & SYNTACTIC CATEGORY | TravelPlan |
| NameEntityRecognition | TOKEN & Token.pos & SENTENCE | ORG, PLACE |
| SENTENCE SEPARATION | TOKEN | SENTENCE |
| ,.... | ,.... | ,.... |

FIG.7

1. Function init(queryTerms)
2.    terms ← queryTerms
3.    curDoc ← 0
4.    for each t ∈ terms
5.       posting[t] ← t.iberator.next(0)

```
1.  Function next(Θ)
2.      repeat
3.          /* Sort the terms in non decreasing order of
            DID */
4.          sort(terms, posting)
5.          /* Find pivot term - the first one with
            accumulated UB ≥ Θ */
6.          pTerm ← findPivotTerm(terms, Θ)
7.          if (pTerm=null) return (NoMoreDocs)
8.          pivot ← posting[pTerm].DID
9.          if (pivot=lastID) return (NoMoreDocs)
10.         if (pivot ≤ curDoc)
11.             /* pivot has already been considered, advance
                one of the preceding terms */
12.             aterm ← pickTerm(terms[0...pTerm])
13.             posting[aterm] ← alerm.iterator.next(curDoc+1)
14.         else /* pivot > curDoc */
15.             if (posting[0].DID=pivot)
16.                 /* Success, all terms preceding pTerm belong
                    to the pivot */
17.                 curDoc ← pivot
18.                 return (curDoc, posting)
19.             else
20.                 /* not enough mass yet on pivot, advance
                    one of the preceding terms */
21.                 aterm ← pickTerm(terms[0...pTerm])
22.                 posting[aterm] ← aterm.iterator.next(pivot)
23.     end repeat
```

FIG.27

```
// Get a type object from the type system.
Type annotType =
    cas.getTypeSystem( ).getType (TCAS.ANNOTATION_TYPE);
// Create a feature structure for that type.
FeatureStructure fs = cas.createsFS (annotType);
// For annotations, we have a special utility
//function.
Annotation annot =
    cas.createAnnotation (annotType, 0, 5);
```

FIG.33A

```
TypeSystem ts =cas.get.TypeSystem ();
//Get the token type from type system.
Type tokenType = ts.getType ("Token");
// Get the part-of-speech feature.
Feature posFeature = ts.getFeature ("pos");
// Get the verb type.
Type verbType = ts.getType ("Verb");
//Create a token.
Annotation token =
cas.createAnnotation (tokenType, 0, 5);
//Create a verb.
FeatureStructure verb = cas.createFS (verbType);
//Set the pos value of the token to the verb.
token.setFeatureValue (posFeature, verb);
//Commit the FS (inserting it into the index).
cas.commitFS (token)'
```

FIG.33B

```
Type tokenType =
    cas.getTypeSystem() .getType ("Token");
//Get the index.
FSIndex tokenIndex =
    cas.getAnnotationIndex (tokenType);
// Create an interator.
FSIterator it = tokenIndex.iterator();
Annotation token;
//Iterate over tokens.
while (it.isValid()) {
    //Get a token.
    token = (Annotation)it.get();
    //Advance iteraror.
    it.moveToNext();
}
```

SYSTEM, METHOD AND COMPUTER PROGRAM PRODUCT FOR PERFORMING UNSTRUCTURED INFORMATION MANAGEMENT AND AUTOMATIC TEXT ANALYSIS, INCLUDING A SEARCH OPERATOR FUNCTIONING AS A WEIGHTED AND (WAND)

CROSS REFERENCE TO RELATED APPLICATION

This application is a continuation of U.S. patent application Ser. No. 11/607,080, filed on Nov. 30, 2006 now U.S. Pat. No. 7,512,602 which claims priority to U.S. Ser. No. 10/449,265 filed on May 30, 2003, and issued as U.S. Pat. No. 7,146,361 on Dec. 5, 2006.

TECHNICAL FIELD

This invention relates generally to information management systems and, more specifically, relates to systems, methods and computer programs for implementing an unstructured information management system that includes automatic text analysis and information searching.

BACKGROUND

The amount of textual data in modern society is continuously growing larger. The reasons for this are varied, but one important driving force is the widespread deployment of personal computer systems and databases, and the continuously increasing volume of electronic mail. The result is the widespread creation, diffusion and required storage of document data in various forms and manifestations.

While the overall trend is positive, as the diffusion of knowledge through society is generally deemed to be a beneficial goal, a problem is created in that the amount of document data can far exceed the abilities of an interested person or organization to read, assimilate and categorize the document data.

While textual data may at present represent the bulk of document data, and is primarily discussed in the context of this patent application, increasingly documents are created and distributed in multi-media form, such as in the form of a document that contains both text and images (either static or dynamic, such as video clips), or in the form of a document that contains both text and audio.

In response to the increasing volume of text-based document data, it has become apparent that some efficient means to manage this increasing corpus of document data must be developed. This field of endeavor can be referred to as unstructured information management, and may be considered to encompass both the tools and methods that are required to store, access, retrieve, navigate and discover knowledge in (primarily) text-based information.

For example, as business methods continue to evolve there is a growing need to process unstructured information in an efficient and thorough manner. Examples of such information include recorded natural language dialog, multi-lingual dialog, texts translations, scientific publications, and others.

Commonly assigned U.S. Pat. No. 6,553,385 B2, "Architecture of a Framework for Information Extraction from Natural Language Documents", by David E. Johnson and Thomas Hampp-Bahnmueller, describes a framework for information extraction from natural language documents that is application independent and that provides a high degree of reusability. The framework integrates different Natural Language/Machine Learning techniques, such as parsing and classification. The architecture of the framework is integrated in an easily-used access layer. The framework performs general information extraction, classification/categorization of natural language documents, automated electronic data transmission (e.g., e-mail and facsimile) processing and routing, and parsing. Within the framework, requests for information extraction are passed to information extractors. The framework can accommodate both pre-processing and post-processing of application data and control of the extractors. The framework can also suggest necessary actions that applications should take on the data. To achieve the goal of easy integration and extension, the framework provides an integration (external) application program interface (API) and an extractor (internal) API.

The disclosure of U.S. Pat. No. 6,553,385 B2 is incorporated herein be reference in so far as it does not conflict with the teachings of this invention.

What is needed is an ability to efficiently and comprehensively process documentary data from a variety of sources and in a variety of formats to extract desired information from the documentary data for purposes that include, but are not limited to, searching, indexing, categorizing and data and textual mining.

SUMMARY OF THE PREFERRED EMBODIMENTS

The foregoing and other problems are overcome, and other advantages are realized, in accordance with the presently preferred embodiments of these teachings.

Disclosed herein is a Unstructured Information Management (UIM) system. Important aspects of the UIM include the UIM architecture (UIMA), components thereof, and methods implemented by the UIMA. The UIMA provides a mechanism for the effective and timely processing of documentary information from a variety of sources. One particular advantage of the UIMA is the ability to assimilate and process unstructured information.

An aspect of the UIMA is that it is modular, enabling it to be either localized on one computer or distributed over more than one computer, and further enabling sub-components thereof to be replicated and/or optimized to adapt to an unstructured information management task at hand.

The UIMA can be effectively integrated with other applications that are information intensive. A non-limiting example is provided wherein the UIMA is integrated with a life sciences application for drug discovery.

Aspects of the UIMA include, without limitation, a Semantic Search Engine, a Document Store, a Text Analysis Engine (TAE), Structured Knowledge Source Adapters, a Collection Processing Manager and a Collection Analysis Engine. In preferred embodiments, the UIMA operates to receive both structured information and unstructured information to produce relevant knowledge. Included in the TAE is a common analysis system (CAS), an annotator and a controller.

Also disclosed as a part of the UIMA is an efficient query evaluation processor that uses a two-level retrieval process.

Disclosed is a data processing system for processing stored data that includes data storage for storing a collection of data units and, coupled to the data storage, a search engine responsive to a query for retrieving at least one data unit from said data storage. The query comprises a search operator comprised of a plurality of search sub-expressions each having an associated weight value, and the search engine returns a data unit having a weight value sum that exceeds a threshold weight value sum. In a preferred embodiment the data units comprise documents.

More specifically, the query comprises a Boolean predicate that functions as a Weighted AND (WAND). The WAND takes as arguments a list of Boolean variables $X_1, X_2, \ldots, X_k$, a list of associated positive weights, $w_1, w_2, \ldots, w_k$, and a threshold $\theta$, where:

$$(\text{WAND}) (X_1, w_1, \ldots X_k, w_k, \theta)$$

is true if:

$$\sum_{1 \leq i \leq k} x_i w_i \geq \theta,$$

where $x_i$ is the indicator variable for $X_i$, where $$x_i = \begin{cases} 1, & \text{if } X_i \text{ is true} \\ 0, & \text{otherwise} \end{cases}.$$

The WAND can be used to implement one of an (AND) function or an (OR) function via:

$$\text{AND}(X_1, X_2, \ldots X_k) = \text{WAND}(X_1, 1, X_2, 1, \ldots X_k, 1, k),$$

and $$\text{OR}(X_1, X_2, \ldots X_k) = \text{WAND}(X_1, 1, X_2, 1, \ldots X_k, 1, 1).$$

Also disclosed is a method for processing document data, and a computer program product embodied on a computer-readable medium that contains program code for directing operation of a text intelligence system in cooperation with at least one application. The computer program product includes a computer program segment for storing a collection of data units and a computer program segment implementing a search engine that is responsive to a query for retrieving at least stored one data unit. The query comprises a search operator comprised of a plurality of search sub-expressions each having an associated weight value, and where said search engine returns a data unit having a weight value sum that exceeds a threshold weight value sum.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4A is flowchart depicting an example of workflow in a Common Analysis System (CAS), and may further be viewed as an example of a plurality of serially-coupled annotators that form a part of a text analysis engine;

FIG. 4B shows an example of an alternate embodiment of coupled annotators, where there is at least two parallel annotator paths;

FIG. 5 is a table of exemplary type definitions;

FIG. 6 is a table of exemplary feature definitions;

FIG. 7 is a table showing an exemplary component list;

FIG. 20A illustrates the derivation of a plurality of views via different tokenizations of a document;

FIG. 27 is an example of pseudo-code of a nexto method of the WAND iterator;

FIGS. 33A and 33B illustrate exemplary pseudo-code for creating data that is useful for explaining the operation of the Common Analysis System (CAS), while

DETAILED DESCRIPTION OF THE PREFERRED EMBODIMENTS

Disclosed herein is an Unstructured Information Management Architecture (UIMA). The following description is generally organized as follows:
  I. Introduction
  II. Architecture Functional Overview
  Document Level Analysis
  Collection Level Analysis
  Semantic Search Access
  Structural Knowledge Access
  III. Architecture Component Overview
  Search Engine
  Document Store
  Analysis Engine
  IV. System Interfaces
  V. Two-Level Searching
  VI. Exemplary Embodiment & Considerations I. Introduction The UIMA disclosed herein is preferably embodied as a combination of hardware and software for developing applications that integrate search and analytics over a combination of structured and unstructured information. "Structured information" is defined herein as information whose intended meaning is unambiguous and explicitly represented in the structure or format of the data. One suitable example is a database table. "Unstructured information" is defined herein as information whose intended meaning is only implied by its form. One suitable example of unstructured information is a natural language document.

The software program that employs UIMA components to implement end-user capability is generally referred to in generic terms such as the application, the application program, or the software application. One exemplary application is a life sciences application that is discussed below in reference to FIG. 32.

Figure 1:
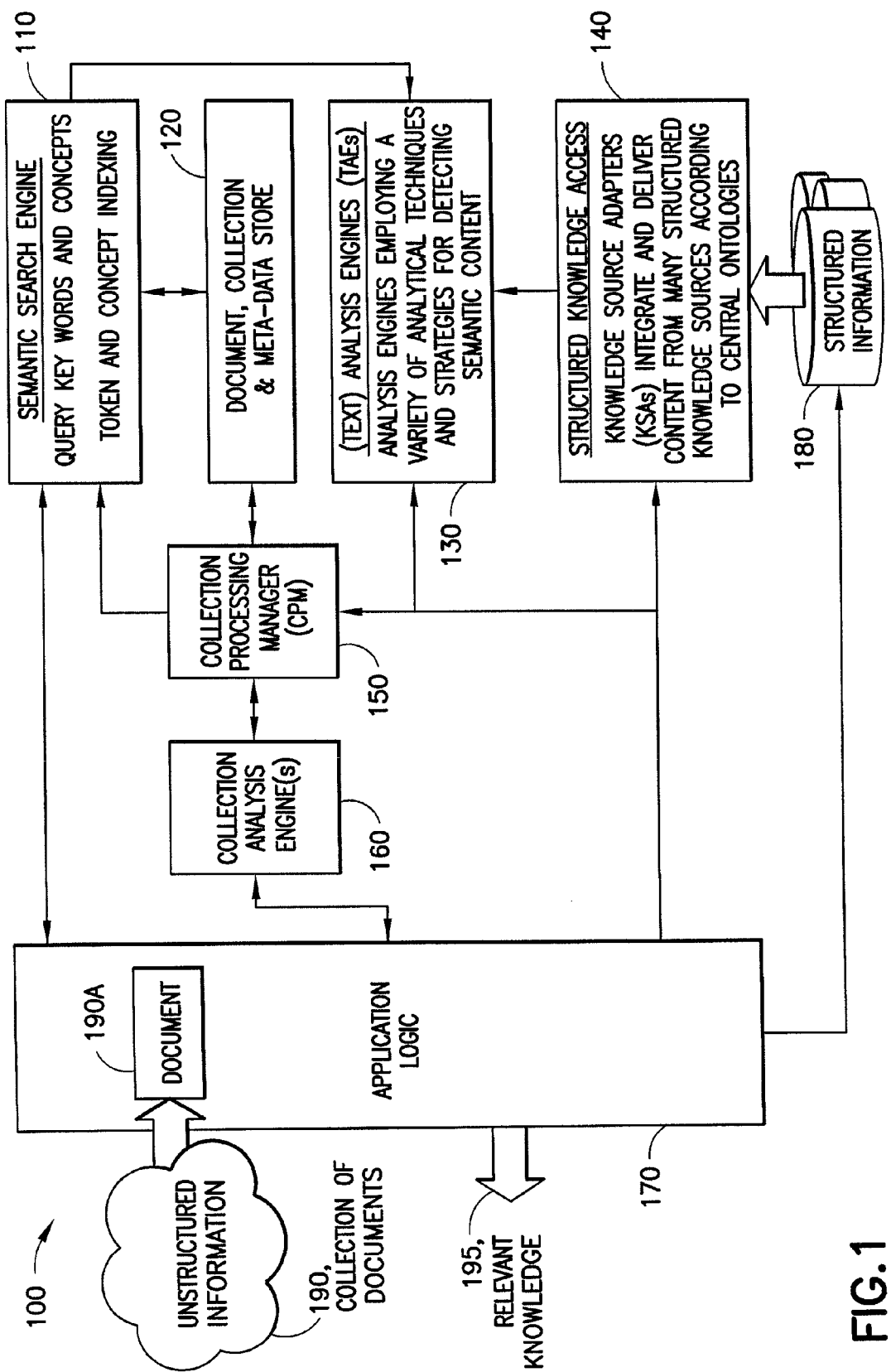
FIG. 1 is a block diagram that presents an overview of the architecture of the unstructured information management system disclosed herein.

The UIMA high-level architecture, one embodiment of which is illustrated in FIG. 1, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

FIG. 1 shows that the illustrated and non-limiting embodiment of the UIMA 100 includes a Semantic Search Engine 110, a Document Store 120, at least one Text Analysis Engine (TAE) 130, at least one Structured Knowledge Source Adapter 140, a Collection Processing Manager 150, at least one Collection Analysis Engine 160, and Application logic 170. In preferred embodiments, the UIMA 100 operates to receive both structured information 180 and unstructured information to produce relevant knowledge 195. The unstructured information may be considered to be a collection of documents 190, and can be in the form of text, graphics, static and dynamic images, audio and various combinations thereof. A given one of the documents that is ingested by the UIMA 100 is referred to as a document 190A.

Figure 2:
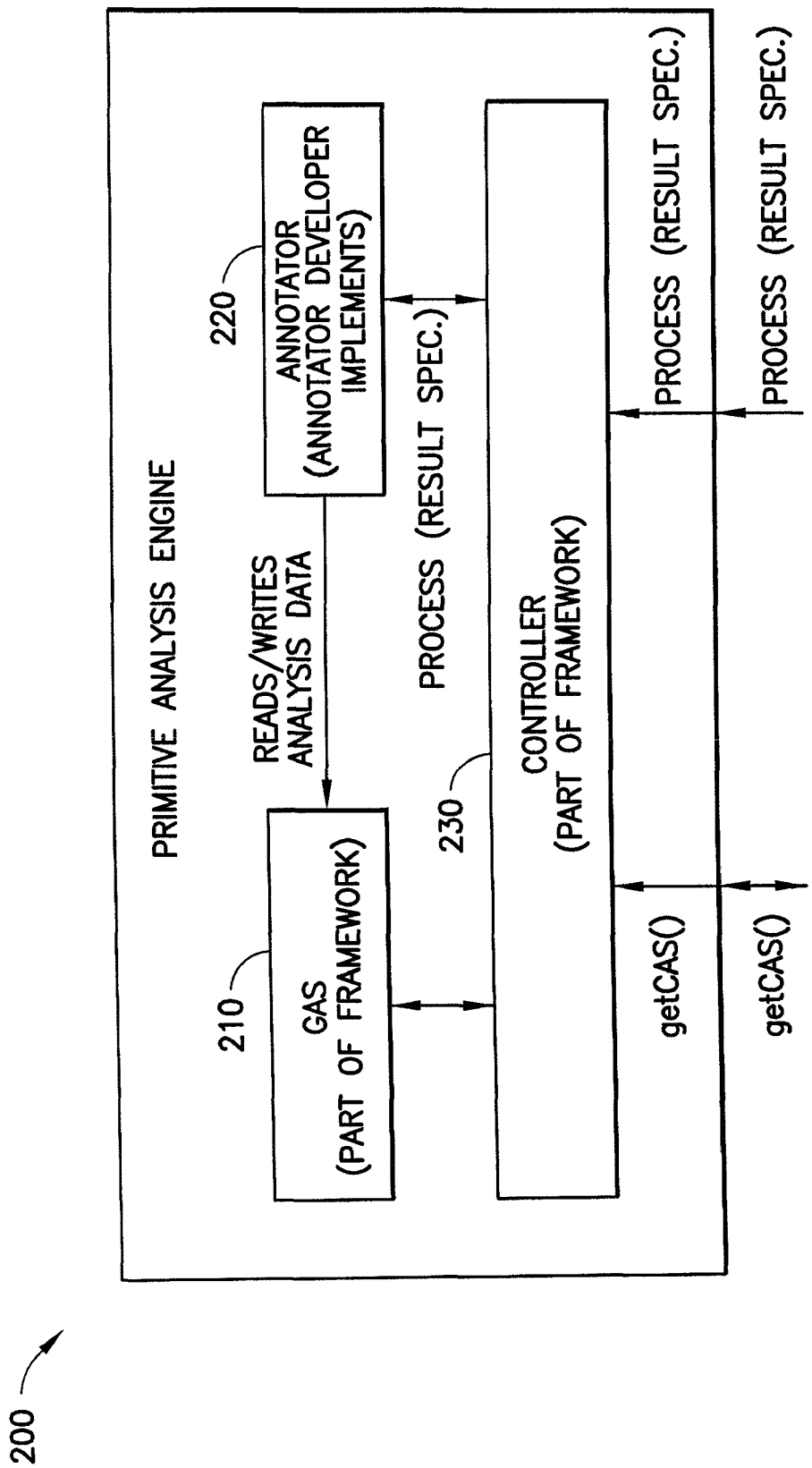
FIG. 2 is a block diagram that presents aspects of a primitive analysis engine.
Figure 3:
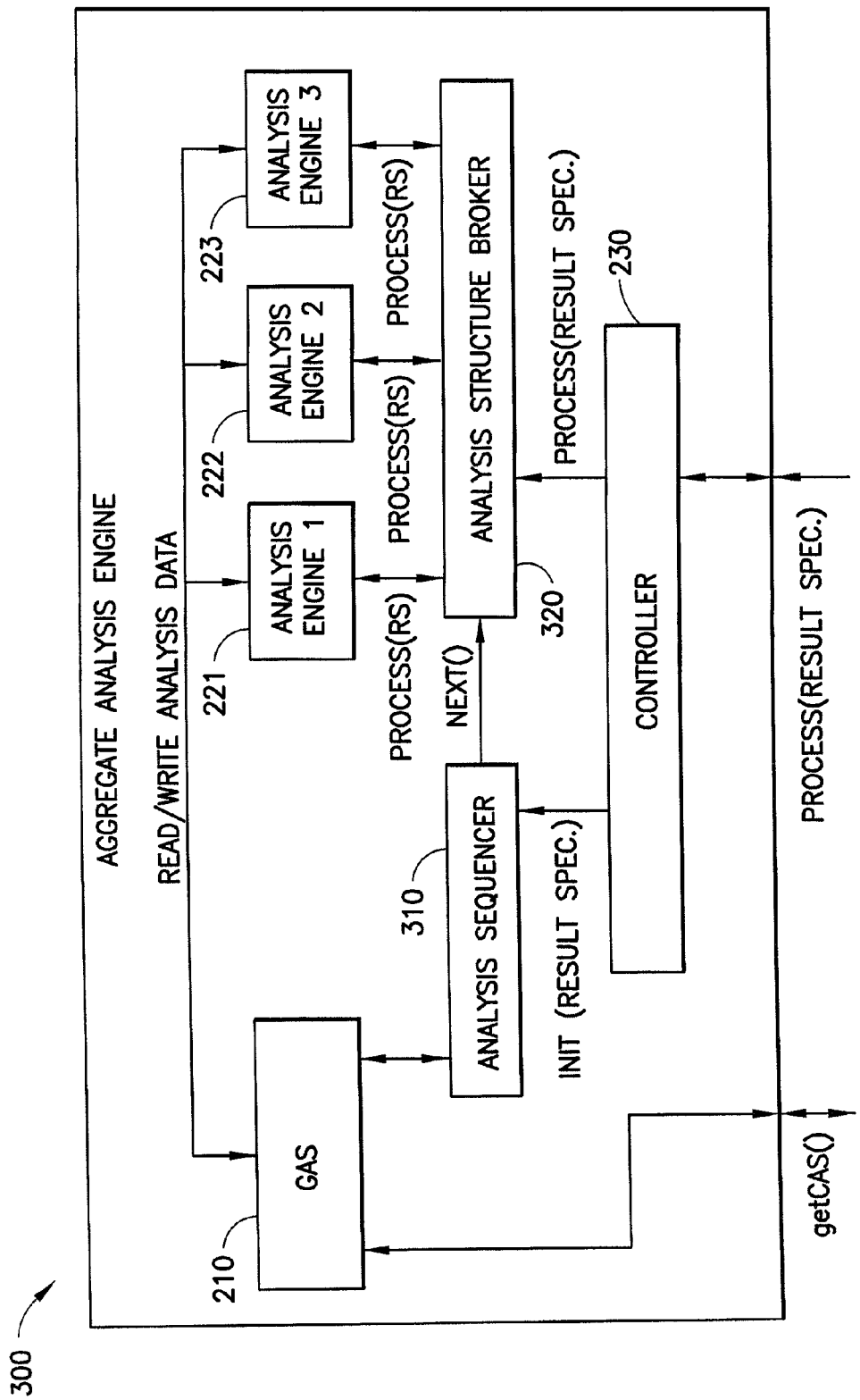
FIG. 3 is a block diagram that presents aspects of an aggregate analysis engine.

Aspects of the UIMA 100 shown in FIG. 1 are further shown in FIG. 2, where there is illustrated a Primitive Analysis Engine (PAE) 200 that can be a component part of the Text Analysis Engine 130. Included in the PAE 200 is a Common Analysis System (CAS) 210, an annotator 220 and a controller 230. A second embodiment of a TAE 130 is shown in FIG. 3, wherein an Aggregate Analysis Engine (AAE) 300 is composed of two or more component analysis engines 221, 222, 223 as well as the CAS 210, and implements the same external interface as the PAE 200. Further included in the aggregate analysis engine 300 is the controller 230, an analysis sequencer 310 and an analysis structure broker 320. These features will be discussed in greater depth below, and are therefore only presently introduced.

II. Architecture Functional Overview

It should be noted that the foregoing is but one embodiment, and introductory. Therefore, aspects of the components of the UIMA 100 disclosed in FIGS. 1, 2 and 3 may be varied. For example, the TAE 130 may include appropriate engines for analysis of data other than text, such as voice or video.

While embodiments of the UIMA 100 extend to a variety of unstructured artifacts, including without limitation: voice, audio and video; the discussion herein is generally directed to UIMA 100 implementations involving human language technologies in the form of text data. Further, as disclosed herein, elements of unstructured information for processing as documents 190A may include a whole text document, a text document fragment, or even multiple documents. Therefore, the teachings herein are only to be considered illustrative of aspects of the UIMA 100.

That is, the UIMA 100 may be realized in various embodiments having various structures. For example, it may be considered advantageous to implement the UIMA 100 as one large system, or as several smaller and distributed systems. Such implementations may be varied depending on factors such as the scale of the implementation as well as other factors.

An overview of aspects of the functions of the UIMA 100 are now provided. The aspects include both analysis and access functions. Analysis functions are divided into two classes, namely document-level analysis and collection-level analysis. Access functions are divided into semantic search access and structured knowledge access. Each of these function is introduced below.

II.A Document-Level Analysis

Document-level analysis is performed by the component processing elements referred to as the Text Analysis Engines (TAEs) 130. These are extensions of the generic analysis engine, and are specialized for text. Aspects of the TAE 130 may be considered analogous to the Processing Resources disclosed in the GATE architecture by Cunningham et al., 2000 (Uniform Language Resource Access and Distribution in the Context of GATE-a "General Architecture for Text Engineering", University of Sheffield, UK, 2000). In the UIMA 100, a TAE 130 is preferably a recursive structure that may be composed of sub-component or component engines, each one performing a different stage of the application's analysis.

Examples of Text Analysis Engines 130 include language translators, document summarizers, document classifiers, and named entity detectors. Each TAE 130 is provided for discovering specific concepts (or "semantic entities") otherwise unidentified or implicit in the document text 190A.

A TAE 130 inputs a document 190A and produces an analysis. The original document 190A and the corresponding analysis are subsequently represented in a common structure referred to as the Common Analysis System (CAS) 210. Generally, the CAS 210 is a data structure that facilitates the modeling, creation and retrieval of information for at least one document 190A (see, for example, FIG. 11). The CAS 210 may be localized or it may be distributed. Furthermore, the UIMA 100 supports the coordination of multiple CAS systems.

As used in the UIMA 100, and in general, annotations associate some meta-data with a region in the original document 190A. Where the document 190A is a text document, for example, the annotation associates meta-data (e.g., a label) with a span of text in the document 190A by giving directly or indirectly the span's start and end positions. Annotations in the CAS 210 are stand-off, meaning that the annotations are maintained separately from the document itself. Stand-off annotations are generally considered to be more flexible than inline document markup. However, in the UIMA 100 the annotations need not be the only type of information stored in the CAS 210 for a given document 190A. The CAS 210 may be used to represent any class of meta-data element associated with analysis of the document 190A, regardless of whether it is explicitly linked to some sub-component of the original document 190A. The CAS 210 also allows for multiple definitions of this linkage, as is useful for the analysis of images, video, or other non-textual modalities. In general, there will be one CAS 210 associated with each document 190A.

Figure 8:
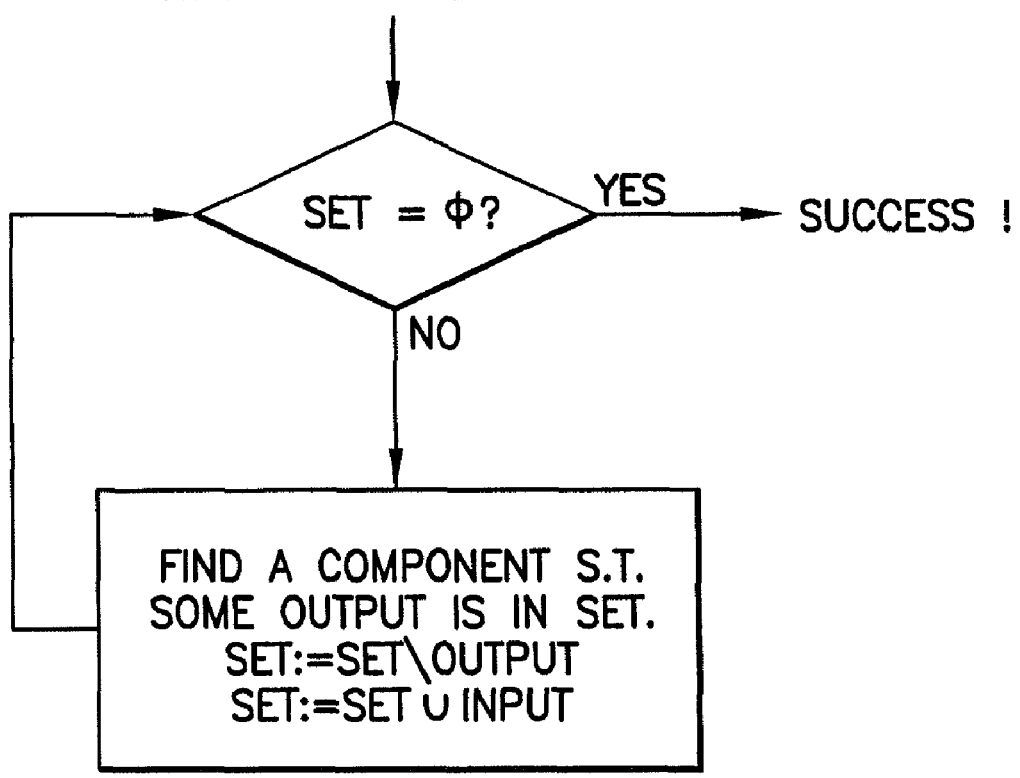
FIG. 8 is a flow chart depicting workflow generation.
Figure 9:
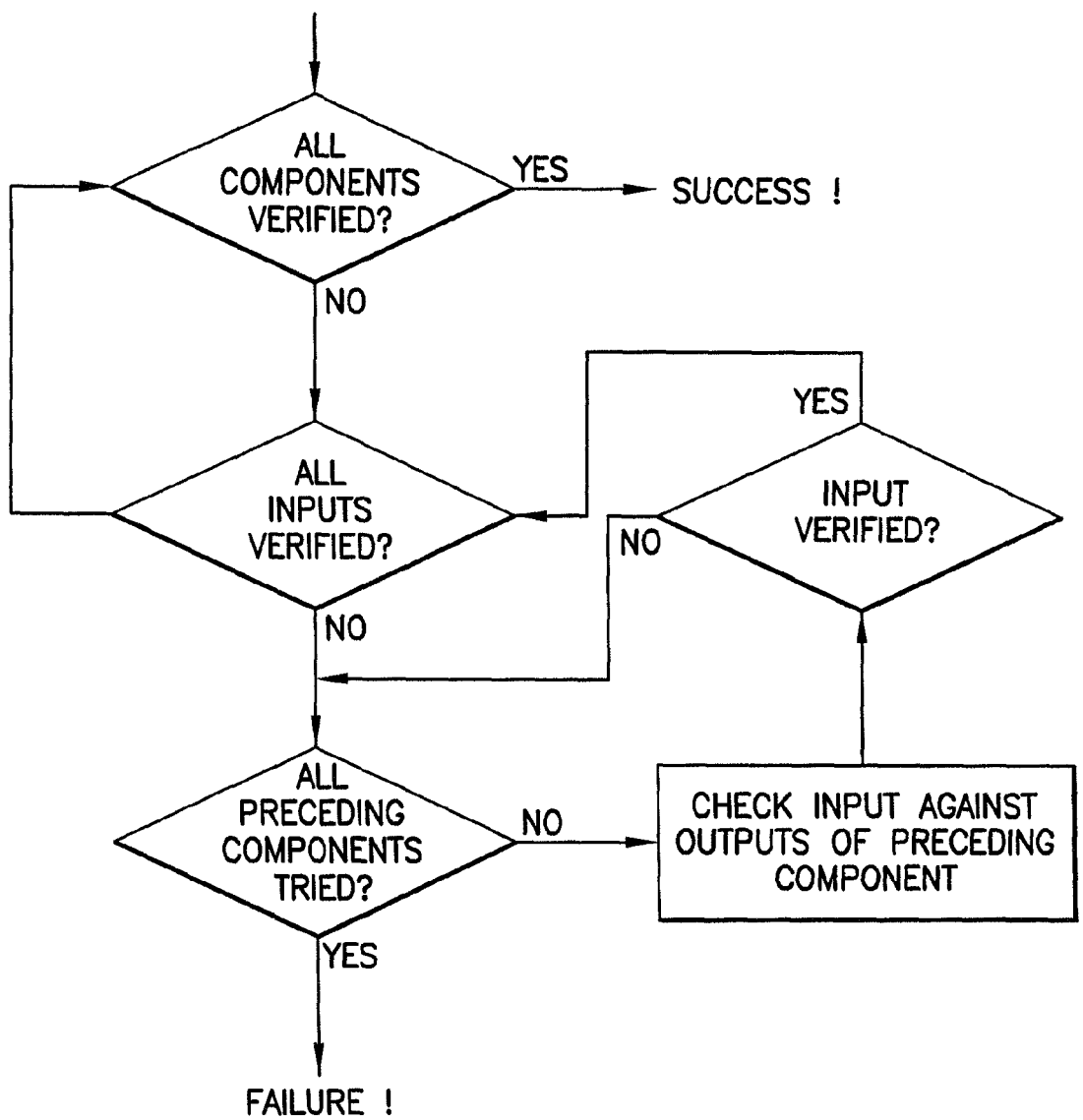
FIG. 9 is a flow chart depicting workflow verification.

An example of document level analysis is provided in FIG. 4A. In the exemplary workflow 400, an annotation pipeline includes a plurality of coupled annotators including a language identifier 410, a tokenizer 420, a sentence separation annotator 430, a part-of-speech (POS) tagger 440, a named entity recognition annotator 450, a parser 460, and a template filling annotator 470. Other non-limiting relationships that may be used in addition to, or in substitution for, the exemplary annotators and steps disclosed in FIG. 4A are provided in FIGS. 5-7. FIG. 8 and FIG. 9 provide flowcharts representing aspects of Workflow Generation (FIG. 8), and Workflow Verification (FIG. 9). It should be noted that at least some of the various annotators 410-470 may appear in a different order than is illustrated in FIG. 4, e.g., in some circumstances the tokenizer 420 may precede the language identifier 410.

However, it is not required that all of the annotators 410-470 be arranged in a serially coupled pipeline as shown in FIG. 4A. For example, FIG. 4B shows an example where a Dates annotator 415 is arranged in parallel with the Language ID and other annotators, and where the output of the Dates annotator 215 is taken directly back to the CAS 210. This embodiment could be useful when ingesting a document 190A written in a language, such as Kanji, that includes dates written using Latin characters. Any number of parallel annotator paths, and numbers of annotators per parallel path, can be provided (e.g., the Dates annotator 415 may be followed by a serially coupled Time annotator). Furthermore, the output of a given parallel annotator path need not be taken directly back to the CAS 210, but could be fed back into another annotator path.

It should be noted that there may be more than one CAS 210 associated with a given document 190A, i.e., different TAEs 130 can use different CASs 210. As an example, one TAE 130 may provide a translation of a document 190A into a different language, using one CAS 210, while another TAE 130 may provide a summary of the same document 190, using a different CAS 210. Alternatively, a plurality of TAEs 130 can use the same CAS 210 for the same document 190A.

The analysis represented in the CAS 210 may be considered to be a collection of meta-data that is enriched and/or refined (such as by discarding irrelevant data) as it passes through successive stages of analysis. At a specific stage of analysis, for example, the CAS 210 may include a deep parse. A named-entity detector (450) receiving the CAS 210 may consider the deep parse to identify named entities. The named entities may be input to an analysis engine 130 that produces summaries or classifications based on a plurality of the documents 190A, e.g., those documents 190A that refer to U.S. Presidents, or that refer to business leaders in one or more business areas.

Figure 10A:
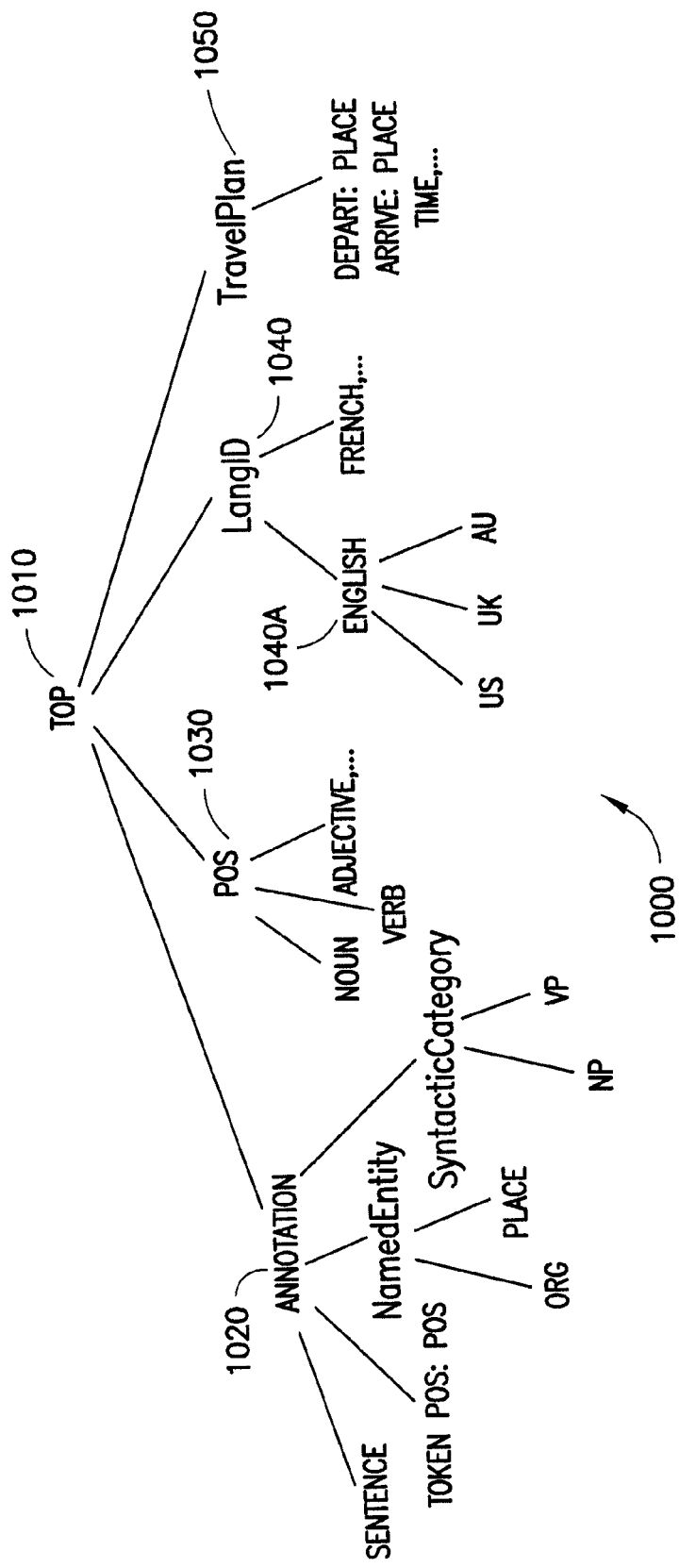
FIG. 10A depicts an example of relationships in a single inheritance tree.

In the presently preferred embodiment the CAS 210 provides a general object-based document representation with a hierarchical type system supporting single inheritance. An example of an inheritance structure 1000 is provided in FIG. 10A. In FIG. 10A the type system 1010 includes various sub-types, such as in the non-limiting examples provided, annotation 1020, parts of speech (POS) 1030, LangID 1040 and TravelPlan 1050. These types (or sub-types) 1020, 1030, 1040 1050 may be further broken down as is appropriate (e.g., variants of the sub-type LangID 1040 include an English language sub-type 1040A, further including US, UK and Australia). In general, the type system 1010 provides a data model for the analysis of textual documents using the CAS 210.

Figure 10B:
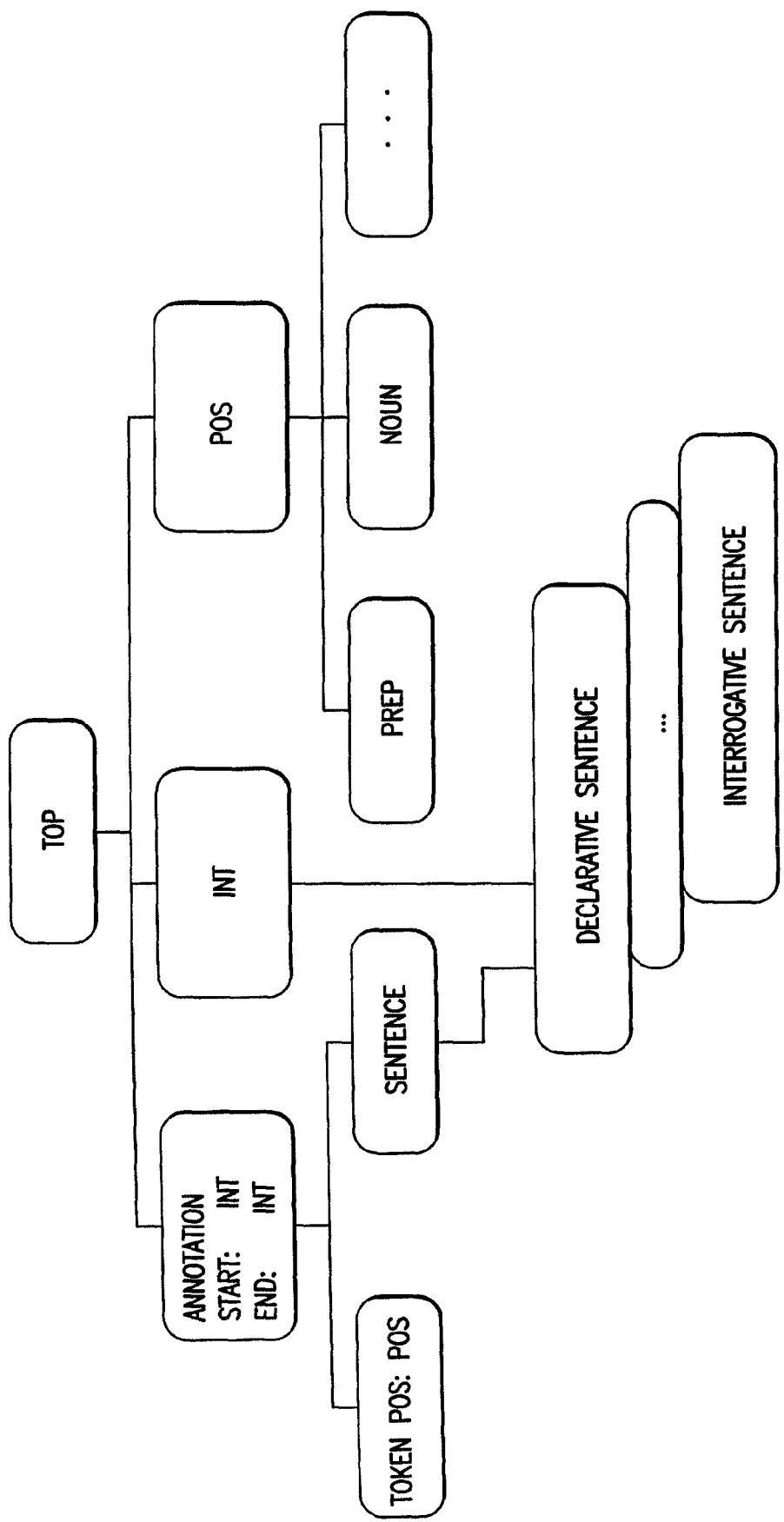
FIG. 10B illustrates a data modeling example using multiple inheritance.

However, the CAS 210 is not limited to the use of single inheritance, and FIG. 10B shows an example of data modeling using multiple inheritance. In this case the structure is not an inheritance tree, but a directed acyclic graph. Standard techniques, such as those in C++ or Artificial Intelligence, can be used to specify the operational and declarative semantics for multiple inheritance.

In either case (single or multiple inheritance) an example annotator may be interested only in finding sentence boundaries and types, e.g. to invoke another set of annotators for classifying pragmatic effects in a conversation.

Figure 11:
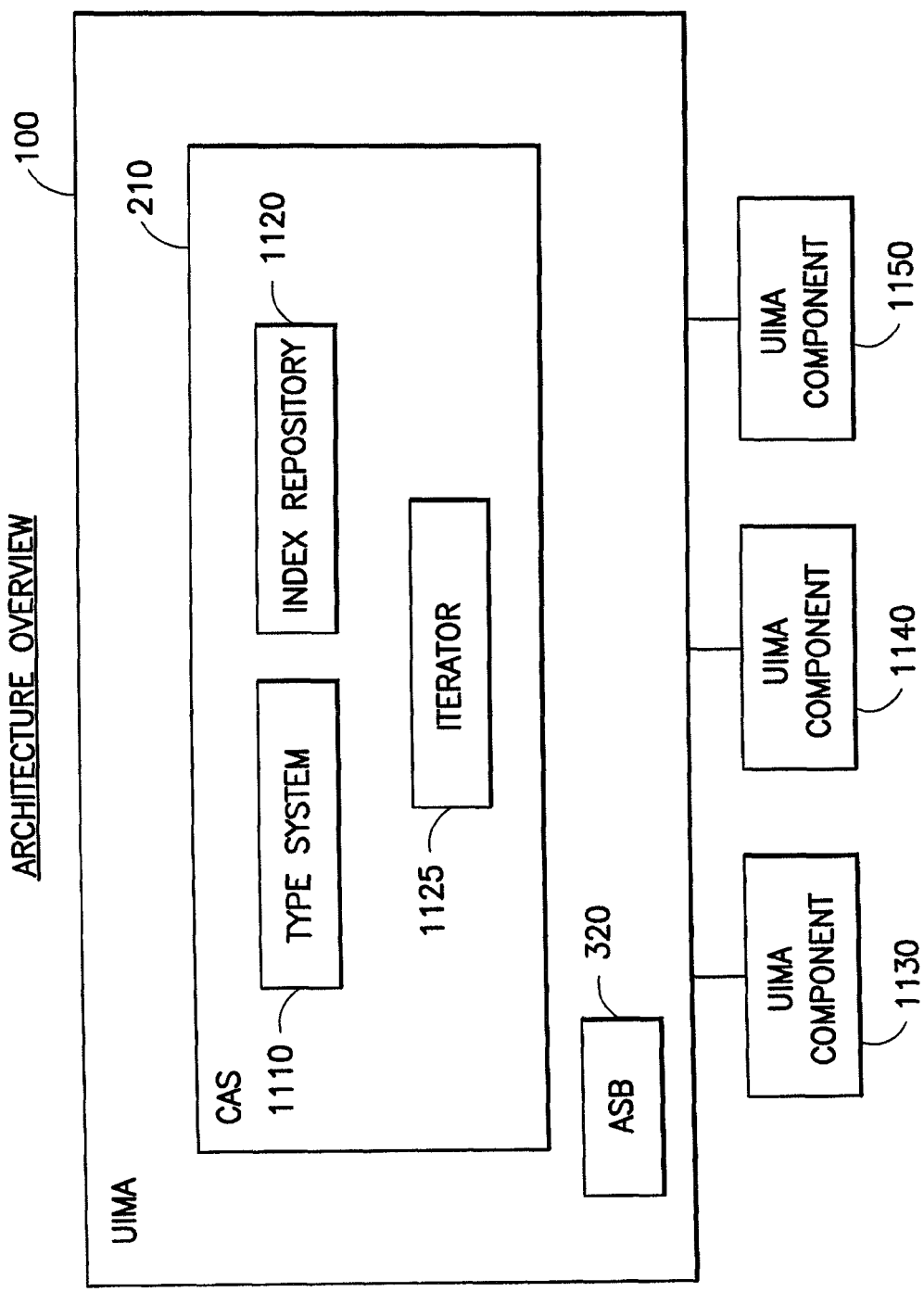
FIG. 11 is a block diagram that provides an overview of aspects of the Common Analysis System.

Object-based representation with a hierarchical type system supporting single inheritance includes data creation, access and serialization methods designed for the efficient representation, access and transport of analysis results among TAEs 130, and between TAEs 130 and other UIMA components or applications. Elements in the CAS 210 may be indexed for fast access. The CAS 210 has been implemented in C++ and Java with serialization methods for binary, as well as with XML formats for managing the tradeoff between efficiency and interoperability. An example of the relations of the CAS 210 with components of the UIMA 100 is given in FIG. 11. In FIG. 11, in addition to the CAS 210, the Type System 1110 and the Index Repository 1120 are shown, as is an Iterator 1125. In general, the Type System 1110 specifies constraints on workflow, not the annotator order per se, e.g., in FIG. 4A the Lang_ID annotator 410 should precede the parts of speech (POS) annotator 440. The Index Repository 1120 provides storage for pointers enabling certain information to be located in the document 190A, such as by specifying the locations of dates and proper names in the current document 190A. Further UIMA components 1130, 1140 and 1150 are shown, as well as an Analysis Structure Broker (ASB) 320, discussed below.

II.B Collection-Level Analysis

Preferably, documents are gathered by the application 170 and organized into collections, such as the collection 190 shown in FIG. 1. Preferably, the UIMA 100 includes a Collection Reader interface that forms a part of the CPM 150. Implementations of the Collection Reader provide access to collection elements 190, collection meta-data and element meta-data. UIMA 100 implementations include a Document, Collection and Meta-data Store 120 that cooperates with the Collection Reader interface and manages multiple collections and their elements. However, those applications 170 that desire to manage their own collections may provide an implementation of a Collection Reader to those UIMA 100 components that require access to the collection data.

Collections 190 can be analyzed to produce collection level analysis results. These results represent aggregate inferences computed over all or some subset of the documents 190A in a collection 190. The component of an application 170 that analyzes an entire collection 190 is the Collection Analysis Engine (CAE) 160. The CAE(s) 160 typically apply element-level, or more specifically document-level analysis, to elements of a collection, such as individual documents 190A, and then consider the element analyses in performing aggregate computations.

Examples of collection level analysis results include sub-collections where elements contain certain features, glossaries of terms with their variants and frequencies, taxonomies, feature vectors for statistical categorizers, databases of extracted relations, and master indices of tokens and other detected entities.

In support of the Collection Analysis Engine(s) 160, the UIMA 10 includes the Collection Processing Manager (CPM) component 150. The CPM 150 is primarily tasked with managing the application of a designated TAE 130 to each document 190A accessible through the Collection Reader in the store 120. The Collection Analysis Engine 160 may provide, as input to the CPM 150, a TAE 130 and a Collection Reader (not shown). The CPM 150 applies the TAE 130 and returns the analysis, represented by a CAS 210, for each element 190 in the collection. To control the process, the CPM 150 provides administrative functions that include failure reporting, pausing and restarting.

At the request of the application's Collection Analysis Engine 160, the CPM 150 may be optionally configured to perform functions typical of UIM application scenarios. Non-limiting examples of UIM application functions include: filtering—that ensures that only certain elements are processed based on meta-data constraints; persistence—that stores element-level analysis; indexing—that indexes documents using a designated search engine indexing interface based on meta-data extracted from the analysis; and parallelization—that manages the creation and execution of multiple instances of a TAE 130 for processing multiple documents simultaneously utilizing available computing resources.

II.C. Semantic Search Access

As used herein a "semantic search" implies the capability to locate documents based on semantic content discovered by document or collection level analysis, that is represented as annotations. To support a semantic search, the UIMA 100 includes search engine indexing and query interfaces.

One aspect of the indexing interface is support of the indexing of tokens, as well as annotations and particularly cross-over annotations. Two or more annotations are considered to cross-over one another if they are linked to intersecting regions of the document.

Another aspect of the query interface is support for queries that may be predicated on nested structures of annotations and tokens, in addition to Boolean combinations of tokens and annotations.

II.D. Structured Knowledge Access

As analysis engines 130 perform their functions they may consult a wide variety of structured information sources 180. To increase reusability and facilitate integration, the UIMA 100 includes the Knowledge Source Adapter (KSA) interface 140.

The KSA 140 provides a layer of uniform access to disparate knowledge sources 180. They manage the technical communication, representation language and ontology mapping necessary to deliver knowledge encoded in databases, dictionaries, knowledge bases and other structured sources 180 in a uniform manner. In the preferred embodiment the primary interface to a KSA presents structured knowledge 180 as instantiated predicates using, as one non-limiting format example, the Knowledge Interchange Format (KIF) encoded in XML.

One aspect of the KSA 140 architecture involves the KSA meta-data and related services that support KSA registration and search. These services include the description and registration of named ontologies. Ontologies are generally described by the concepts and predicates they include. The KSA 140 is preferably self-descriptive, and can include as meta-data those predicate signatures associated with registered ontologies that the KSA 140 can instantiate, as well as an indication of any knowledge sources consulted.

Preferably, application or analysis engine developers can consult human browseable KSA directory services to search for and find KSAs 140 that instantiate predicates of a registered ontology. The service may deliver a handle to a web service or an embeddable KSA component 140.

III. Architectural Component Overview

III.A. Search Engine 110

The Search Engine 110 is responsible for indexing and query processing. The search engine 110 is distinguished from a search application, that would use the search engine 110 and that would add, for example, page ranking and presentation functions to provide a basic search application.

The UIMA 100 supports the development of applications that leverage the integration of text analysis and search. In addition to execution of basic Boolean search capabilities, these applications may require the search engine to provide two advanced capabilities, referred to as "Spans" and "Views."

Spans: Semantic entities such as events, locations, people, chemicals, parts, etc., may be represented in text by a sequence of tokens, where each token may be a string of one or more alphanumeric characters. In general, a token may be a number, a letter, a syllable, a word, or a sequence of words. The TAE 130 produces annotations over spans of tokens. For example, an annotation of type "location" may be used to annotate the span of tokens "1313 Mocking Bird Lane", while an annotation of type "person" may be used to annotate the span of tokens "Bob Smith".

Figure 13:
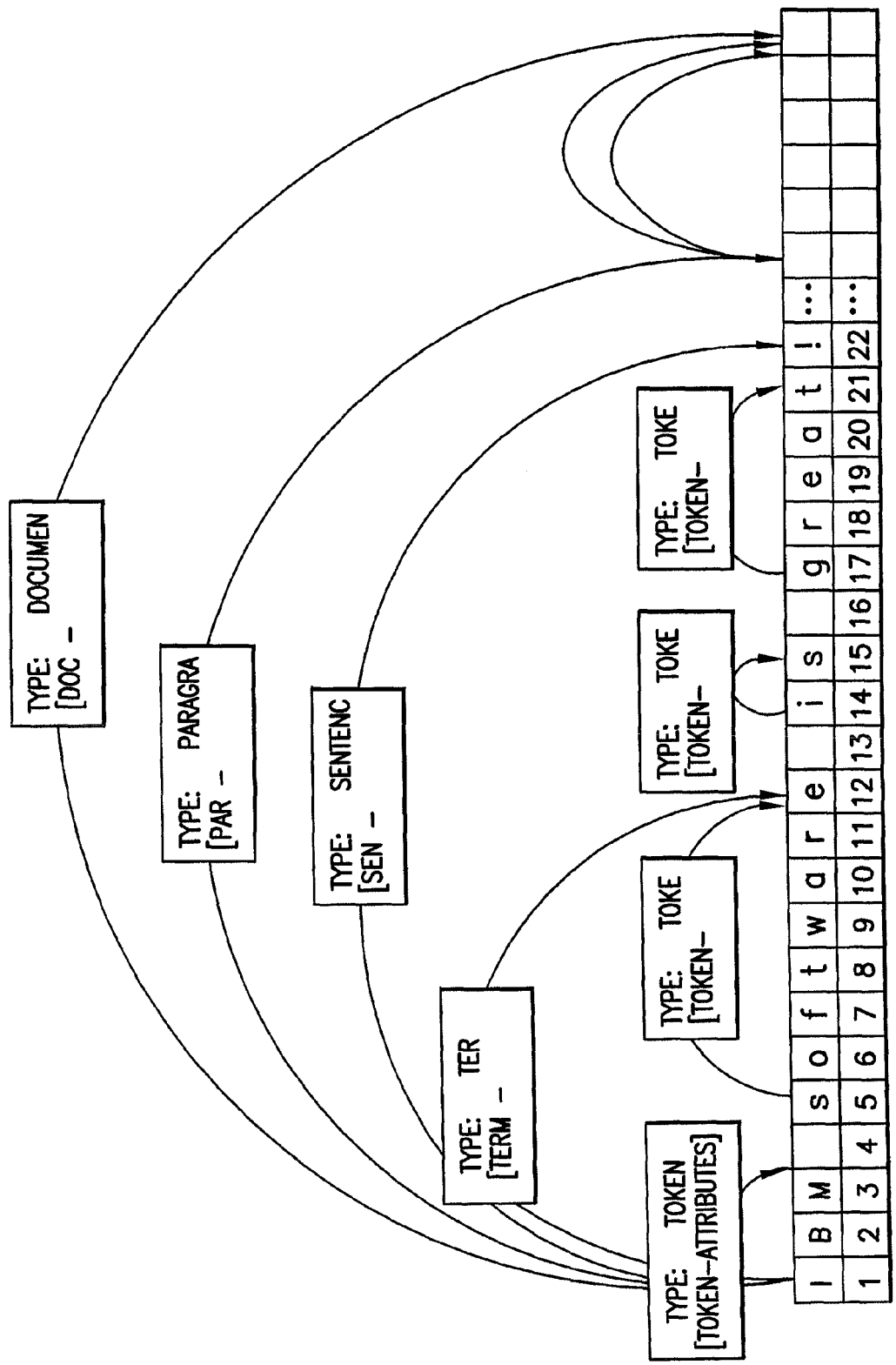
FIG. 13 is a graphic depiction of an exemplary annotation structure.

FIG. 13 provides an example of an annotation structure showing nested spans of tokens with various annotation types. In FIG. 13, for example, each token is shown as being one word.

Annotations may have features (i.e. properties). For example, annotations of type "location" may have a feature "owner" whose value is the owner of the property at that location. The values of features may be complex types with their own features; for example the owner of a location may be an object of type "person" with features "name John Doe" and "age=50."

The UIMA-compliant Search Engine 110 supports the indexing of annotations over spans of tokens, or "spans." There are at present two preferred ways in which this could be accomplished, discussed below. Briefly, inline annotations can be inserted in a CAS 210 in some format (e.g. XML) understood by the indexer 110, or the indexer 110 is capable of understanding standoff annotations found in the CAS 210.

Translation to Inline Annotations: In this approach, the application 170 accommodates the input requirements of the search engine 110. For example, search engines such as Juru can index XML documents, and then process queries that reference the XML elements. Consider in the following example, that the document could be indexed:

<Event><Person>John</Person>went to <City>Paris</City>.</Event>

Then, if a query were entered for an Event containing the city Paris, this document would match that query.

In order to use an XML-aware search engine 110 in the UIMA 100, the application 170 takes the standoff annotations produced by the TAE 130 and encodes them inline as XML. The CAS 210 preferably defines a method to generate this XML representation. The benefit of this approach is that it can be made to work with any XML-aware search engine 110.

Search Engine Aware of Standoff Annotations: In this approach, the search engine's interface supports the concept of standoff (i.e., non-inline) annotations over a document. Therefore, the output of the TAE 130 can be fed directly (or almost directly) into the search engine 110, obviating the need for an intermediate representation such as XML. As an example, consider the document fragment and the locations of its tokens.

| Washington | D. | C. | is | the | Capital | of | the | United | States |
|---|---|---|---|---|---|---|---|---|---|
| 1 | 2 | 3 | 4 | 5 | 6 | 7 | 8 | 9 | 10 |

It can be noted that the tokens have location definitions in the foregoing example (e.g., the tokens "Washington", "D.", "C.") that differ from those shown in FIG. 13. The preferred embodiment of the UIMA 100 supports both types of token location definitions.

Assuming that the search engine 110 and TAE 130 agree on exactly the same location space for this document, then the information may be represented by the TAE 130 as follows:

| $City | 1 | 3 |
|---|---|---|
| $Country | 9 | 10 |

However, if the TAE 130 and search engine 110 disagree on how white space is counted, how punctuation is addressed, or are simply out of alignment, then the annotations $City and $Country may not be indexed properly.

Therefore, an equivalent XML representation is provided, wherein:

<$City>Washington D.C. </City> is the capital of the <$Country>United States</$Country>.

XML parsing is generally more computationally expensive then the foregoing alternative. Preferably, this is mitigated by using a non-validating parser that takes into consideration that this may not be the most limiting step of the pre-processing functions.

Further in consideration of XML, in some embodiments a disadvantage of the XML representation is that a TAE 130 may produce overlapping annotations. In other words, annotations are not properly nested. However, XML would not naturally represent overlapping annotations, and further mechanisms may be employed to provide a solution.

Also, consider the string of characters "airbag." This is a compound noun for which an application may wish to index annotations from a TAE 130 that distinguishes "air" from "bag." If the search engine 110 supports only one tokenization of a document, where "airbag" was interpreted as a single token, but a TAE 130 used a different tokenization that treated "air" and "bag" distinctly, the application 170 could not index annotations on "air" separately from annotations on "bag", since the search engine's 110 smallest indexing unit in this case was "airbag."

For the example document fragment above, the annotations sent to the Search Engine 110 would be:

| $Token | 0 | 9 | $Token | 11 | 12 | $Token | 13 | 14 | $Token | 16 | 17 |
|---|---|---|---|---|---|---|---|---|---|---|---|
| $Token | 19 | 21 | $Token | 23 | 29 | $Token | 31 | 32 | $Token | 34 | 36 |
| $Token | 38 | 43 | $Token | 45 | 50 | $City | 0 | 14 | $Country | 38 | 50 |

The "city" and "country" annotations have been specified using character offsets (that is their internal representation in the CAS 210). If the search engine 110 ultimately would prefer them to be specified using token numbers, either the application or the search engine 110 could perform the translation.

It should be noted that, in general, tokens can be single characters, or they can be assemblages of characters.

Some of the benefits of this approach include the fact that there is no need for expensive translations from a standoff annotation model to an inline annotation model, and back again. Also, overlapping annotations do not present a problem.

Figure 12:
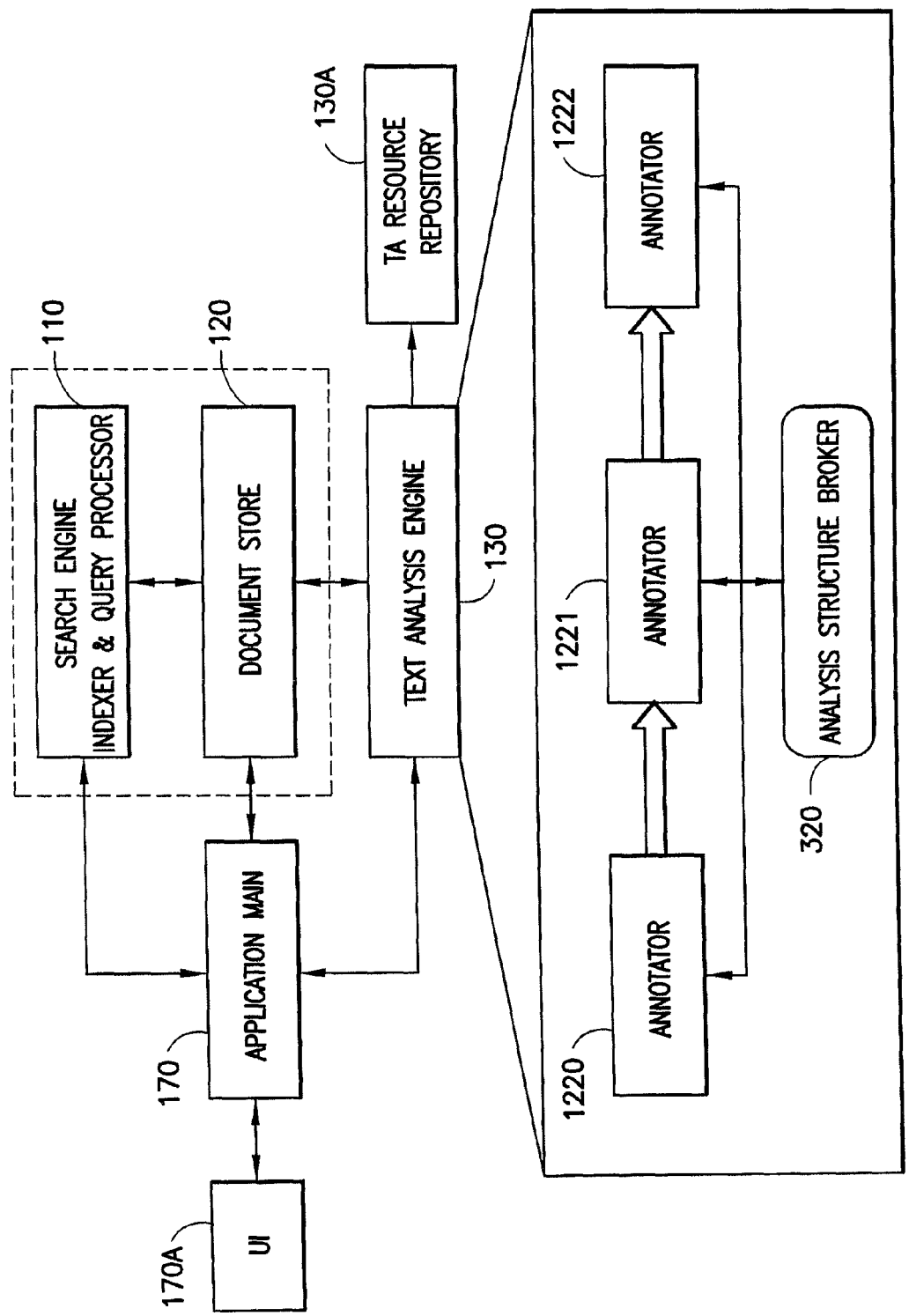
FIG. 12 is a block diagram depicting additional relationships of a text analysis engine.

One embodiment of the relationship between the Search Engine 110, the TAE 130, and a series of annotators 1220, 1221, 1222 is provided in FIG. 12. Also shown is the ASB 320, a User Interface (UI) 170A for the Application 170, and a Text Analysis (TA) Resource Repository 130A that receives an output from the TAS 130.

Figure 14:
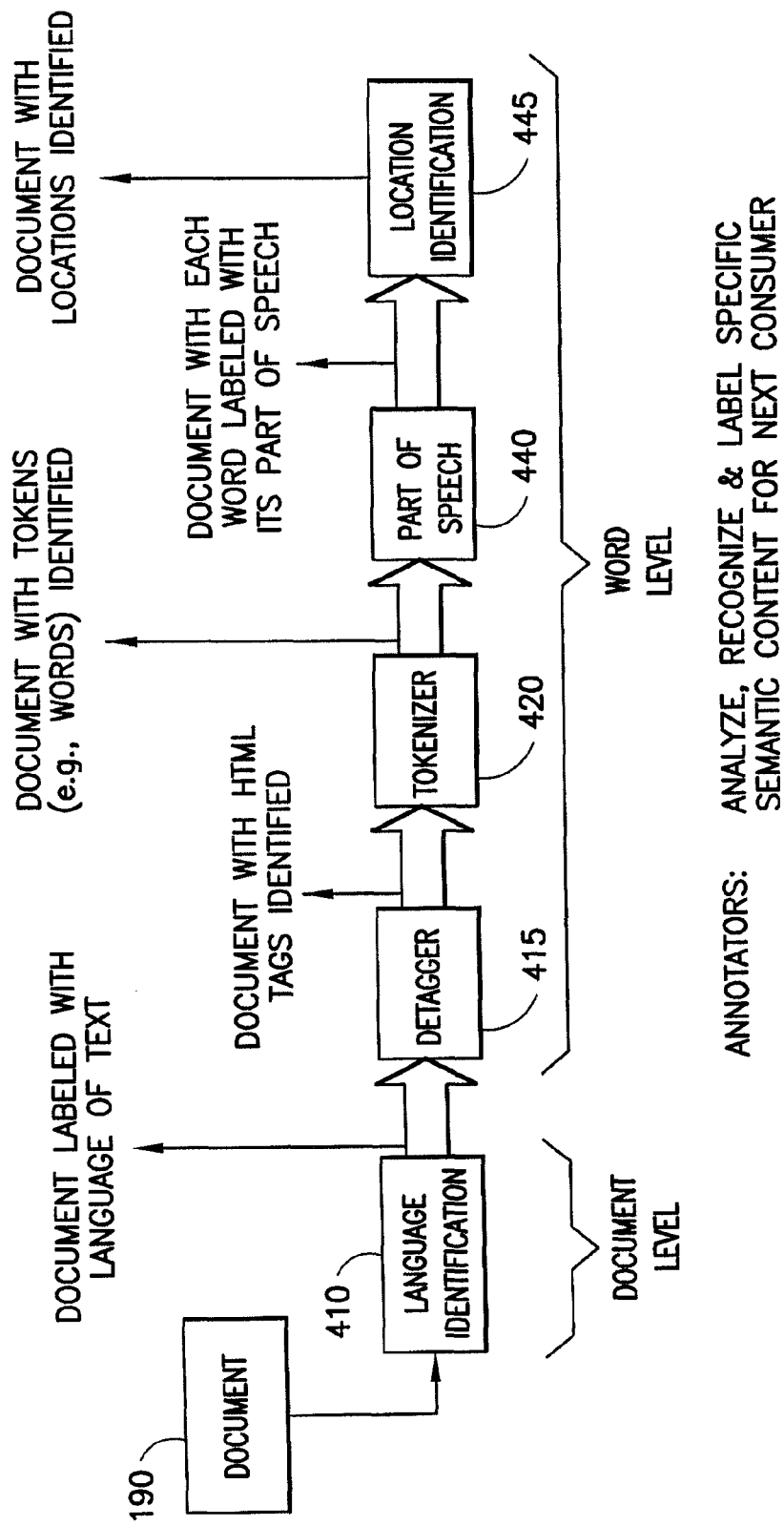
FIG. 14 is a block diagram that depicts operation of annotators.

FIG. 14 provides a representation of the operation of exemplary annotators 1220, 1221, 1222 of FIG. 12 that operate at the document and at the word level. In this example the document-level language identifier 410 is followed by a detagger 415 (for identifying HTML tags, followed by the tokenizer 420, followed by the POS annotator 440, followed by the location identification annotator 445.

Relations

Figure 15:
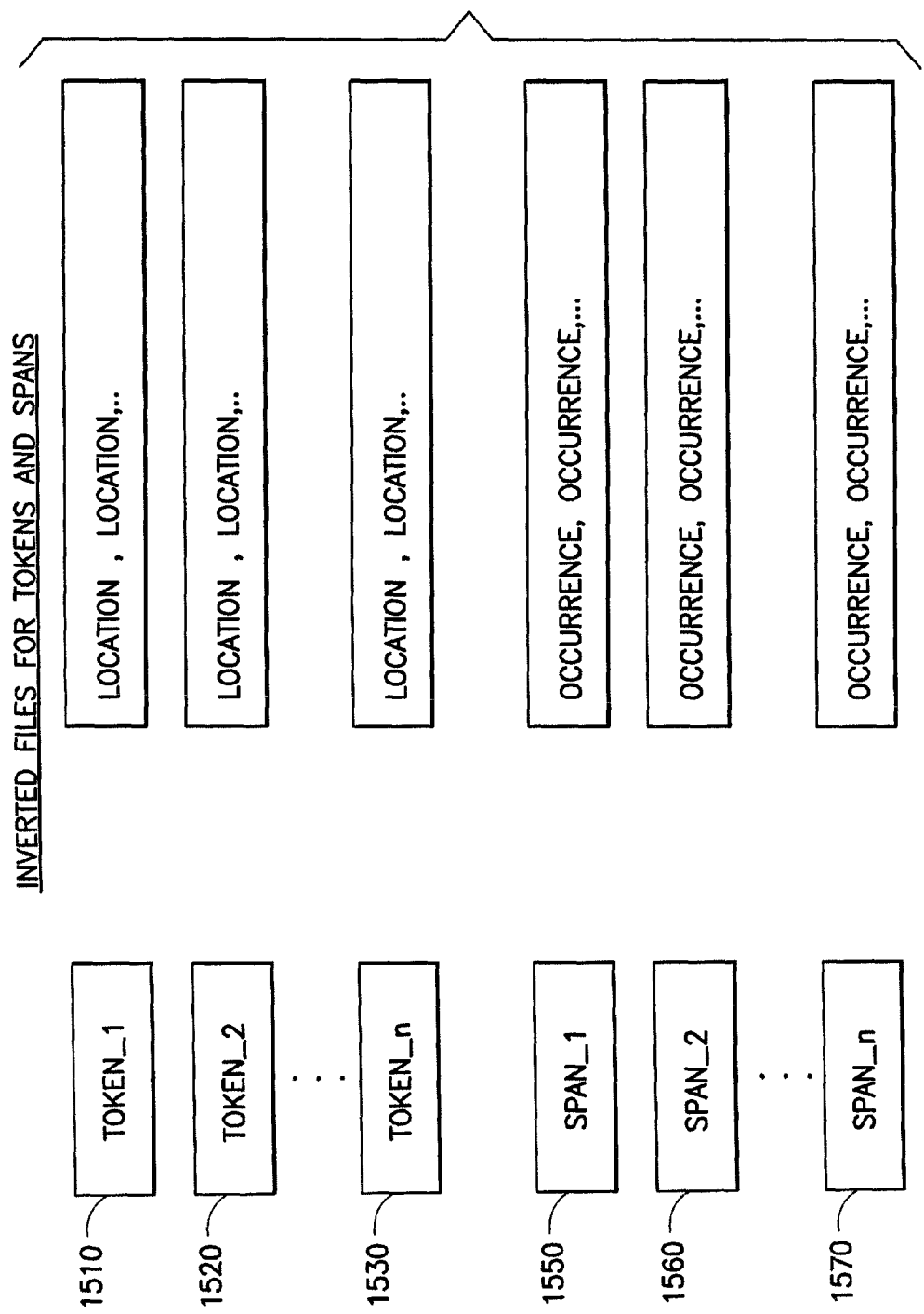
FIG. 15 is a block diagram indicating relationships between tokens and spans, and is an example of an inverted file system.
Figure 16:
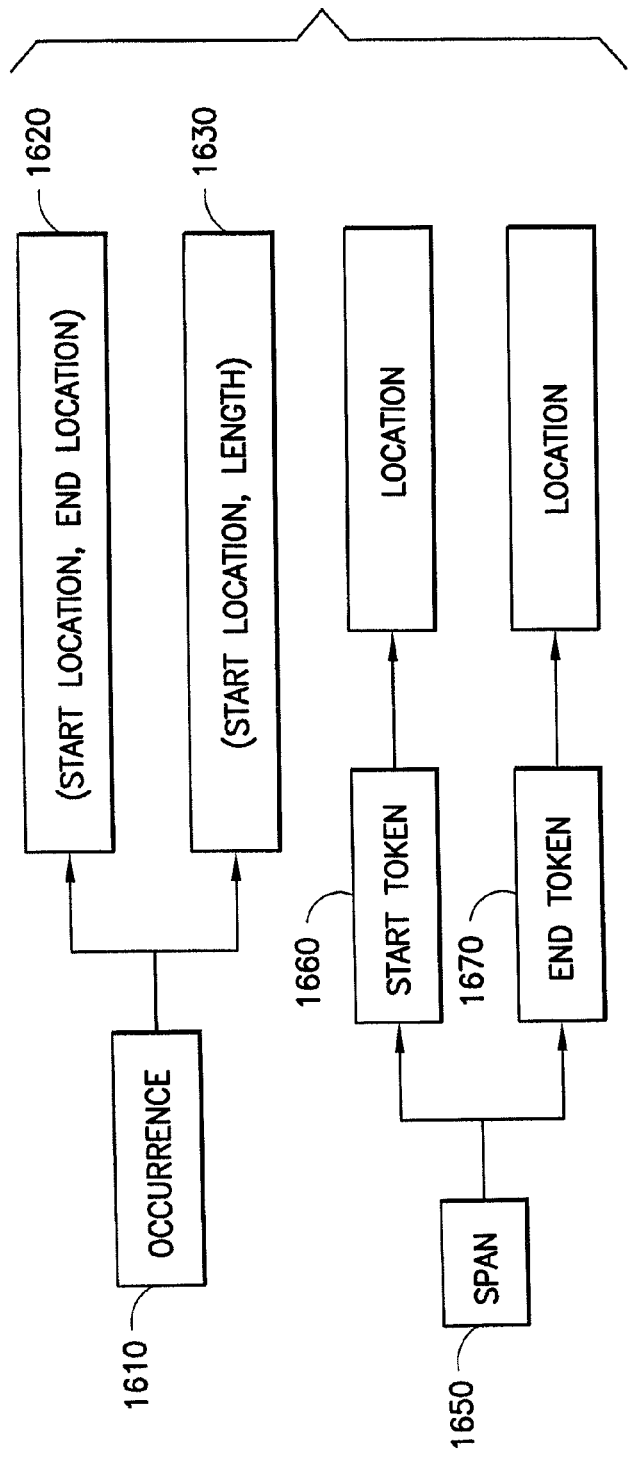
FIG. 16 is a block diagram that provides alternative representations for span occurrences.

FIG. 15 shows a representation for inverted files for tokens 1510, 1520, 1530 and spans 1550, 1560, 1570, while FIG. 16 is a diagram that provides alternative representations for span occurrences. In FIG. 16, an occurrence 1610 is defined as having a start location and end location 1620, or a start location and a length 1630. A Span 1650 is defined as having at least a start token 1660 and an end token 1670, that are then further specified as to location.

Figure 17:
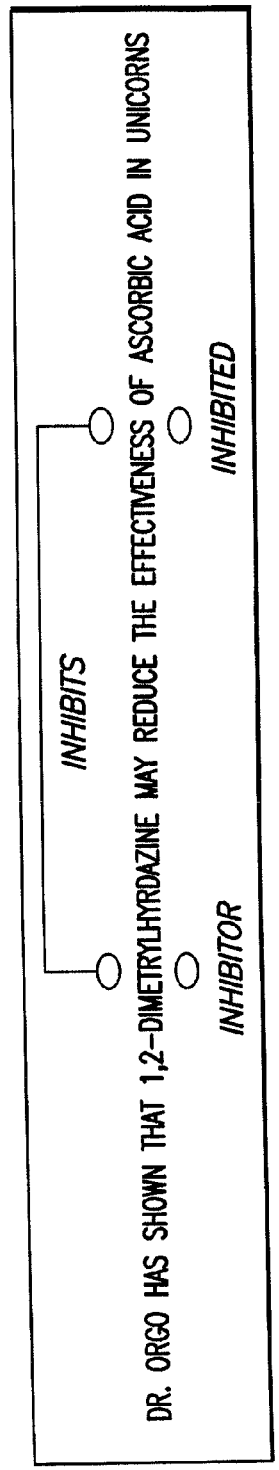
FIG. 17 is a diagram exemplifying a relationship with spans in a pre-processing stage.
Figure 18:
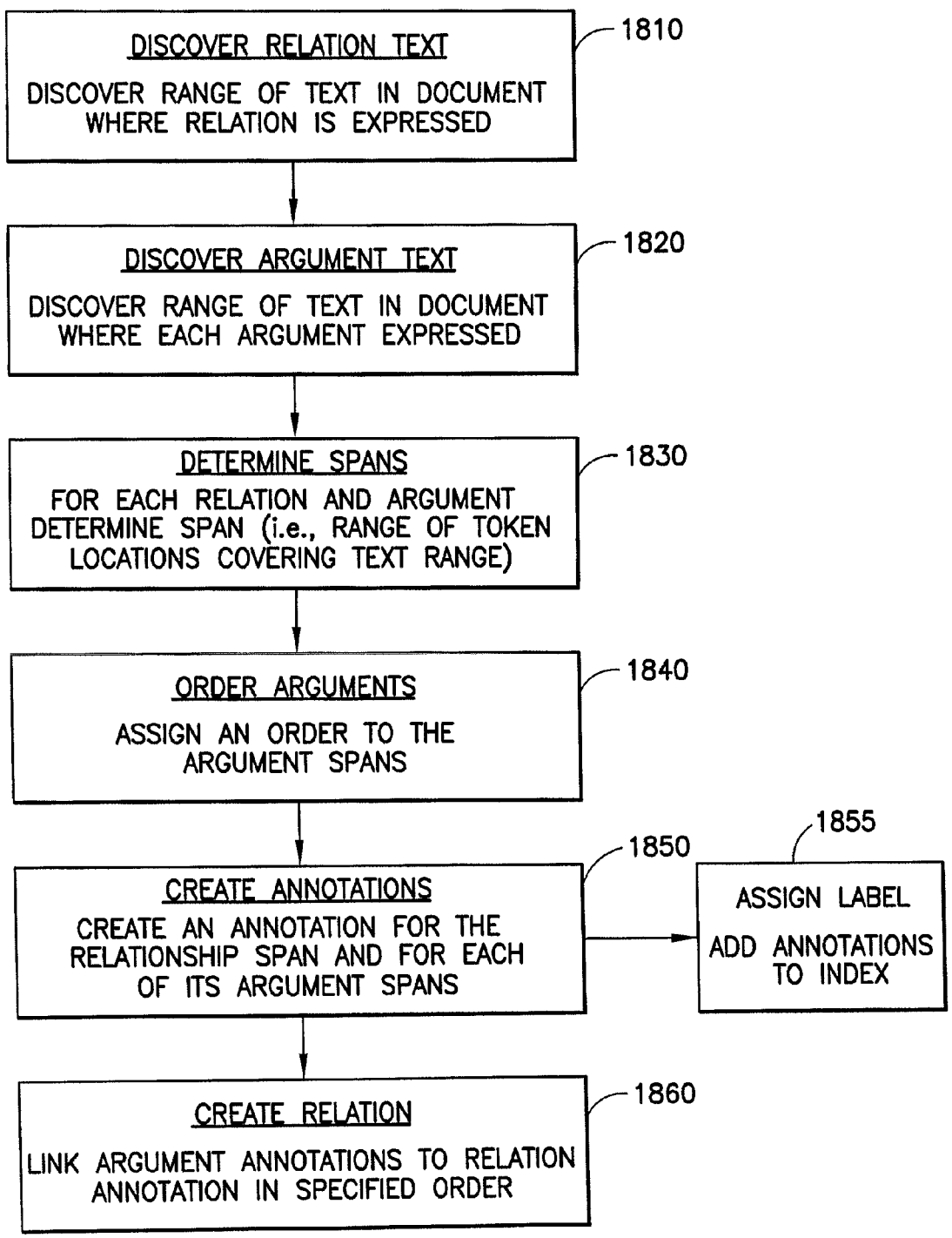
FIG. 18 is a flow chart describing pre-processing for discovering relations in text.
Figure 19:
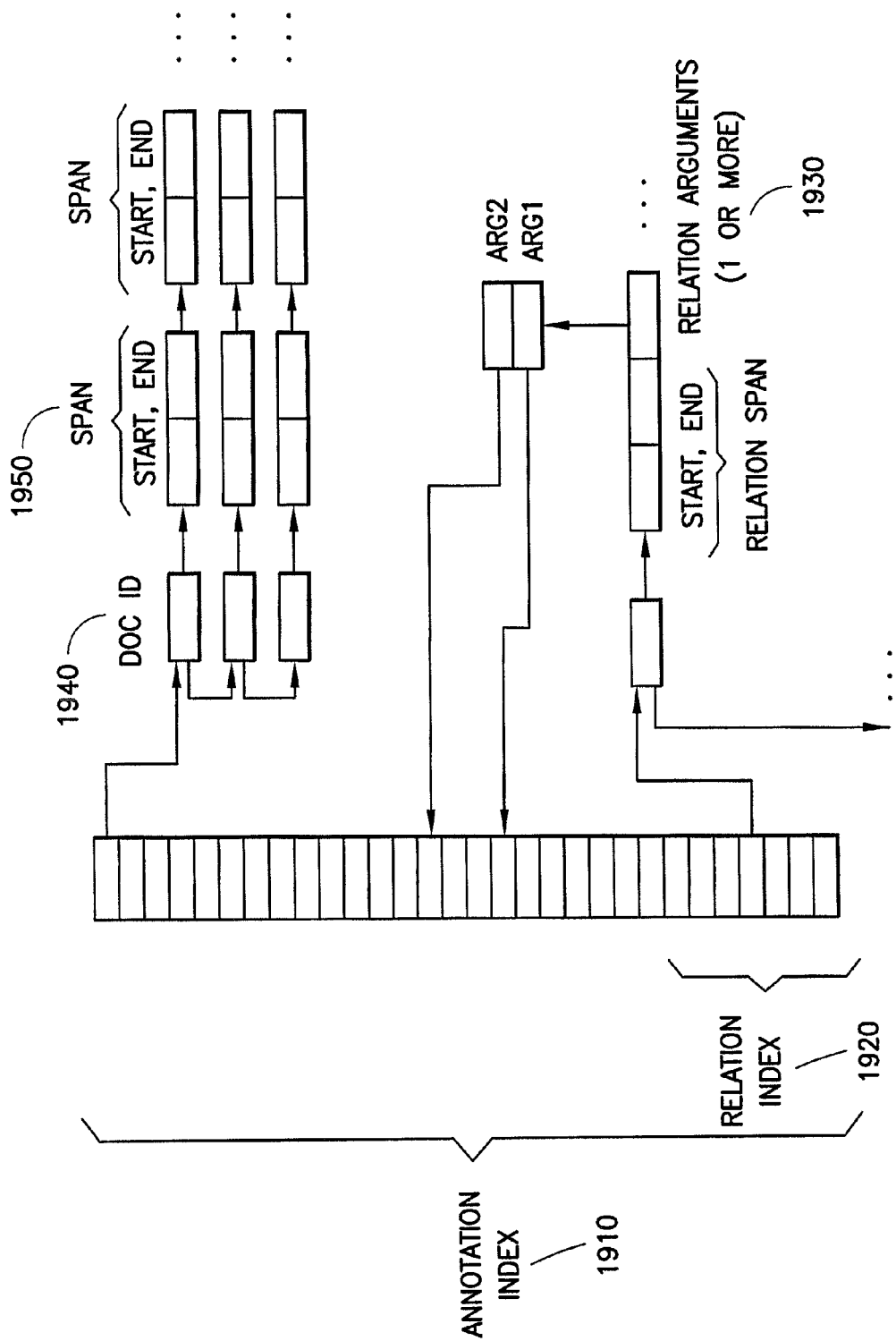
FIG. 19 is a block diagram presenting aspects of relationships between the annotation index, a relation index, spans and arguments.

FIGS. 17, 18 and 19 present examples of representing relations with spans in a pre-processing step executed by the TAE 130 to discover relations in the document. In the example provided in FIG. 17, spans containing relation arguments with the relation name "Inhibits" are annotated. In this example a first chemical compound has been identified as an Inhibitor, and a second chemical compound has been identified as being Inhibited, and the relationship is one of Inhibits. The annotation of the spans corresponds to terms with the argument roles "Inhibitor" and "Inhibited", and the annotations over the spans are indexed.

A flow chart describing this process is provided in FIG. 18. In FIG. 18, a first step 1810 involves discovering relation text, i.e., discovering a range of text in a document where a relation is expressed. A second step 1820 discovers argument text, i.e., discovering a range of text in the document where each argument is expressed. For each relation and argument spans are determined at step 1830, the argument spans are ordered in step 1840, and annotations are created for the relationship span and for each of its argument spans in step 1850. Labels are assigned and added to an index at step 1855, and relations are created at step 1860 by linking argument annotations to relation annotations in a specified order.

FIG. 19 provides a graphic presentation of relationships with a span index. In FIG. 19, an annotation index 1910 incorporates a relation index 1920 that relates to relation arguments 1930 that includes document identification 1940, where each document 190A includes spans 1950 delineated by Start and End locations.

Locations and Search

In general, a set of token locations is monotonic. However, based on the foregoing discussion a set of token locations can be one of contiguous or non-contiguous, and a token or a set of tokens may be spanned by at least two annotations.

An annotation type can be of any semantic type, or a meta-value. Thus, the search engine 110 may be responsive to a query that comprises at least one of an annotation, a token, and a token in relation to an annotation.

The relationship data structure can contain at least one relationship comprised of arguments ordered in argument order, where a relationship is represented by a respective annotation, and where the search engine 110 can be further responsive to a query that comprises a specific relationship for searching data store 120 to return at least one document having the specific relationship. The search engine 110 can further return at least one argument in a specific relationship. The search engine 110 can further return a plurality of ordered arguments. At least one argument can comprise an argument annotation linked to the annotation. The search engine 110 can also return at least one argument in response to a query that is not explicitly specified by the query. An annotation can comprise a relation identifier, and the relation identifier can be comprised of at least one argument. An argument that comprises the relation identifier can comprise, as examples, at least one other annotation, a token, a string, a record, a meta-value, a category, a relation, a relation among at least two tokens, and a relation among at least two annotations. The relation identifier can also comprise a logical predicate.

In similar spirit, the relationship data structure (comprising a relationship name and arguments ordered in argument order), represented by a respective annotation, can appear in the search engine 110 queries. Such a query specifies a relationship structure (or a part of same) for searching data store 120 to return at least one document having the specified relationship. The search engine 110 can further return one or more arguments in the specified relationship. When the search engine 110 returns one or more of ordered arguments, each argument can comprise an argument annotation linked to the annotation. Note that in response to a query the search engine 110 can also return at least one argument that is not explicitly specified by the query.

An annotation of a relationship can include a relation identifier, e.g., a logical predicate. Such annotation might also incorporate one or more arguments. An argument can comprise, as examples, at least one other annotation, a token, a string, a record, a meta-value, a category, a relation, a relation among at least two tokens, and a relation among at least two annotations.

Views

Figure 20:
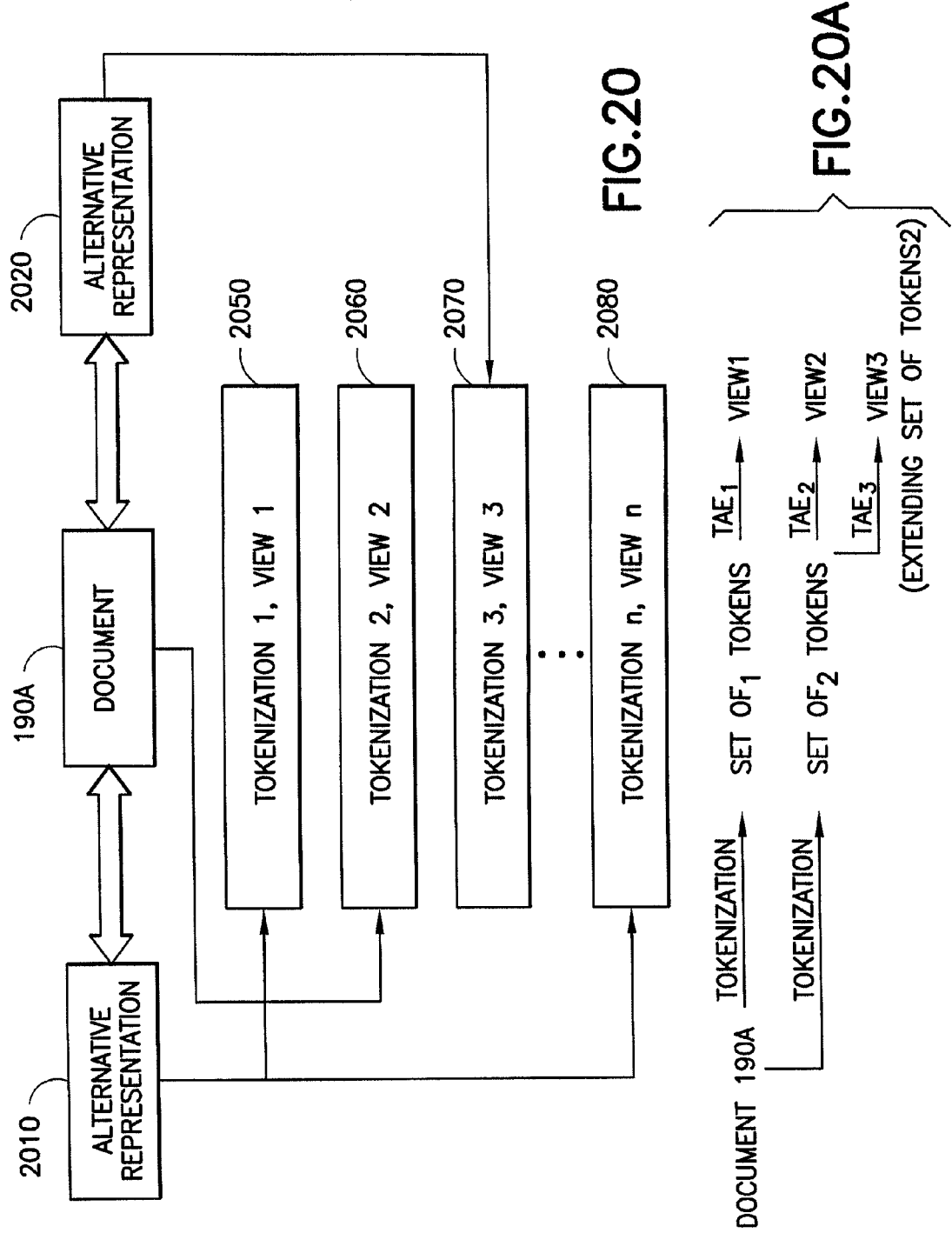
FIG. 20 is a block diagram presenting an example of views of alternative representations of a document, and corresponding tokenization thereof.

Acknowledging that different TAEs 130 may produce different tokenizations of the same document(s), a UIMA-compliant Search Engine 110 preferably supports different tokenizations, or different sets of indexing units for the same documents. These different tokenizations may result in different "views" of a document. An example of views based on, or derived from, different tokenizations of a document 190A is provided in FIG. 20, wherein a first alternative representation 2010 and a second alternative representation 2020 can result in a plurality of views, shown as views 2050, 2060, 2070, 2080.

In general, a view is an association of a document 190A with a tokenization. Thus, a view can be represented by pairing the document 190A identifier with the result of a tokenization. It can thus be seen that a different view represents a different tokenization of a document 190A. Referring to FIG. 20A, if TAE3 extends the tokenization of the set of tokens 2, e.g., by breaking words into stems and suffixes, this results in a new view (View 3).

Figure 21:
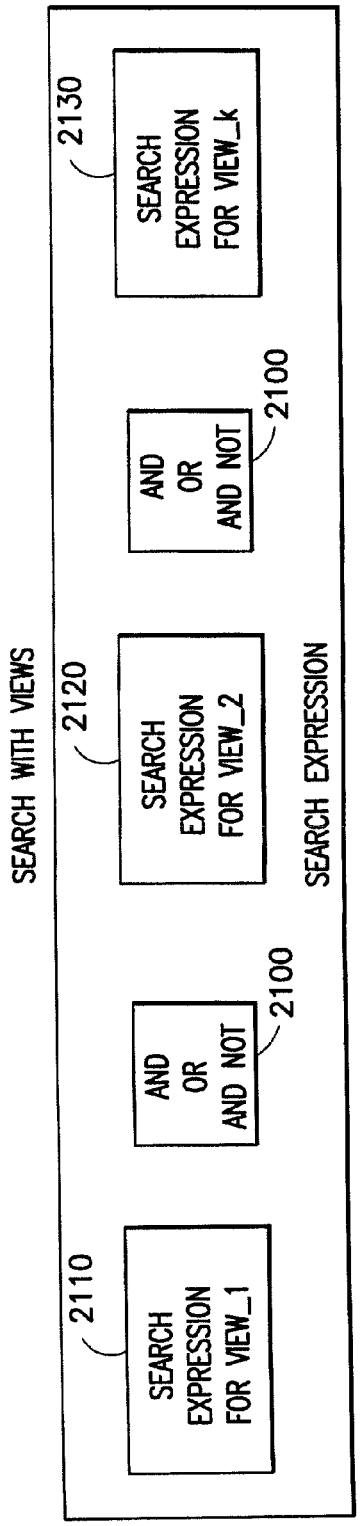
FIG. 21 is a relational diagram depicting aspects of a search using views.

FIG. 21 provides an illustration of aspects of searching with views using Boolean operators 2100 with search expressions 2110, 2120, 2130 for the different document views arising from different tokenizations of a single source document.

The operation of a TAE 130 is preferably not predicated on pre-existing views or decisions made by the application 170 regarding the relevance of the content produced by the TAE 130. The UIMA 100 ensures that TAEs 130 may be developed independently of the application 170 in which they are deployed. Therefore, it is preferably the responsibility of the application 170 to create views. Preferably, if two TAEs 130 are run on the same document 190A and produce results based on different tokenizations, these results are not merged into a single view of the document. Accordingly, the application 170 provides the results of each TAE 130 to the search engine 110 as a separate view.

In a presently preferred embodiment the search engine 110 is configured to assimilate views of at least one of two levels. The first level is a "Shallow Understanding" level, where the Search Engine 110 treats multiple views of a document 190A as completely separate entities that are related only in that they ultimately point to the same document text. Ideally, such a search engine 110 would report the document 190A only once in its results list, even if multiple views of that document matched a query. The second level is a "Deeper Understanding" level, where the search engine 110 is aware of views so that queries can span multiple views on the document 190A. For example, if in the query "X and Y", the term X appeared in view one of a document and the term Y appeared in view two of the same document, the document 190A would be returned by the search engine 110. Note that the same query would not return the same document in the "Shallow Understanding" embodiment of the search engine 110.

A feature of the UIMA 100 is the ability to provide overlapping annotations, which provides a significant improvement over conventional XML representations. An example of overlapping annotations, which can also be referred to as "cross-over spans", is the phrase "IBM data warehousing products", where a "double noun" annotation can be attached to all consecutive word pairs: "IBM data", "data warehousing" and "warehousing products". Attaching labels of this type is very useful to differentiate, for example, between a reading of "storing data created by IBM" versus "IBM product for storing data".

As has been discussed, preferably there is at least one inverted file system for storing tokens (see FIG. 15), and at least one inverted file system for storing, for each of the views, the annotations, a list comprising occurrences of respective annotations and, for each listed occurrence of a respective annotation, a set comprised of a plurality of token locations, where a given token location may be spanned by at least one annotation (see FIG. 13).

As should be apparent, an inverted file system differs from a conventional file system at least in how individual files are indexed and accessed. In a conventional file system there may be simply a listing of each individual file, while in an inverted file system there exists some content or meta-data, such as a token, associated in some manner with a file or files that contain the content or meta-data. For example, in the conventional file system one may begin with a file name as an index to retrieve a file, while in an inverted file system one may begin with some content or meta-data, and then retrieve a file or files containing the content or meta-data (i.e., files are indexed by content as opposed to file name).

The semantic search engine 110 may be responsive to a query that comprises a logical combination of at least two predicates, where a first predicate pertains to a first view and a second predicate pertains to a second view, and returns at least one document that satisfies the logical combination of the predicates.

Figures 33C, 34:
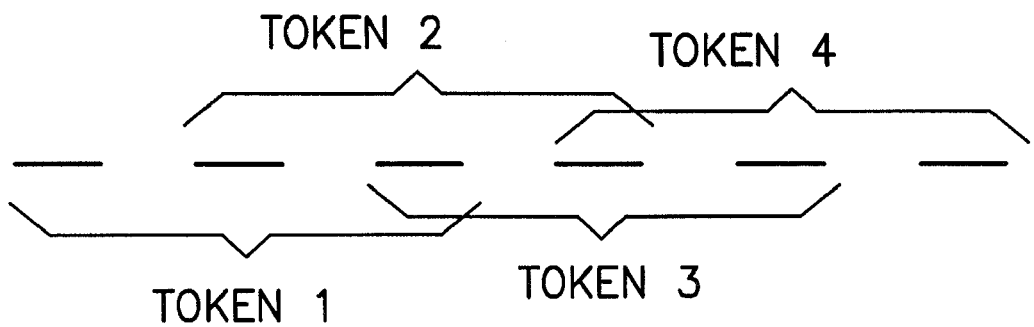
FIG. 33C is an example of pseudo-code for CAS-based data access, and shows the use of iteration over tokens.
FIG. 34 depicts an example of an n-gram (tri-gram) tokenization of document text.

In the preferred embodiment of the invention the tokenization corresponds to, and is derived from, as examples, at least one of a plain text document, a language translation of a document, a summary of a document, a plain text variant of a marked-up document, a plain text variant of a HTML document and/or a multi-media document, such as one containing various multi-media objects such as text and an image, or text and a graphical pattern, or text and audio, or text, image and audio, or an image and audio, etc. The tokenization can be based on objects having different data types. The tokenization may also be derived from an n-gram tokenization of a document. For example, FIG. 34 depicts an example of a tri-gram tokenization of document text.

It should be noted that the UIMA 100 does not require multiple instances of TAEs 130 to create multiple views of a document. Instead, one TAE 130 may be used to create one view, and then reconfigured by selecting one or more different annotators (see FIGS. 2, 3 and 4) and/or by re-arranging annotators, and then the document processed again to create another view of the document.

III.B. Document Store

The Store 120, or Document Store 120, is the main storage mechanism for documents and document meta-data. Preferably, and not as a limitation, the Store 120 uses the Web Fountain (WF) model and assumes a simple API that allows document meta-data to be stored and accessed as key-value pairs associated with documents.

Documents 190A in the Data Store 120 are preferably represented as inverted files with respect to a particular ordering of the documents in the Data Store 120.

In the event that an application requires final or intermediate results of a Text Analysis Engine 130 (an analysis structure) to persist, the analysis structure is preferably stored in the key-value structure associated with the document 190A as meta-data in the Store 120. The analysis structure may be represented in a binary form as a BLOB that can be interpreted by the Common Analysis System (CAS) 210 component, although other forms may be used. In some embodiments, the storage mechanism for the search engine's index is the Document Store 120.

III.C Analysis Engine

This section provides an overview of aspects of the TAE 130, and then considers further principles of operation for the TAE 130.

As was previously discussed, FIG. 2 presents a TAE 130 as an analysis engine 200, wherein a diagram of the framework of the analysis engine 200 is provided. The UIMA 100 specifies an interface for an analysis engine 200; roughly speaking it is "CAS in" and "CAS out." There are other operations used for filtering, administrative and self-descriptive functions, but the main interface takes a CAS 210 as input and provides a CAS 210 as output.

FIG. 3, also previously introduced, presents a TAE 130 as an aggregate analysis engine 300, wherein a diagram of the framework of the aggregate analysis engine 300 is provided.

At run-time, an aggregate analysis engine 300 is given the order in which to execute the constituent text analysis engines 221, 222, 223. The Analysis Structure Broker 320 ensures that each text analysis engine 221, 222, 223 has access to the CAS 210 according to a specified sequence.

Preferably, any program that implements the interface shown in FIG. 2 may be used as an analysis engine component in an implementation of UIMA 100. However, as part of the UIMA 100, the analysis engine 200 may include a framework that supports the creation, composition and flexible deployment of primitive analysis engines 200 and aggregate analysis engines 300 on a variety of different system middleware platforms. Aspects of TAE 130 are now discussed in further detail.

The Text Analysis Engine (TAE) 130 is the component responsible for discovering and representing semantic content in text. The TAE 130 may be tasked with the following exemplary activities: discovering syntactic and semantic entities represented by segments of text in a document (for example, sentences, titles, paragraphs, people, places, events, times, biological entities, relations, chemical entities etc.); discovering relations in text; generating summaries of a document; translating a document to a different language; and classifying a document in taxonomy.

Preferably, the TAE 130 takes as input a document 190A and produces an analysis structure, that represents semantic information inferred from the text of document. The TAE 130 may also be initiated with a document and an initial analysis structure that it modifies as a result of operation.

TAEs 130 are typically implemented by orchestrating a collection of annotators 220 (which could also be interchangeably referred to as "miners"). Annotators 220 are components having distinct responsibilities to use the original document 190A and/or prior analysis results to discover and record new semantic content. Annotators 220 are preferably, but are not required to be, organized in a pipeline architecture (see, for example, FIGS. 4A, 12 and 14), each of which operates on the document 190A, and on the results of prior annotators 220 in the pipeline. This type of arrangement is introduced in FIG. 12. A further example of a series of annotators 220 used to identify locations in a document appears in FIG. 14. As was previously noted, however, parallel arrangements of annotators 220 can also be provided, as is shown in FIG. 4B.

At a high level, consider that the TAE 130 is a component responsible for discovering semantic content in raw text. The TAE 130 may be used in an application's pre-processing phase to discover, for example, semantic entities in a corpus that represent locations, events, people and/or other similar types of information. At query time, the application 170 may analyze the query to determine that the query is seeking information related to some event that occurred at a certain time in a particular location. Preferably, the application 170 then queries the search engine 110 to deliver documents that contain an event plus the given location and time. To perform this query efficiently the application 170 expects that the semantic entities (particularly events in this case) discovered in the preprocessing phase are indexed in the search engine 110.

It is preferred that the annotators 220 are developed without control or communication dependencies, otherwise they may be difficult to understand and reuse by more than one application 170.

The TAE 130 makes the insulation of annotator logic possible. Therefore, the TAE 130 may be considered as the container in which annotators 220 are configured and deployed. Preferably, it is the role of the TAE 130 to: orchestrate the flow of control and the communication between Annotators 220; provide Annotators 220 with a uniform interface to Text Analysis Resources (e.g. dictionaries); and, to publish a single interface for an application 170 to access the combined functionality of a collection of annotators 220.

The TAE 130 specifies a functional interface. That is, the TAE 130 accepts a document 190A (and optionally an initial analysis structure) as input and produces an analysis structure, that represents semantic content inferred from the document. The TAE 130 itself does not specify the technical interface to this functionality. Access to the TAE 130 may be provided through a variety of means.

While a TAE 130 may be directly included (co-located) within an application 170, the TAE 130 may also be deployed as a distributed service (e.g. web services). A TAE Service wraps a TAE 130 and publishes a technical interface to the TAE 130. A deployed TAE Service listens for requests to process documents, passes those documents on to the TAE 130, obtains the analysis structure produced by the TAE 130 and returns the analysis structure to the caller.

Preferably, the UIMA 100 provides TAE Service implementations for several common distributed object technologies and protocols (e.g. SOAP, MQSeries, WebSphere, Mail). The UIMA 100 also preferably provides a naming service with which TAE Services are registered, so that clients can locate needed services.

Generally, there are two types of TAEs 130: primitive 200 and aggregate 300. A primitive TAE 200 is a container for one annotator 220. It insulates the annotator 220 from control and communication details and provides the annotator 220 with a uniform interface to Text Analysis Resources. An aggregate TAE 300 delegates its work to one or more other TAEs that may be either primitive 200 or aggregate TAEs 300. The aggregate TAE 300 uses the Analysis Structure Broker (ASB) 320 to manage communication between the constituent TAEs 221, 222, 223.

Common Analysis System 210

The Common Analysis System (CAS) 210 is provided as the common facility that all Annotators 220 use for accessing and modifying analysis structures. Thus, the CAS 210 enables coordination between annotators 220 and facilitates annotator 220 reuse within different applications 170 and different types of architectures (e.g. loosely vs. tightly coupled). Referring again to FIG. 14, the CAS 210 can be considered to constrain operation of the various annotators 410-445, i.e., the workflow, via the Type System 1110 shown in FIG. 11.

Figure 22:
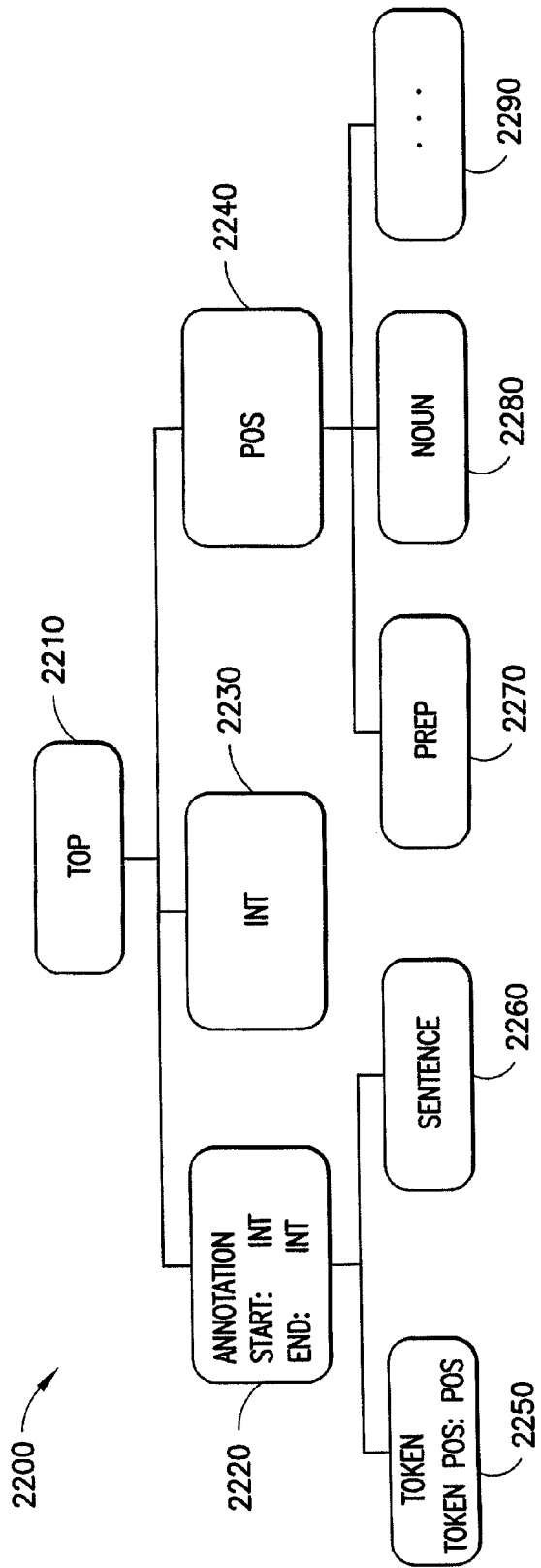
FIG. 22 is a relational chart depicting aspects of a data model.

The CAS 210 principally provides for data modeling, data creation and data retrieval functions. Data modeling preferably defines a tree hierarchy of types, as was shown in FIG. 10A (and see as well FIG. 5). The types have attributes or properties referred to as features (FIG. 6). In preferred embodiments, there are a small number of built-in (pre-defined) types, such as integer (ints), floating point (floats) and strings. The data model is defined in the annotator descriptor, and shared with other annotators. A data modeling example is provided in FIG. 22. The exemplary data model 2200 provided includes an assembly of types including a Top 2210, Annotation 2220, Int 2230, POS 2240, Token 2250, sentence 2260, preposition 2270, noun 2280, and other further types 2290. The data model 2200 can be considered a combination of the inheritance structure, such as the exemplary single inheritance structure disclosed in FIG. 10A, and the Component List, such as the exemplary Component List disclosed in FIG. 7.

CAS 210 data structures may be referred to as "feature structures." To create a feature structure, the type must be specified (see FIG. 5). Annotations (and other feature structures) are stored in indexes. The feature structures may be accessed via iterator(s) 1125 over the indexes (reference can again be made to FIG. 11).

FIGS. 33A and 33B illustrate exemplary pseudo-code that is useful for explaining the operation of the CAS 210. This pseudo-code shows the use of the Type system and feature structures in the creation of a verb-type feature structure, and its insertion into the CAS 210 index.

The CAS 210 may be considered to be a collection of methods (implemented as a class, for example, in Java or C++) that implements an expressive object-based data structure as an abstract data type. Preferably, the CAS 210 design is largely based on a TAE 130 Feature-Property Structure, that provides user-defined objects, properties and values for flexibility, a static type hierarchy for efficiency, and methods to access the stored data through the use of one or more iterators 1125 (see FIG. 11).

The abstract data model implemented through the CAS 210 provides the UIMA 100 with, among other features: platform independence (i.e., the type system is defined declaratively, independently of a programming language); performance advantages (e.g., when coupling annotators 210 written in different programming languages through a common data model); flow composition by input/output specifications for annotators 210 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 210 provides the annotator 220 with a facility for efficiently building and searching an analysis structure. The analysis structure is a data structure that is mainly composed of meta-data descriptive of sub-sequences of the text of the original document 190A. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Figure 24:
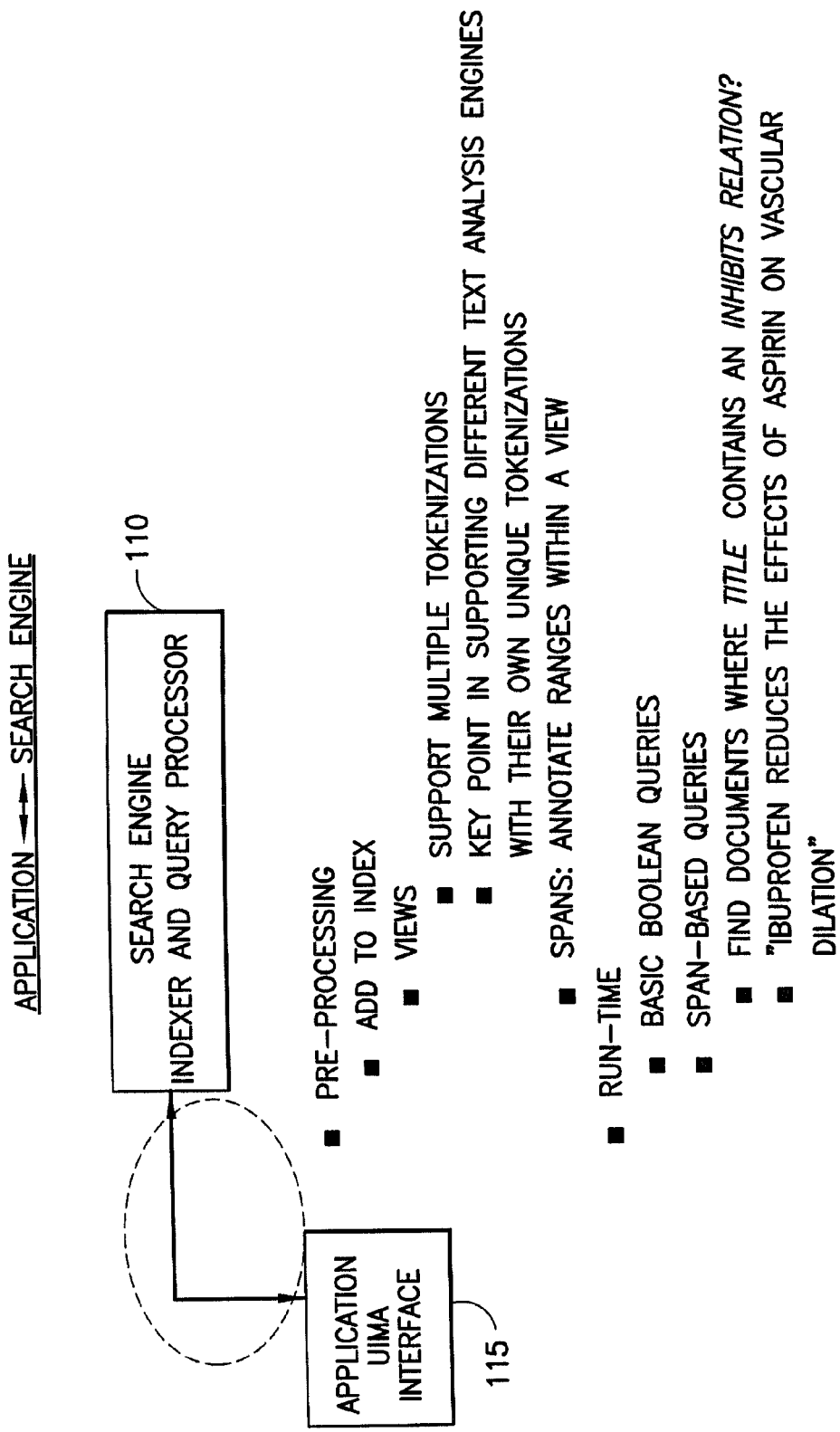
FIG. 24 is a block diagram providing aspects of pre-processing and run-time.

Typically an Annotator's 220 function is to analyze text, as well as an existing analysis structure, to discover new instances of the set of annotations that it is designed to recognize, and then to add these annotations to the analysis structure for input to further processing by other annotators 220. For example, the specific inhibits relationship discussed above in relation to FIG. 17 can be discovered by an annotator 220 that is specifically designed identify this type of relationship, in this case by recognizing that the phrase "may reduce the effectiveness of" implies an inhibitory relationship between the two chemical compound names before and after the phrase. Other phrases of a similar nature that this particular annotator 220 may recognize as being inhibitory can be "reduces the effects of" (see FIG. 24) and "suppresses the operation of".

In addition to the annotations, the CAS 210 may store the original document text, as well as related documents that may be produced by the annotators 220 (e.g., translations and/or summaries of the original document). Preferably, the CAS 210 includes extensions that facilitate the export of different aspects of the analysis structure (for example, a set of annotations) in an established format, such as XML.

In simple terms, a TAE Description is an object that describes a TAE 130. In preferred embodiments, a TAE Descriptor is an XML document that represents a TAE Description. The TAE Description contains all of the information needed to initiate and use the TAE. However, the TAE Description does not specify, per se, how the TAE 130 will be deployed (for example, whether it will be tightly or loosely coupled).

The TAE Descriptions may exist in different states of completeness. For example, the developer of the TAE 130 may provide a TAE Description that defines the configuration parameters but does not set any of them. The application developer then takes that TAE Description and programmatically assigns values for the parameters.

Common Analysis System 210 (CAS) Detail. The CAS 210 is that portion of the TAE 130 that defines and stores annotations of text. The CAS API is used both by the application and the annotators 220 to create and access annotations. The CAS API includes, preferably, at least three distinct interfaces. A Type system controls creation of new types and provides information about the relationship between types (inheritance) and types and features. One non-limiting example of type definitions is provided in FIG. 5. A Structure Access Interface handles the creation of new structures and the accessing and setting of values. A Structure Query Interface deals with the retrieval of existing structures. More detail on the sub-components of the CAS 210 is now provided.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Reference may be had to FIG. 6, wherein exemplary feature definitions are provided for domains, each feature having a range.

In some embodiments, the creation and maintenance of sorted indexes over feature structures may require a commit operation for feature structures. On a commit, the system propagates changes to feature structures to the appropriate indexes.

The Structure Query Interface permits the listing of structures (iteration) that meet certain conditions. This interface can be used by the annotators 220 as well as by applications 170 in order to access the results produced by the TAE 130. Preferably, this interface is intuitive and facilitates reuse of the TAEs 130 in different applications 170.

There exist different techniques for constructing an iteration over the structures in the CAS 210. First, in filtered iteration constraints or filters on feature structures are constructed. Preferably, these constrain int and float values with inequality constraints; constrain string values with equality; constrain the type of a structure; embed basic constraints under paths; and, combine constraints with Boolean operators AND, OR and NOT.

A new iterator 1125 may be employed where all elements in the iteration meet the constraint. A special case of an iterator 1125 may exist for annotations, where it is preferable to iterate over annotations of some type (e.g., sentence), and for each element in the iteration, list all annotations of another type (e.g., token) that are contained in the span of the embedding annotation. Embedded structure iterators may be constructed through filtered iterators. Providing a specialized API for this purpose is both convenient and allows for an optimized implementation.

FIG. 33C is an example of pseudo-code for CAS 210-based data access, and shows the use of iteration over tokens.

In general, the underlying design of the TAE 130 recognizes three primary principles that encourage and enable component reuse; support distinct development roles insulating the algorithm developer from system and deployment details; and, support a flexible variety of deployment options by insulating lower-level system middleware APIs. Aspects of implementation of these three principles are now discussed.

Encourage and Enable Component Reuse

Encouraging and enabling component reuse achieves desired efficiencies and provides for cross-group collaborations. Three characteristics of the framework for the TAE 130 address this objective. These characteristics are: recursive structure; data-driven; and, self-descriptive. Each one is described.

Recursive Structure: A primitive analysis engine 200, as illustrated in FIG. 2, is composed of an Annotator 220 and a CAS 210. The annotator 220 is the object that implements the analysis logic (e.g., tokenization, grammatical parsing, entity detection). The annotator 220 reads the original document content and meta-data from the CAS 210. The annotator 220 then computes and writes new meta-data to the CAS 210. Similar to a nested programming model, the aggregate analysis engine 300 is an example of a recursive structure ensures that components may be reused in combination with one another, while insulating their internal structure.

Data-Driven: Preferably, an analysis engine's 200 processing model is strictly data-driven. In the preferred embodiment, this implies that an annotator's 220 analysis logic may be predicated only on the content of the input, and not on the specific analysis engine(s) 200 that it may be combined with, or the control sequence in which the annotator 220 may be embedded. This ensures that an analysis engine 200 may be successfully reused in different aggregate structures and different control environments, as long as the annotator's input requirements are met.

The Analysis Sequencer 310 of FIG. 3 is a component in the framework responsible for dynamically determining the next analysis engine 221, 222, 223 to receive access to the CAS 210. The Analysis Sequencer 310 is distinct from the Analysis Structure Broker 320, whose responsibility is to deliver the CAS 210 to the appropriate one of the text analysis engines 221, 222, 223, whichever it is, and wherever it may be located. The control logic of the Analysis Sequencer 310 is preferably separate from the analysis logic embedded in an Annotator 220, and separate from the Analysis Structure Broker's 320 concerns related to ensuring and/or optimizing the CAS 210 transport. This separation of functionality allows for the plug-and-play of different Analysis Sequencers 310. The Analysis Sequencer 310 enables simple iteration over a declaratively specified static flow to complex planning algorithms. Embodiments of the Analysis Sequencer 310 can be limited to linear flows between the analysis engines 221, 222, 223; however in more advanced applications dynamic and adaptive sequencing can be implemented. Accordingly, how much of the control specification is placed into a declarative representation, and how much is implemented in the Analysis Sequencer 310 for these advanced requirements is, among other things, application dependent.

Self-Descriptive: Ensuring that analysis engines 221, 222, 223 may be easily composed to form aggregates and reused in different control sequences is preferred for ensuring technical reusability. However, this may not be sufficient for enabling and validating reuse within a broad community of developers. To promote reuse, analysis engine 200 developers are enabled to discover which analysis engines 221, 222, 223 are available in terms of their capabilities.

Preferably, the data model of each analysis engine 200 is declared in XML, and then dynamically realized in the CAS 210 at run-time. In the UIMA 100, analysis engines 221, 222, 223 publish their input requirements and output specifications relative to this declared data model, and this information is used to register the analysis engines 221, 222, 223 in an analysis engine directory service. This service preferably includes a human-oriented interface that allows application developers to browse and/or search for analysis engines that meet their needs.

Support Distinct Development Roles

Various development roles have been identified, and taken into account in the UIMA 100. Included are independent sets of interfaces in support of different developer skill sets.

For example, language technology researchers that specialize in, for example, multi-lingual machine translation, may not be highly trained software engineers, nor be skilled in the system technologies required for flexible and scaleable deployments. One aspect of the UIMA 100 provides for efficient deployment of their work in a robust and scaleable system architecture.

As another example, researchers with ideas about how to combine and orchestrate different components may not themselves be algorithm developers or systems engineers, yet need to rapidly create and validate ideas through combining existing components. Further, deploying analysis engines 221, 222, 223 as distributed, highly available services or as collocated objects in an aggregate system requires yet another skill.

Accordingly, certain development roles have been identified. The UIMA 100 therefore may make use of independent sets of interfaces in support of different skill sets, such as the foregoing. These are now reviewed.

Annotator Developer The annotator developer role is focused on developing core algorithms ranging from statistical language recognizers to rule-based named-entity detectors to document classifiers.

The framework design ensures that the annotator developer need not develop code to address aggregate system behavior or systems issues like interoperability, recovery, remote communications, distributed deployment, etc,. Instead, the framework provides for the goal of focusing on the algorithmic logic and the logical representation of results.

This goal is achieved through using the framework of the analysis engine 200 and by requiring the annotator developer to understand only three interfaces, namely the Annotator interface, the Annotator Context interface, and the CAS interface. Preferably, the annotator developer performs the following steps: implement the Annotator interface; encode the analysis algorithm using the CAS interface to read input and write results and the AnnotatorContext interface to access resources; write the Analysis Engine Descriptor; and, call the Analysis Engine Factory.

To embed an analysis algorithm in the framework, the annotator developer implements the Annotator interface. Preferably, this interface is simple and requires the implementation of only two methods: one for initialization and one for analyzing a document.

It is only through the CAS 210 that the annotator developer accesses input data and registers analysis results. As was noted previously, the CAS 210 may contain the original document (the subject of analysis), plus the meta-data contributed by any analysis engines 221, 222, 223 that have run previously. This meta-data may include annotations over elements of the original document. The CAS 210 input to an analysis engine 220 may reside in memory, be managed remotely, or shared by other components.

Preferably, all external resources, such as dictionaries, that an annotator needs to consult are accessed through the Annotator Context interface. The exact physical manifestation of the data can therefore be determined by the deployer, as can decisions about whether and how to cache the resource data.

In a preferred embodiment the annotator developer completes an XML descriptor that identifies the input requirements, output specifications, and external resource dependencies. Given the annotator object and the descriptor, the framework's Analysis Engine Factory returns a complete analysis engine 220.

Analysis Engine Assembler. The analysis engine assembler creates aggregate analysis engines through the declarative coordination of component analysis engines. The design objective is to allow the assembler to build an aggregate engine without writing code.

The analysis engine assembler considers available engines in terms of their capabilities and declaratively describes flow constraints. These constraints are captured in the aggregate engine's XML descriptor, along with the identities of selected component engines. The assembler inputs this descriptor in the framework's analysis engine factory object and an aggregate analysis engine is created and returned.

Analysis Engine Deployer. The analysis engine deployer decides how analysis engines and the resources they require are deployed on particular hardware and system middleware. The UIMA 100 preferably does not provide its own specification for how components are deployed, nor does it mandate the use of a particular type of middleware or middleware product. Instead, the UIMA 100 provides deployers the flexibility to choose the middleware that meets their needs.

Insulate Lower-Level System Middleware

Human Language Technologies (HLT) applications can share various requirements with other types of applications. For example, they may need scalability, security, and transactions. Existing middleware such as application servers can meet many of these needs. On the other hand, HLT applications may need to have a small footprint so they can be deployed on a desktop computer or PDA, or they may need to be embeddable within other applications that use their own middleware.

One design goal of the UIMA 100 is to support deployment of analysis engines 221, 222, 223 on any type of middleware, and to insulate the annotator developer and analysis engine assembler from these concerns. This is done through the use of Service Wrappers and the Analysis Structure Broker 320. The analysis engine interface specifies that input and output are done via a CAS 210, but it does not specify how that CAS 210 is transported between component analysis engines. A service wrapper implements the CAS serialization and de-serialization necessary for a particular deployment. Within an Aggregate Analysis Engine 300, components may be deployed using different service wrappers. The Analysis Structure Broker 320 is the component that transports the CAS 210 between these components, regardless of how they are deployed.

The CAS 210 can be considered to be either loosely coupled or tightly coupled. A loosely coupled CAS 210 is one that represents one type system that is distributed over more than one memory, and may be encountered in, for example, a networked application of the UIMA 100. In this case the annotators, such as annotators 410-470, work in more than one memory. A tightly coupled CAS 210 is one that represents one defined type system located in one memory (or one machine), where the annotators, such as the annotators 410-470, share the same memory.

To support a new type of middleware, a new service wrapper and an extension to the Analysis Structure Broker 320 is preferably developed and plugged into the framework. The Analysis Engine 200 itself does not need to be modified in any way.

For example, Service Wrappers and Analysis Structure Broker 320 on top of both a web services and a message queuing infrastructure have been implemented. Each implementation involves different aspects and features regarding the specifics of the deployment scenarios. In general, web services include those applications that communicate by exchanging XML messages.

Generally, the UIMA 100 treats the User Interface (UI) as an application-specific component. How applications accept input, communicate results or dialog with the user are determined by the application 170.

IV. System Interfaces

Figure 23:
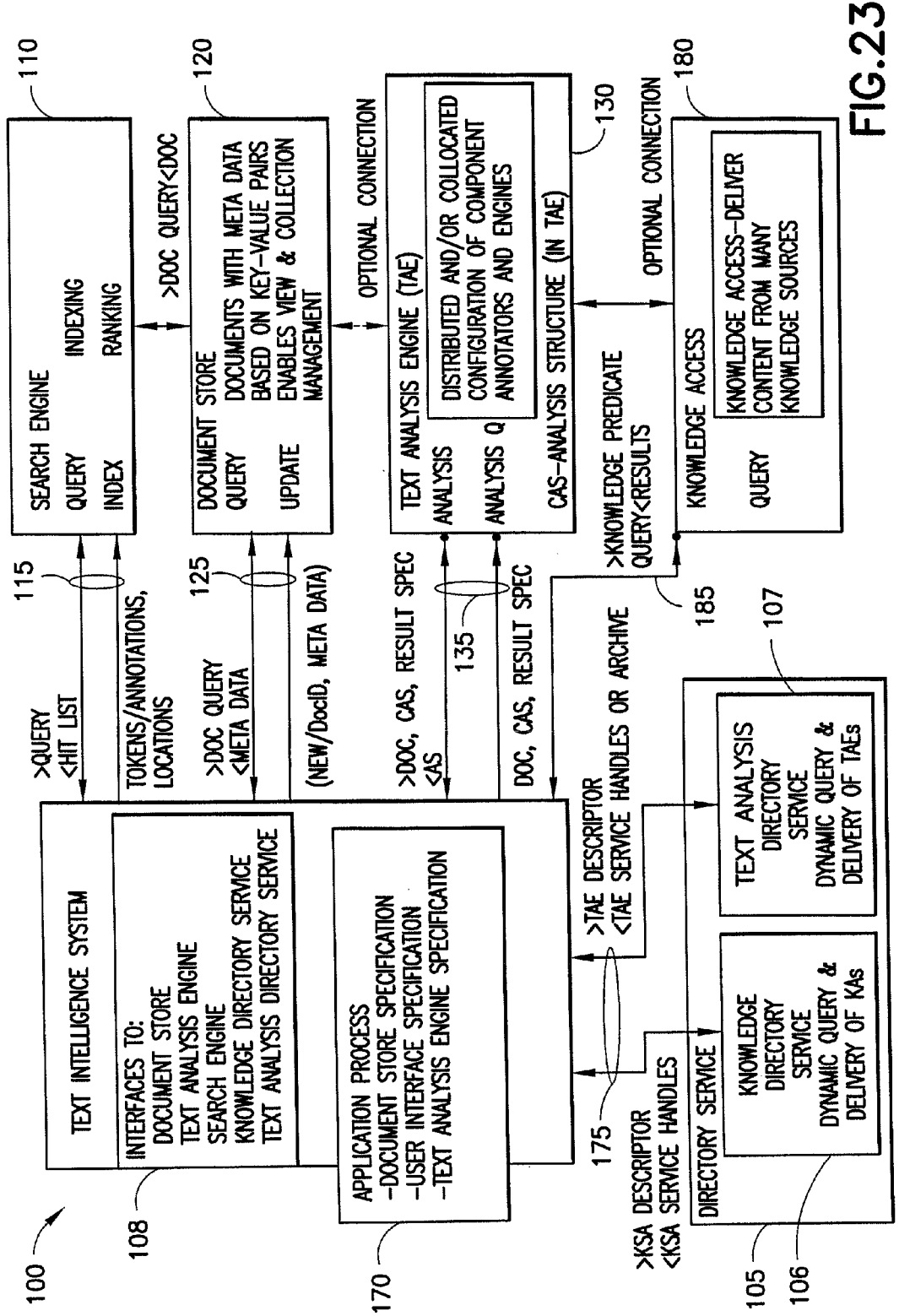
FIG. 23 is a block diagram depicting aspects of interfaces between components.

Various interfaces between top-level components of the UIMA 100 are now described. FIG. 23 provides a diagram similar to FIG. 1, however, FIG. 23 further includes aspects of the UIMA 100 interfaces, which are shown collectively as the text intelligence system 108. A more detailed look at aspects of the interface 115 between the application 170 and the search engine 110 is provided in FIG. 24. Other interfaces and the data flow carried by the interfaces are also shown. For example there is an interface 125 between the application 170 and the document store 120, an interface 135 between the application 170 and the TAE 130, an interface 185 between the application 170 and the knowledge access (structured information) 180, and an interface 175 between the application 170 and a director service 105 that includes a knowledge directory service 106 and a text analysis directory service 107.

Certain conditions are presented to assist with the description of the interface 115. For example, Views support multiple tokenizations whereas Spans are used to annotate ranges within a view. An example of a Span-based queries includes a query to find documents where a "title" field contains an "inhibits" relation. An exemplary result would be a document 190A containing "Ibuprofen reduces the effects of aspirin on vascular dilation." In preferred embodiments, various query languages may be used to define a span-based query. Preferably, an application 170 may use the search engine 110 during pre-processing and run-time (or query time).

During pre-processing the application 170 may retrieve documents, via the Text Intelligence System 108, from the document source 120 through interface 125 and pass them to one or more of the TAEs 130 over the interface 135. The TAE 130 returns the results in an analysis structure in the form of annotations on spans of tokens in the original text and/or other aggregate structures (for example, candidate glossary items, summarizations, or categorizations). With these results the application 170 may choose to add all or some of the discovered entities into the index for the search engine 110 so that these entities may be readily accessible during query time.

The search engine 110 provides to the application 170, via interface 115, means for identifying a View, and the application 170, via interface 115, pass entities, in a specified format, to the search engine 110 for indexing. To support a powerful integration of text analysis and search, the UIMA 100 expects that the search engine 110 provide the ability to index annotations over spans. For example, consider a semantic entity, "$US President", the search engine's 110 indexing interface allows the application 170 to index the semantic entity "$US President" over a span of tokens such as "John Quincy Adams".

At query time, the application 170 uses the query interface 115 of the search engine 110 for specifying Boolean queries. To support a powerful integration of text analysis and search, the UIMA 100 expects that the search engine 110 provide a query language over spans, and the interface enables the application 170 to perform queries. For example, a query may seek all documents where the title (an annotated span) contains a US President (an annotated span), or seek all documents where the abstract (an annotated span) of the document contains "an inhibits" relation (an annotated span) that contains a qualifier (an annotated span) that contains the text "in vitro."

Turning to the interface 135 between the TAE 130 and the Search Engine 110, preferably, the TAE 130 is fed one or more documents by the application 170. Preferably the TAE 130 does not use the search engine 110 to locate documents. The TAE 130 produces annotations that the application 170 may seek to index, but the TAE 130 does not determine what is indexed, nor does it communicate directly to the indexing function of the application 170.

Preferably, the relationship between the application 170 and TAE 130 is such that neither one influences the state of the other. The application 170 preferably includes a programming model and operators for managing state across results for calling the TAE 130. Any shared/updateable state is preferably managed by the UIM infrastructure, and not directly by the TAE 130. For example, one suitable rule may be that "No shared global variables exist between the TAE and the application."

V. Two-Level Searching

Preferably, the UIMA 100 is aided by searching techniques that make use of a two-level evaluation process or model. This process is now described an exemplary manner, and is not to be construed as being limiting of the invention herein.

In some embodiments the evaluation model assumes a traditional inverted index for in which every index term is associated with a posting list. This list contains an entry for each document in the collection that contains the index term. The entry contains the document's unique positive identifier, DID, as well as any other information required by the applicable scoring model, such as number of occurrences of the term in the document, offsets of occurrences, etc. Preferably, posting lists are ordered in increasing order of the document identifiers.

From a programming point of view, in order to support complex queries over such an inverted index, it is considered preferable to use an object oriented approach. Using this approach, each index term is associated with a basic iterator 1125 object (a "stream reader" object) capable of sequentially iterating over its posting list. The iterator 1125 can additionally skip to a given entry in the posting list. In particular, it provides a method next(id) that returns the first posting element for which DID≧id. If there is no such document, the term iterator 1125 returns a special posting element with an identifier LastID that is larger than all existing DIDs in the index.

Boolean and other operators (or predicates) are associated with compound iterators 1125, constructed from the basic iterators 1125. For example, the next method for the operator A (OR) B is defined by the relationship:

(A OR B).next(id)=min(A.next(id), B.next(id)).

The (WAND) Operator:

The two-level approach disclosed herein makes use of a Boolean predicate that is referred to for convenience as WAND, standing for Weak (AND), or Weighted (AND). WAND takes as arguments a list of Boolean variables $X_1$, $X_2, \ldots, X_k$, a list of associated positive weights, $w_1$, $w_2, \ldots, w_k$, and a threshold $\theta$. By definition, (WAND) ($X_1$, $w_1, \ldots X_k, w_k, \theta$) is true if:

$$\sum_{1 \leq i \leq k} x_i w_i \geq \theta, \quad (1)$$

where $x_i$ is the indicator variable for $X_i$, that is $$x_i = \begin{cases} 1, & \text{if } X_i \text{ is true} \\ 0, & \text{otherwise} \end{cases}$$

It can be observe that (WAND) can be used to implement (AND) and (OR) via:

AND $(X_1, X_2, \ldots X_k)$=WAND$(X_1, 1, X_2, 1, \ldots X_k, 1, k)$, and

OR$(X_1, X_2, \ldots X_k)$=WAND$(X_1, 1, X_2, 1, \ldots X_k, 1, 1)$.

Note that other conventions can be used for expressing the (WAND), e.g., the threshold can appear as the first argument. Thus, by varying the threshold (WAND) can move from being substantially an (OR) function to being substantially an (AND) function. It is noted that (WAND) can be generalized by replacing condition (1) by requiring an arbitrary monotonically increasing function of the $x_i$'s to be above the threshold, or, in particular, by requiring an arbitrary monotone Boolean formula to be True.

Figures 25, 26:
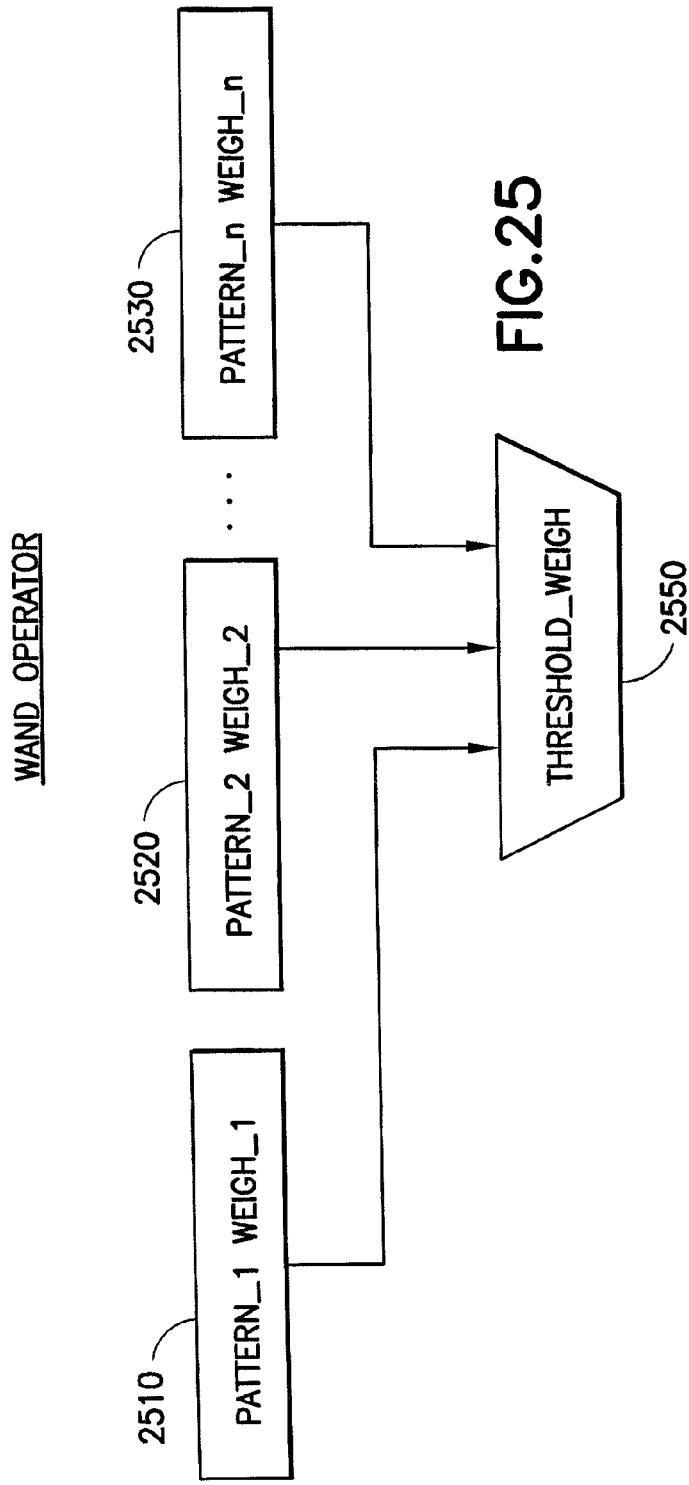
FIG. 25 is a flow chart showing the relation of patterns and the threshold weight.
FIG. 26 is an example of pseudo-code for an inito method of the WAND iterator.
Figure 28:
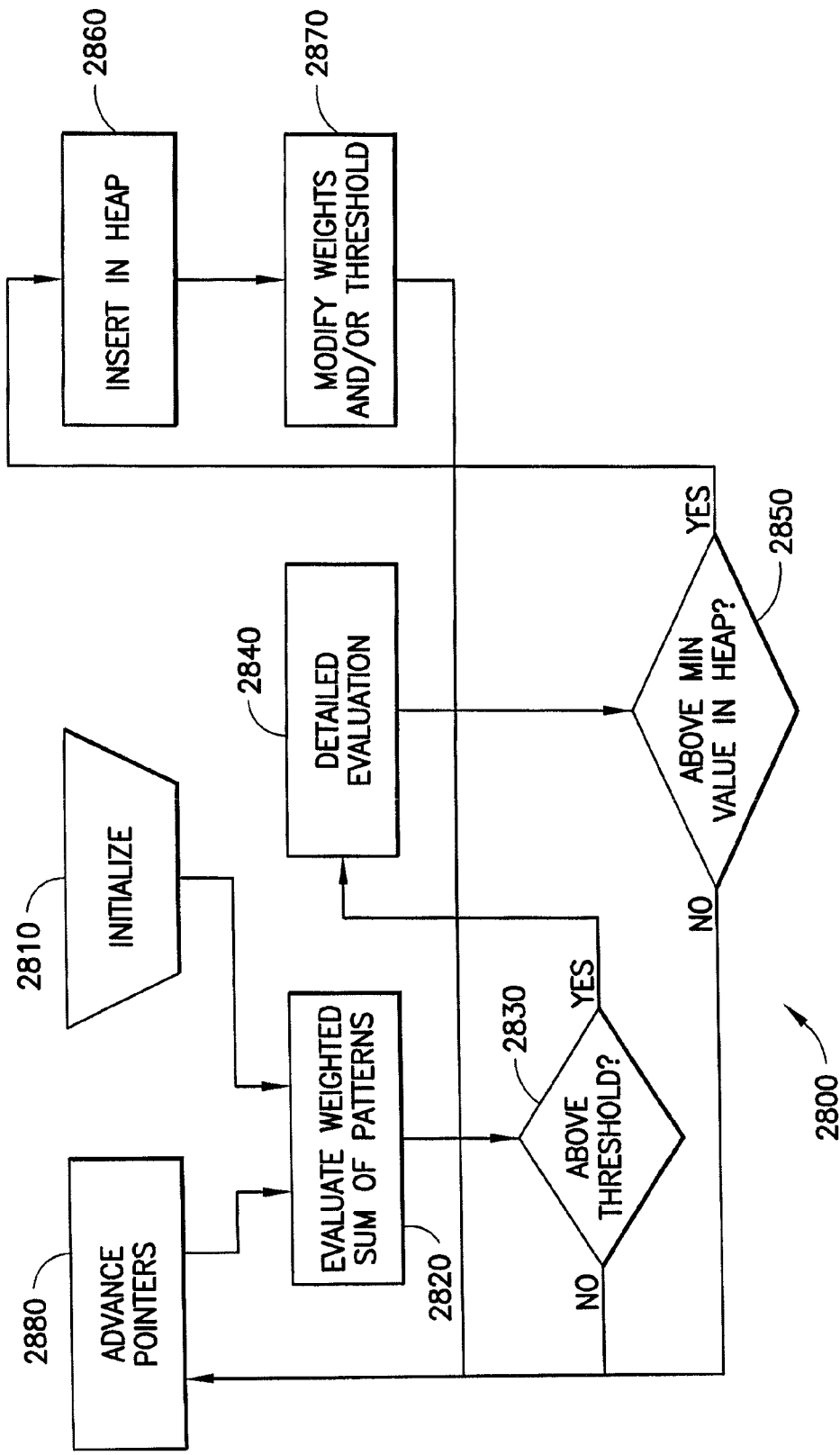
FIG. 28 is a flowchart summarizing the flow of the WAND process.

FIG. 25 depicts the relationship of patterns with the WAND threshold, wherein a certain pattern is assigned a weight 2510, a second pattern is assigned a desired weight 2520, until the last pattern is assigned a weight 2530. Collectively the assignments 2510, 2520, 2530 are used to produce a Threshold weight 2550. A summary of the use of the WAND technique 2800 is presented in FIG. 28. In FIG. 28, a first step involves initializing 2810, then evaluating the weighted sum of patterns 2820 and determining if the sum is above the threshold 2830. If the sum is below the threshold the pointers are advanced at step 2880 and the weighted sum of patterns evaluated again at step 2820. If the sum is above the threshold the method conducts a detailed evaluation at step 2840 and a determination at step 2850 if the value is above the minimum value in the heap (a heap of size n to keep track of the top n results, as discussed below). If not, control passes back to step 2880, otherwise the result is inserted into the heap at step 2860, the threshold and/or weights are modified at step 2870, and control passes back to step 2880.

Generally, (WAND) iterates over documents. In some respects, WAND may be viewed as a procedure call, although it should also be considered a subclass of WF iterators with the appropriate methods and state. As such, (WAND) has a "cursor" that represents the current document, as well as other attributes.

As is shown in FIG. 25, the arguments to WAND are patterns and weights. Patterns pat1, pat2, . . . are the typical patterns supported by WF implemented as iterators 1125. Preferably, each pattern has an associated positive weight, w, that may not be necessarily the same during the iteration. There is also a threshold weight w0.

In operation, WAND(w1, pat1, w1, pat2, w2, . . . ) returns the next documents (wrt the current cursor) that matches enough of pat1, pat2, . . . so that the sum of weights over the matched patterns is greater than w0.

More generally, each of pat1, pat2, . . . represents a Boolean function of the content of the documents. Then, in operation, WAND(w0, pat1, w1, pat2, w2, . . . ) returns the next documents (wrt the current cursor) that satisfies enough of pat1, pat2, . . . so that the sum of weights over the matched patterns is greater than w0.

Based on the foregoing discussion, it can be appreciated that where pat_i represent an arbitrary Boolean function of the content of the document 190A, returned documents satisfy enough of pat1, pat2, . . . so that the sum of weights over the satisfied functions pat1, pat2, . . . is greater than w0.

The sum of weights is not necessarily the score of the document. Preferably, the sum of weights is used simply as a pruning mechanism. The actual document score is computed by the ranking routine, taking into account all normalization factors, and other similar attributes. Preferably, the use of a sum is arbitrary, and any increasing function can be used instead.

Consider the following example, while assuming that the pruning weights and the score are the same:
Assume that a query is: <cat dog fight>
Cat pays $3
Dog pays $2
Fights pays $4
Cat near dog pays $10
Cat near fights pays $14
Dog near fights pays $12

The top 100 documents are desired. If at some point there exist 100 documents with a score>=30, then a call is made where WAND(30, <cat>, 3, <dog>, 2, <fights>, 4, LA(<cat>, <dog>), 10, LA(<cat>, <fights>), 14, LA(<dog>, <fights>), 12) where LA(X, Y) implements X NEAR Y.

In terms of implementation, the use of (WAND) is somewhat similar to the implementation of AND. In some embodiments, the rules for "zipping" may be as follows:

The entire WAND iterator 1125 has a cursor CUR_DOC that represents the current match. It is desired to advance CUR_DOC.

Each pattern pat_i has an associated next_doc_i that represents where it matches in a position>CUR_DOC.

Sort all the next_doc_i so that next_doc_i_1<= next_doc_i_2<=next_doc_i_3<= . . .

Let k be the smallest index such that w_i_1+w_i_2+ . . . +w_i_k>w_0. Then claim that it is possible to advance CUR_DOC to next_doc_i_k, and advance all the other cursors to a position>=CUR_DOC. Now, if enough weight at CUR_DOC is available, then CUR_DOC is returned. Otherwise the positions are sorted again.

To understand this operation assume that the pattern pat_i matches every single document after next_doc_i. Even under this optimistic assumption no document has enough weight before next_doc_i_k.

The following observations can be made.
1. A regular AND(X, Y, Z) is exactly the same as WAND(3, X, 1, Y, 1, Z, 1). The two iterators 1125 will zip internally through exactly the same list of locations, making exactly the same jumps.
2. A regular OR(X, Y, Z) is exactly the same as WAND(1, X, 1, Y, 1, Z, 1). The two iterators will zip internally through exactly the same list of locations, making exactly the same jumps.
3. If filter expression F is used that is an expression that every document must match, then it can be implemented as WAND(large_number+threshold, F, large_number, pat1, w1, . . . )

Various techniques may be used to set the pruning expressions, as the actual score is not simply a sum. These techniques preferably take into account TF plus normalization.

Scoring

The final score of a document involves a textual score that is based on the document textual similarity to the query, as well as other query independent factors such as connectivity for web pages, citation count for scientific papers, inventory for e-commerce items, etc. To simplify the exposition, it is assumed that there are no such query independent factors. It is further assumed that there exists an additive scoring model. That is, the textual score of each document is determined by summing the contribution of all query terms belonging to the document. Thus, the textual score of a document d for query q is:

$$\text{Score}(d, q) = \sum_{t \in q \cap d} \alpha_t w(t, d) \quad (2)$$

For example, for the tf×idf scoring model at is a function of the number of occurrences of t in the query, multiplied by the inverse document frequency (idf) of t in the index and w(t,d) is a function of the term frequency (tf) of t in d, divided by the document length |d|. In addition, it is assumed that each term is associated with an upper bound on its maximal contribution to any document score, $UB_t$ such that:

$$UB_t \geq \alpha_t \max(w(t, d1), (w(t, d2), . . .)$$

Thus, by summing the upper bounds of all query terms appearing in a document, an upper bound on the document's query-dependent score can be determined as:

$$UB(d, q) = \sum_{t \in q \cap d} UB_t \geq \text{Score}(d, q). \quad (3)$$

Note that query terms can be simple terms, i.e., terms for which a static posting list is stored in the index, or complex terms such as phrases, for which the posting list is created dynamically during query evaluation. The model does not distinguish between simple and complex terms; and each term provides an upper bound, and for implementation purposes each term provides a posting iterator 1125. Given these conditions the preliminary scoring involves evaluating, for each document d:

$$\text{WAND}(X_1, UB_1, X_2, UB_2, . . . , X_k, UB_k, \theta)$$

where $X_i$ is an indicator variable for the presence of query term i in document d, and the threshold θ is varied during the algorithm as explained below. If (WAND) evaluates to True, then the document d undergoes a full evaluation. The threshold θ is preferably set dynamically by the algorithm based on the minimum score m among the top n results found thus far, where n is the number of requested documents.

The larger the threshold, the more documents are skipped and thus full scores are computed for fewer documents. It can be readily seen that if the contribution upper bounds are accurate, then the final score of a document is no greater than its preliminary upper bound. Therefore, all documents skipped by WAND with θ=m would not be placed in the top scoring document set by any other alternative scheme that uses the same additive scoring model.

However, as explained later, (a) in some instances, only approximate upper bounds for the contribution of each term might be available, (b) the score might involve query independent factors, and (c) a higher threshold might be preferred in order to execute fewer full evaluations. Thus, in practice, it is preferred to set θ=F*m, where F is a threshold factor chosen to balance the positive and negative errors for the collection. To implement this efficiently it is preferred to place a (WAND) iterator on top of the iterators associated with query terms. This is explained further below.

In general, the foregoing approach is not restricted to additive scoring, and any arbitrary monotone function in the definition of (WAND) can be used. That is, the only restriction is that, preferably, the presence of a query term does not decrease the total score of a document. This is true of all typical Information retrieval (IR) systems.

Implementing the WAND Iterator

The (WAND) predicate may be used to iteratively find candidate documents for full evaluation. The WAND iterator provides a procedure that can quickly find the documents that satisfy the predicate.

Preferably, the WAND iterator is initialized by calling the inito function depicted in pseudo-code in FIG. 26. The method receives as input the array of query terms, and sets the current document to be considered (curDoc) to zero. The method also initializes the current posting posting[t] to be the first posting element in the posting list. After calling the init( ) function of FIG. 26, the algorithm repeatedly calls WAND's next( ) method to get the next candidate for full evaluation. The next( ) function takes as input a threshold θ and returns the next document whose approximate score is larger than θ. Documents whose approximate score is lower than the threshold are skipped. FIG. 27 illustrates non-limiting pseudo-code for implementing the next( ) function.

The WAND iterator maintains two invariants during its execution:
1. All documents with DID≦curDoc have already been considered as candidates.
2. For any term t, any document containing t, with DID<posting[t].DID, has already been considered as a candidate.

Note that the init( ) function establishes these invariants. The WAND iterator repeatedly advances the individual term iterators until it finds a candidate document to return. This could be performed in a naive manner by advancing all iterators together to their next document, approximating the scores of candidate documents in DID order, and comparing to the threshold. This method would, however, be very inefficient and would require several disk I/O's and related computation. The algorithm disclosed herein is optimized to minimize the number of next( ) operations and the number of approximate evaluations. This is accomplished by first sorting the query terms in increasing order of the DID's of their current postings. Next, the method computes a pivot term, i.e., the first term in the order for which the accumulated sum of upper bounds of all terms preceding it, including it, exceeds the given threshold (see line 5 and following in FIG. 27). The pivot DID is the smallest DID that might be a candidate. If there is no such term (meaning the sum of all term upper bounds is less than the threshold) the iterator stops and returns the constant NoMoreDocs.

To understand the significance of the pivot location, consider the first invocation of next( ) after init( ). Even if all terms are present in all documents following their current posting, no document preceding the pivot document has enough total contributions to bring it above the threshold. The pivot variable is set to the DID corresponding to the current posting of the pivot term. If the pivot is less or equal to the DID of the last document considered (curDoc), WAND picks a term preceding the pivot term and advances the iterator past curDoc, the reason being that all documents preceding curDoc have already been considered (by Invariant 1) and therefore the system should next consider a document with a larger DID. Note that this preserves Invariant 2. If the pivot is greater than curDoc, a determination is made if the sum of contributions to the pivot document is greater than the threshold. There are two cases: if the current posting DID of all terms preceding the pivot term is equal to the pivot document, then the pivot document contains a set of query terms with an accumulated upper bound larger than the threshold and, hence, next( ) sets curDoc to the pivot, and returns this document as a candidate for full evaluation.

Otherwise, the pivot document may or may not contain all the preceding terms, that is, it may or may not have enough contributions, and WAND selects one of these terms and advances its iterator to a location greater than or equal to the pivot location.

Note that the next( ) function maintains the invariant that all the documents with DID less than or equal to curDoc have already been considered as candidates (Invariant 1). It is not possible for another document whose DID is smaller than that of the pivot to be a valid candidate since the pivot term by definition is the first term in the DID order for which the accumulated upper bound exceeds the threshold. Hence, all documents with a smaller DID than that of the pivot can only contain terms that precede the pivot term, and thus the upper bound on their score is strictly less than the threshold. It follows that next( ) maintains the invariant, since curDoc is only advanced to the pivot document in the cases of success, i.e., finding a new valid candidate that is the first in the order.

Preferably, the next( ) function invokes three associated functions, sort( ), findPivotTerm( ) and pickTerm( ). The sort( ) function sorts the terms in non-decreasing order of their current DID. Note that there is no need to fully sort the terms at any stage, since only one term advances its iterator between consecutive calls to sort( ). Hence, by using an appropriate data structure, the sorted order is maintained by modifying the position of only one term. The second function, findPivotTerm( ), returns the first term in the sorted order for which the accumulated upper bounds of all terms preceding it, including it, exceed the given threshold. The third function, pickTerm( ), receives as input a set of terms and selects the term whose iterator is to be advanced. An optimal selection strategy selects the term that will produce the largest expected skip. Advancing term iterators as much as possible reduces the number of documents to consider and, hence, the number of postings to retrieve. It can be noted that this policy has no effect on the set of documents that are fully evaluated. Any document whose score upper bound is larger than the threshold will be evaluated under any strategy. Thus, while a good pickTerm( ) policy may improve performance, it does affect precision. In one embodiment, pickTerm( ) selects the term with the maximal inverse document frequency, assuming that the rarest term will produce the largest skip. Other pickTerm( ) policies can be used as well.

Further reference in this regard may be had to commonly assigned U.S. Provisional Application No. 60/474,877, filed on even date herewith, entitled "Pivot Join: A runtime operator for text search", by K. Beyer, R. Lyle, S. Rajagopalan and E. Shekita, incorporated by reference herein in its entirety. For example, the monotonic Boolean formula may not be explicit, as discussed above, but may be given by a monotonic black box evaluation.

Setting the WAND Threshold

Assume that a user wishes to retrieve the top n scoring documents for a given query. The algorithm maintains a heap of size n to keep track of the top n results. After calling the init( ) function of the WAND iterator, the algorithm calls the next( ) function to receive a new candidate document. When a new candidate is returned by the WAND iterator, this document is fully evaluated using the system's scoring model, resulting in the generation of a precise score for this document. If the heap is not full the candidate document is inserted into the heap. If the heap is full and the new score is larger than the minimum score in the heap, the new document is inserted into the heap, replacing the document with the minimum score.

The threshold value that is passed to the WAND iterator is set based on the minimum score of all documents currently in the heap. Recall that this threshold determines the lower bound that must be exceeded for a document to be considered as a candidate, and to be passed to the full evaluation step.

The initial threshold is set based on the query type. For example, for an OR query, or for a free-text query, the initial threshold is set to zero. The approximate score of any document that contains at least one of the query terms would exceed this threshold and would thus be returned as a candidate. Once the heap is full and a more realistic threshold is set, only documents that have a sufficient number of terms to yield a high score are fully evaluated. For an AND query, the initial threshold can be set to the sum of all term upper bounds. Only documents containing all query terms would have a high enough approximate score to be considered as candidate documents.

The initial threshold can also be used to accommodate mandatory terms (those preceded by a '+'). The upper bound for such terms can be set to some huge value, H, that is much larger than the sum of all the other terms upper bounds. By setting the initial threshold to H, only documents containing the mandatory term will be returned as candidates. If the query contains k mandatory terms, the initial threshold is set to k·H.

The threshold can additionally be used to expedite the evaluation process by being more opportunistic in terms of selecting candidate documents for full evaluation. In this case, the threshold is preferably set to a value larger than the minimum score in the heap. By increasing the threshold, the algorithm can dynamically prune documents during the approximation step and thus fully evaluate fewer overall candidate documents, but with higher potential. The cost of dynamic pruning is the risk of missing some high scoring documents and, thus, the results are not guaranteed to be accurate. However, in many cases this can be a very effective technique. For example, systems that govern the maximum time spent on a given query can increase the threshold when the time limit is about to be exceeded, thus enforcing larger skips and fully evaluating only documents that are very likely to make the final result list. Experimental results indicate how dynamic pruning affects the efficiency, as well as the effectiveness of query evaluation using this technique.

Computing Term Upper Bounds

The WAND iterator requires that each query term t be associated with an upper bound, $UB_t$, on its contribution to any document score. Recall that the upper bound on the document score is computed by summing the upper bounds of all terms that the document contains. It is therefore clear that if the term upper bounds are accurate, i.e., $\forall t, UB_t > \alpha_t \max_d w(t,d)$, then the upper bound on the score of a document is also accurate i.e., it is greater than its final score. In this case, it guaranteed that, assuming the algorithm sets the threshold at any stage to the minimum document score seen thus far, the two-level process will return a correct ranking and accurate document scores.

It is straightforward to find a true upper bound for simple terms. Such terms are directly associated with a posting list that is explicitly stored in the index. To find an upper bound, one first traverses the term's posting list and for each entry computes the contribution of this term to the score of the document corresponding to this entry. The upper bound is then set to the maximum contribution over all posting elements. This upper bound is stored in the index as one of the term's properties.

However, in order to avoid false positive errors, it follows that special attention should be paid to upper bound estimation, even for simple terms. Furthermore, for complex query terms such as phrases or proximity pairs, term upper bounds are preferably estimated since their posting lists are created dynamically during query evaluation.

In the following an alternative method for upper bound estimation of simple terms is described, as well as schemes for estimating upper bounds for complex terms. For simple terms, the upper bound for a term t is approximated to be $UB_t = C \cdot \alpha_t$. Recall that at is determined by the term idf and the term frequency in the query. C>1 is a constant that is uniformly used for all terms. This estimate ignores other factors that usually affect the contribution of a specific term to the document's scores. These include term frequency in the document, the context of the occurrence (e.g., in the document title), document length and more.

The benefit of this estimate is its simplicity. The tradeoff is that the computed upper bound of a candidate document can now be lower than the document's true score, resulting in false negative errors. Such errors may result in incorrect final rankings since the top scoring documents may not pass the preliminary evaluation step and are thus not fully evaluated. Note, however, that false negative errors can only occur once the heap is full, and if the threshold is set to a high value.

The parameter C can be fine tuned for a given collection of documents to provide a balance between false positive errors and false negative errors. The larger C, the more false positive errors are expected and thus system efficiency is decreased. Decreasing C results in the generation of more false negative errors and thus decreases the effectiveness of the system. Experimental data shows that C can be set to a relatively small value before the system effectiveness is impaired.

Estimating the Upper Bound for Complex Terms

As described above, the upper bound for a query term is estimated based on its inverse document frequency (idf). The idf of simple terms can easily be determined from the length of its posting list. The idf of complex terms that are not explicitly stored as such in the index and is preferably estimated, since their posting lists are created dynamically during query evaluation. Described now is a procedure to estimate the idf of two types of complex terms. These procedures can be extended to other types of complex terms.

Phrases

A phrase is a sequence of query terms usually wrapped in quotes, e.g. "John Quincy Adams". A document satisfies this query only if it contains all of the terms in the phrase in the same order as they appear in the phrase query. Note that in order to support dynamic phrase evaluation the postings of individual terms also include the offsets of the terms within the document. Moreover, phrase evaluation necessitates storing stop-words in the index.

For each phrase, an iterator is built outside WAND. Inside WAND, since phrases are usually rare, phrases are treated as "must appear" terms, that is, only documents containing the query phrases are retrieved. Recall that the method handles mandatory terms by setting their upper bound to a huge value H, regardless of their idf. In addition, the threshold is also initialized to H. Thus, only candidate documents containing the phrase will pass the detailed evaluation step.

Lexical Affinities

Lexical affinities (LAs) are terms found in close proximity to each other, in a window of small size. The posting iterator of an LA term receives as input the posting iterators of both LA terms, and returns only documents containing both terms in close proximity. In order to estimate the document frequency of an LA ($t_1, t_2$), the fact that the posting list of the LA is a sub-sequence of the posting lists of its individual terms is made use of. The number of appearances of the LA in the partial posting lists of its terms traversed so far is counted and extrapolated to the entire posting lists.

More specifically, the document frequency of the LA is initialized to $df_0(LA)$ $min(df(t_1),df(t_2))$, and is updated repeatedly after traversing an additional k documents. Let $p(t_i)$ be the posting list of term $t_i$ and $p'(t_i)$ be its partial posting list traversed so far. Let $\#(LA|p'(t_i))$ be the number of documents containing the LA in p' ($t_i$). The number of documents containing the LA in the entire posting list of $t_i$ can be estimated by the extrapolation:

$$\#(LA \mid P(t_i)) = \frac{\#(LA \mid p'(t_i))}{|p'(t_i)|}(|p'(t_i)|)$$

It follows that the update rule for the document frequency of the LA at stage n is:

$$df_n(LA) = \min\left[df_{n-1}(LA), \frac{\#(LA|p(t_1)) + \#(LA|p(t_2))}{2}\right]$$

The rate of convergence depends on the length of the term posting lists. It has been found that the document frequency estimation of LA quickly converges after only a few iterations.

Results

What follows is a description of results from experiments conducted to evaluate the presently preferred two-level query evaluation process. For these experiments, a Java search engine was used. A collection of documents containing 10 GB of data consisting of 1.69 million HTML pages was indexed. Both short and long queries were implemented. The queries were constructed from topics within the collection. The topic title for short query construction (average 2.46 words per query) was used, and the title concatenated with the topic description for long query construction (average 7.0 words per query). In addition, the size of the result set (the heap size) was used as a variable. The larger the heap, the more evaluations are required to obtain the result set.

The independent parameter C was also varied, i.e., the constant that multiplies the sum of the query term upper bounds to obtain the document score upper bound. It can be recalled that the threshold parameter passed to the WAND iterator is compared with the documents' score upper bound. Documents are fully evaluated only if their upper bound is greater than the given threshold. C, therefore, governs the tradeoff between performance and precision; the smaller C, the fewer is the number of documents that are fully evaluated, at the cost of lower precision, and vice versa. For practical reasons, instead of varying C, C may be fixed to a specific value and the value of the threshold factor F that multiplies the true threshold can be varied and passed to the WAND iterator. The factor C is in inverse relation to F, therefore varying F is equivalent to varying C with the opposite effect. That is, large values of F result in fewer full evaluations and in an expected loss in precision. When setting F to zero the threshold passed to WAND is always zero and thus all documents that contain at least one of the query terms are considered candidates and fully evaluated. When setting F to an infinite value, the algorithm will only fully evaluate documents until the heap is full (while θ=0). The remainder of the documents then do not pass the threshold, since θ·F will be greater than the sum of all query term upper bounds.

The following parameters can be measured when varying values of the threshold factor. (a) Average number of full evaluations per query. This is the dominant parameter that affects search performance. Clearly, the more full evaluations, the slower the system. (b) Search precision as measured by precision at 10 (P@10) and mean average precision (MAP). (c) The difference between the search result set obtained from a run with no false-negative errors (the basic run), and the result set obtained from runs with negative errors (pruned runs). It can be noted that documents receive identical scores in both runs, since the full evaluator is common and it assigns the final score; hence the relative order of common documents in the basic set B and the pruned set P is maintained. Therefore if each run returns k documents, the topmost j documents returned by the pruned run, for some j less than or equal to k, will be in the basic set and in the same relative order.

The difference between the two result sets was measured in two ways. First it was measured using the relative difference, given by the formula:

$$\frac{|B/P|}{|B|} = \frac{k-j}{k}.$$

Second, since not all documents are equally important, the difference was measured between the two result sets using MRR (mean reciprocal rank) weighting. Any document that is in the basic set, B, in position i in the order, but is not a member of the pruned set, P, contributes 1/i to the MRR distance. The idea is that missing documents in the pruned set contribute to the distance in inverse relation to their position in the order. The MRR distance is normalized by the MRR weight of the entire set. Thus:

$$MRR(B, P) = \frac{\sum_{i=1, d_i \in B-P}^{k} 1/i}{\sum_{i=1}^{k} 1/i}.$$

Effectiveness and Efficiency

Figure 29:
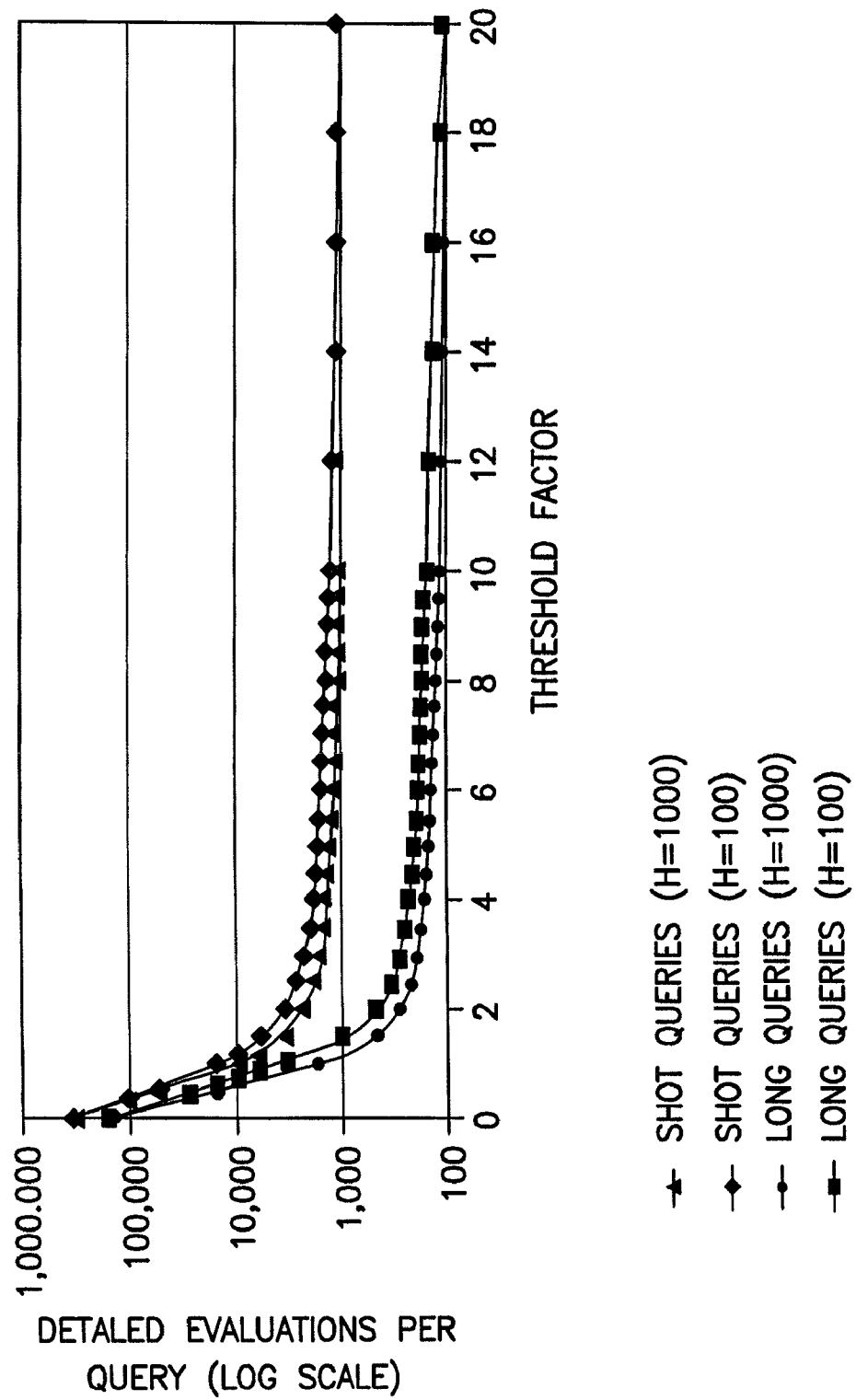
FIG. 29 is a graph showing efficiency results for the WAND process.

In a first experiment, the number of full evaluations was measured as a function of the threshold parameter F. Setting F to zero returns all documents that contain at least one query term. The set of returned candidate documents are all then fully evaluated. This technique was used to establish a base run, and provided that, on average, 335,500 documents are evaluated per long query, while 135,000 documents are evaluated per short query. FIG. 29 shows the number of full evaluations as a function of the threshold factor F, for long and for short queries, and for a heap size of 100 and 1000. FIG. 29 indicates that for all runs, as F increases, the number of evaluations quickly converges to the number of required documents (the heap size). Additionally, the average query time as a function of F was measured and was shown to be highly correlated with the number of full evaluations (correlation is higher than 0.98 for all runs). For instance, for long queries, a heap size of 100, and F=0, the average time per query of the base run is 8.41 seconds. This time decreases to 0.4 seconds for large F values. Note that the base run is an extreme case where no pruning is performed. The threshold can actually be set to a higher value before any negative errors occur. Based on these experiments, it can be seen that a threshold of approximately 0.8 results in significant pruning of the number of full evaluations with no effect on the result list.

Figure 30:
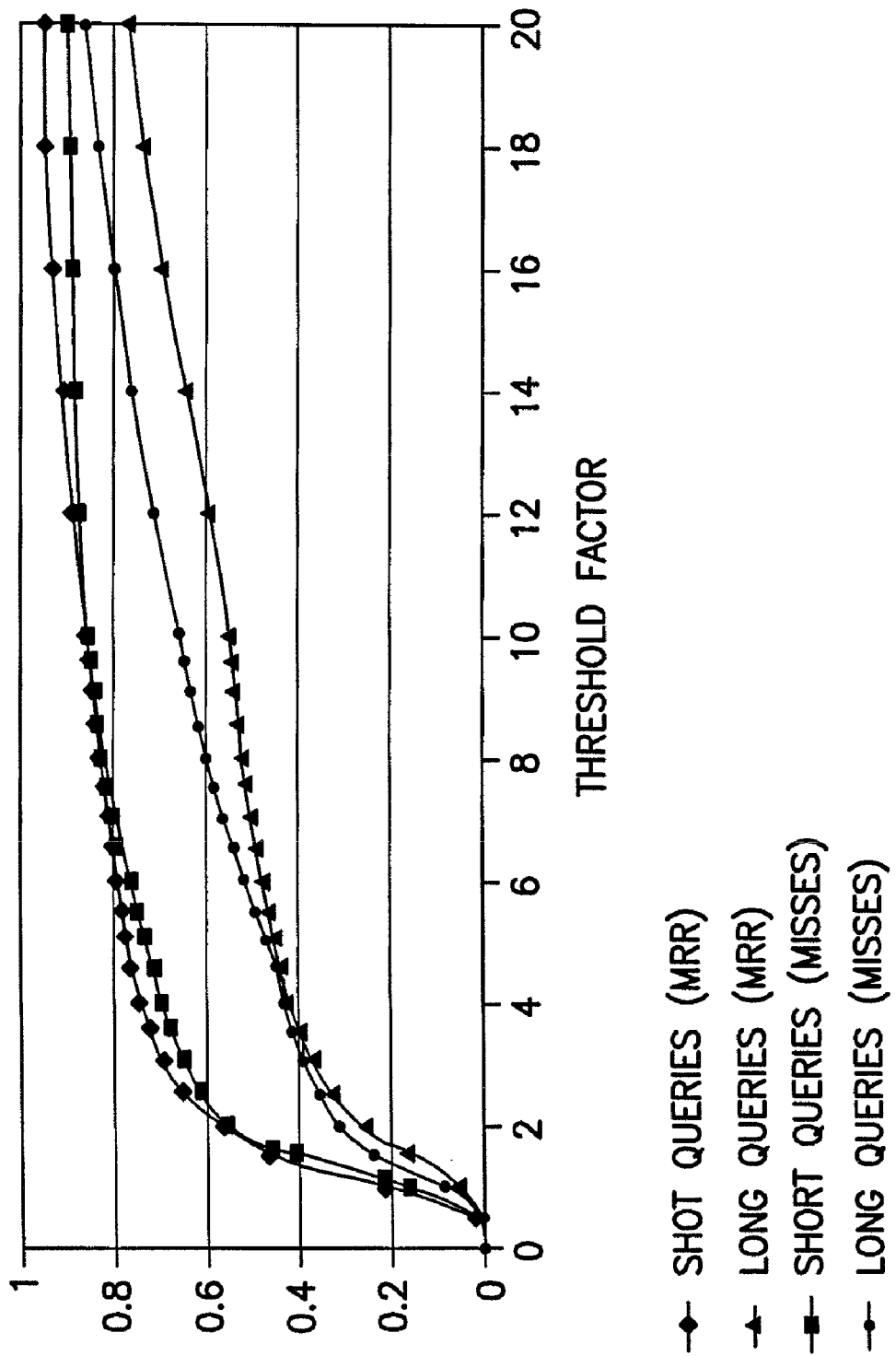
FIG. 30 is a graph showing efficiency results for the WAND process.

FIG. 30 shows the difference between the pruned results and the base results for the same runs as measured by the MRR distance measure. For small values of F the distance is zero since there are no false negative errors. Increasing F increases the number of false negative errors, hence the distance increases.

Figure 31:
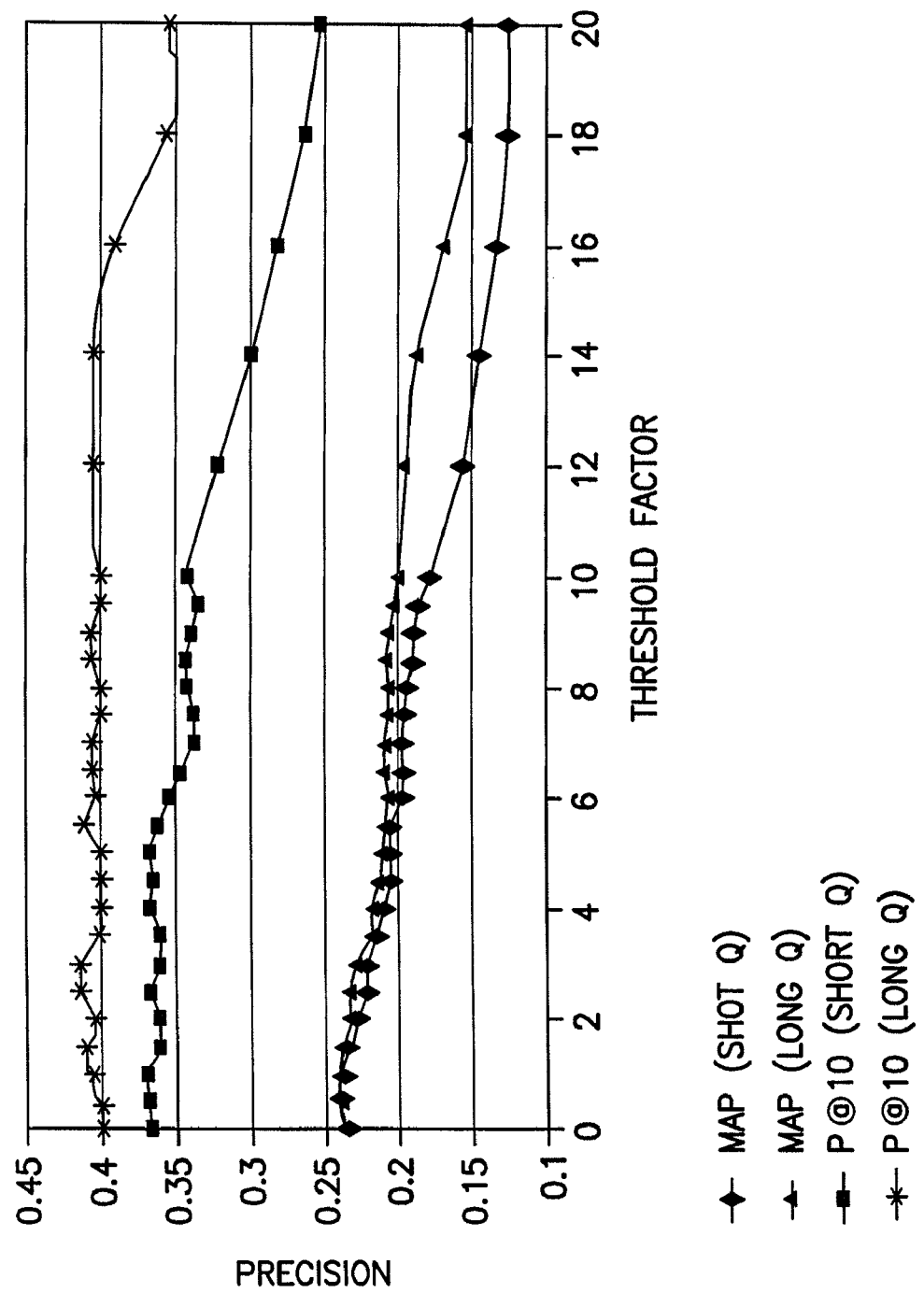
FIG. 31 is a graph showing efficiency results for the WAND process.

FIG. 31 shows the precision of the same runs, as measured by P@10 and MAP, for short and long queries with a heap size of 1000. It can be seen that while MAP decreases as pruning is increased (as expected), P@10 moderately decreases for short queries and only after very significant pruning. For long queries, the change in P@10 is negligible. For instance, when F=6.0, P@10 is not affected at all for both long and short queries while the number of full evaluations is less than 1700

(only 700 evaluations more than the 1000 required to initially fill the heap) and the MRR is approximately 0.5.

The reason for high precision in the top results set, even under aggressive pruning, is explained by the fact that a high threshold in essence makes WAND function like an AND, returning only documents that contain all query terms. These documents are then fully evaluated and most likely receive a high score. Since the scores are not affected by the two-level process, and since these documents are indeed relevant and receive a high score in any case, P@10 is not affected. On the other hand, MAP, that also takes into account recall, is detrimentally affected due to the many misses.

It may thus be assumed that by explicitly evaluating only documents containing all query terms, the system can achieve high precision in the top result set. WAND can readily be instructed to return only such documents by passing it a threshold value that is equal to the sum of all query term upper bounds (referred to for convenience as an AllTerms procedure). While this approach proves itself in terms of P@10, the recall and therefore the MAP decreases, since too few documents are considered for many queries. A modified strategy (referred to as a TwoPass procedure) permits the use of a second pass over the term postings, in case the first "aggressive" pass does not return a sufficient number of results. Specifically, the threshold is first set to the sum of all term upper bounds; and if the number of accumulated documents is less than the required number of results, the threshold is reduced and set to the largest upper bound of all query terms that occur at least once in the corpus of documents, and the evaluation process is re-invoked.

Table 1 shows the results of WAND with some different threshold factors, compared to the AllTerms and the TwoPass runs. For F=0, WAND returns all documents that contain at least one of the query terms. For this run, since there are no false negative errors, the precision is maximal. For F=1.0, the number of full evaluations is decreased by a factor of 20 for long queries and by a factor of 10 for short queries, still without any false negative errors and hence with no reduction in precision. For F=2.0 the number of evaluations is further decreased by a factor of 4, at the cost of lower precision.

It can be seen that AllTerms improves P@10 significantly compared to WAND, both for short and for long queries, while MAP decreases significantly. For systems interested only in precision of the top results, ignoring recall, the AllTerms strategy is a reasonable and effective choice. The TwoPass run achieves remarkable results both for P@10 and MAP. A small cost is incurred in terms of execution time for the second pass but it is negligible in most cases since the term postings are most likely still cached in main memory from the first pass. In any event, these results demonstrate the versatility and flexibility of the method in general and the WAND iterator in particular. By varying the threshold the "strength" of the operator can be controlled from an OR to an AND.

TABLE 1

P@10 and MAP of AllTerms and TwoPass runs compared to basic WAND.

| WAND | ShortQ | | | LongQ | | |
|---|---|---|---|---|---|---|
| | P@10 | MAP | #Eval | P@10 | MAP | #Eval |
| (F = 0) | 0.368 | 0.24 | 136,225 | 0.402 | 0.241 | 335,500 |
| (F = 1.0) | 0.368 | 0.24 | 10,120 | 0.402 | 0.241 | 15,992 |
| (F = 2.0) | 0.362 | 0.23 | 2,383 | 0.404 | 0.234 | 3,599 |

TABLE 1-continued

P@10 and MAP of AllTerms and TwoPass runs compared to basic WAND.

| WAND | ShortQ | | | LongQ | | |
|---|---|---|---|---|---|---|
| | P@10 | MAP | #Eval | P@10 | MAP | #Eval |
| AllTerms | 0.478 | 0.187 | 443.6 | 0.537 | 0.142 | 147 |
| TwoPass | 0.368 | 0.249 | 22,247 | 0.404 | 0.246 | 29,932 |

The foregoing discussion has demonstrated that using a document-at-a-time approach and a two level query evaluation method using the WAND operator for the first stage pruning can yield substantial gains in efficiency, with no loss in precision and recall. Furthermore, if some small loss of precision can be tolerated then the gains can be increased even further.

As was noted above, preferably there is provided at least one iterator over occurrences of terms in documents, and preferably there is at least one iterator for indicating which documents satisfy specific properties. The WAND employs at least one iterator for documents that satisfy the Boolean predicates $X\_1, X\_2, \ldots$, respectively, and the WAND operator creates an iterator for indicating which documents satisfy the WAND predicate.

The WAND operator maintains a current document variable that represents a first possible document that is not yet known to not satisfy the WAND predicate, and a procedure may be employed to indicate which iterator of a plurality of iterators is to advance if the WAND predicate is not satisfied at a current document variable.

VI. Exemplary Embodiment & Considerations

Figures 32, 32A, 32B:
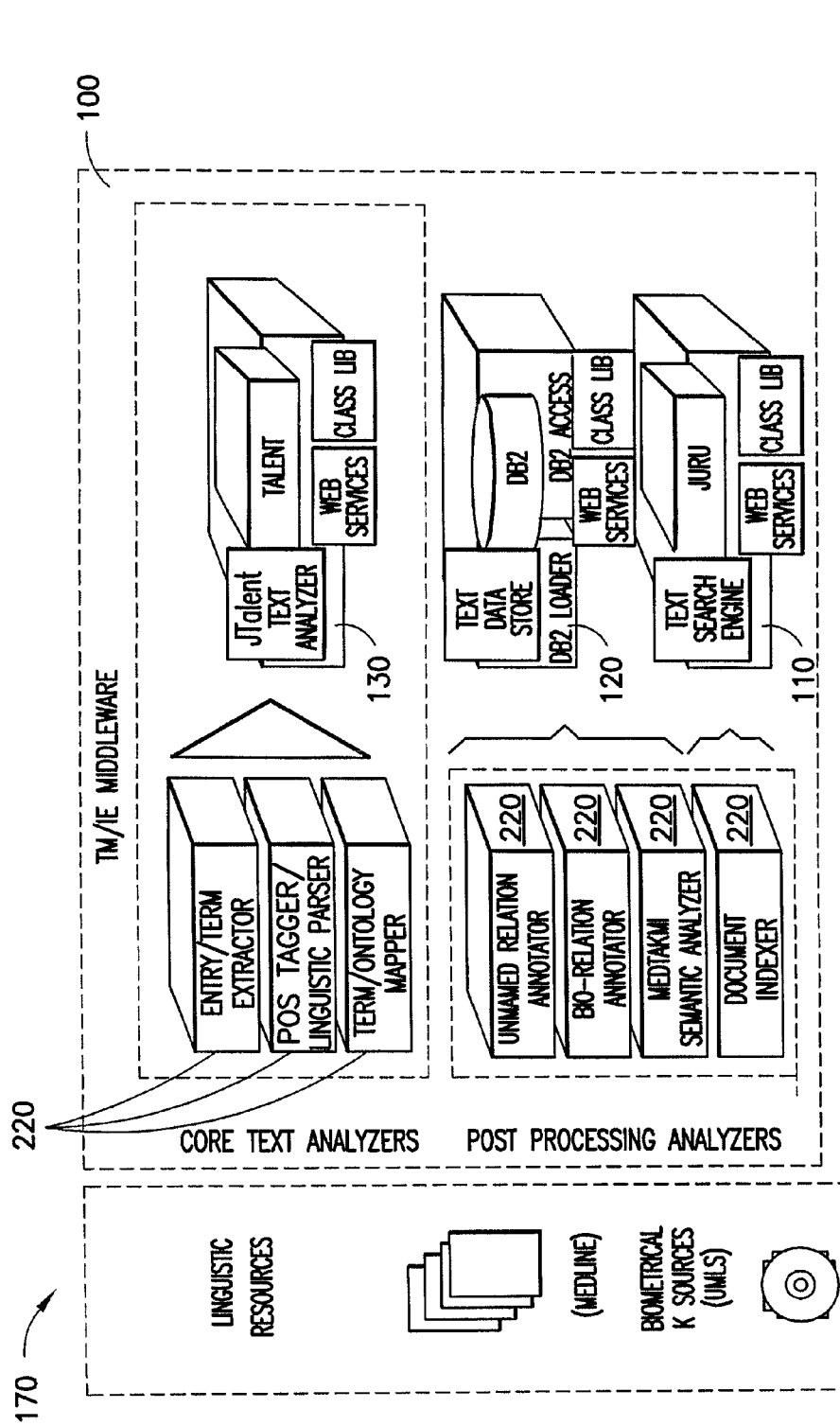
FIG. 32 is a block diagram depicting an unstructured information management system in conjunction with a life sciences application.
Figure 32B:
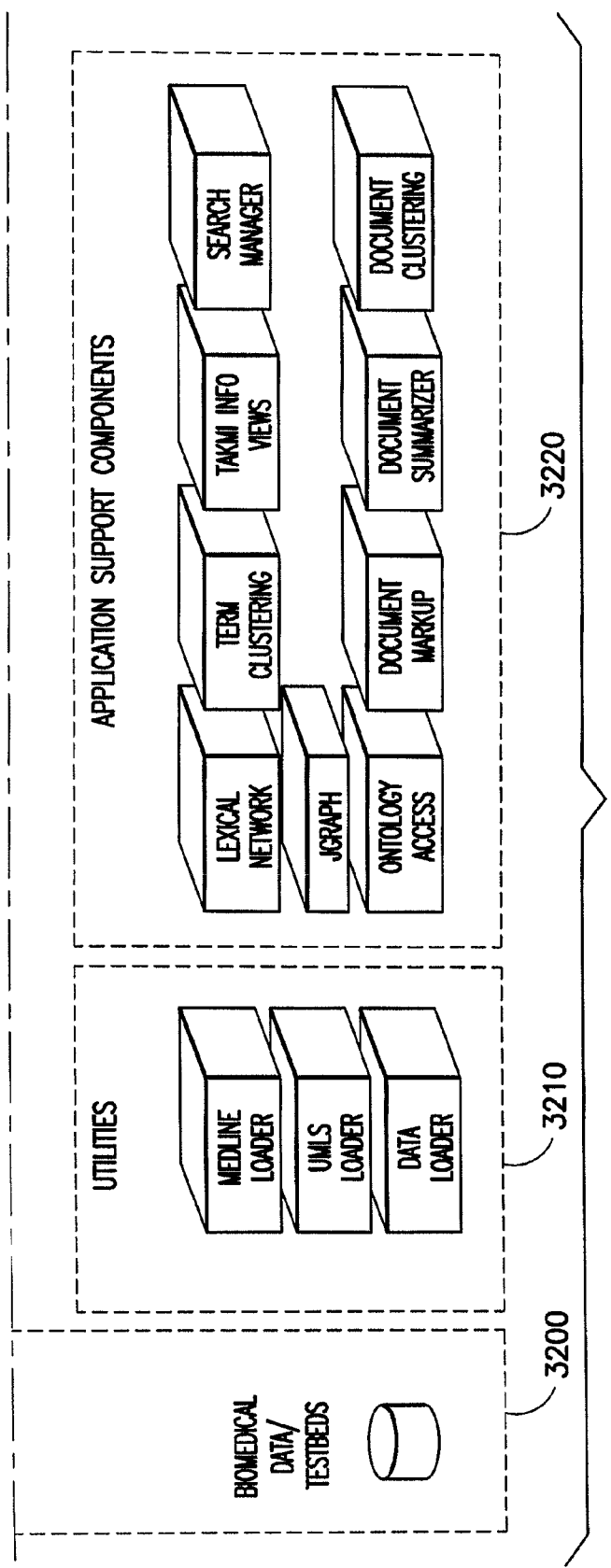

FIG. 32 provides an illustration of an exemplary embodiment of the UIMA 100, where it is shown in the context of a life sciences application 170 for drug discovery. This non-limiting example depicts some of the many components and interfaces with which the UIMA 100 can operate.

In the illustrated embodiment there exists a linguistic resources 3200 component containing resources (e.g., MEDLINE, UMLS, biomedical data/testbeds) that are specific to the application 170. Various related loader utilities 3210 are also provided, as are a plurality of application support components 3220.

The UIMA 100 is provisioned to include core text analysis annotators and post-processing analyzer annotators 220, certain of which are specific to the exemplary life sciences application 170, such as MEDTAKMI semantic analyzer and a bio-relation analyzer. The core text analysis function works with a JTalent text analyzer TAE 130. The text data store 120 can be implemented with DB2™, and a DB2™ loader and access modules. The text search engine 110 can be based on JURU, a full-text search library written in Java.

As can be understood when considering FIG. 32, how components are orchestrated to solve problems (or build applications) is an important aspect of the UIMA 100. In addition to defining a set of components, an UIMA 100 preferably includes a set of constraints that determine the possible orchestrations of these components to build effective applications.

The document store 120 can be considered as a component with an interface that enables documents and document meta-data to be stored and managed on disk. For example, in one embodiment, a constraint dictating that the main application logic is responsible for determining whether or not the TAE 130 should write document meta-data to the store 120 for the purposes of recoverability or post-processing access to TAE results, is an architectural control constraint. Among other things, this constraint is intended to ensure that TAEs 130 do not arbitrarily decide to write data to the store without the application's knowledge, since the impact on the application's overall performance may be considerable. The UIMA 100 suggests that the application developers are best informed with regard to the overall operating requirements of the application (e.g., tradeoff between performance and recoverability) and therefore should control it. This in turn may require that the TAE's interface be expanded to allow the application 170 to communicate its requirement that the TAE 130 write its intermediate results to the store 120.

In other embodiments, one may model software components and user requirements to automatically generate annotation (annotator or TAE) sequences. This approach may insulate the user from having knowledge of interface-level details of the components, and focus only on the application's functionality requirements. Moreover, automatic sequencing can assist the user in making decisions on how to cost-effectively build new applications from existing components and, furthermore, may aid in maintaining already built applications.

Automatic sequencing has a role in the control and recovery of annotation flow during execution. Specifically, the flow executer can call upon the sequencer with details about the failure and ask for alternative sequences that can still consummate the flow in the new unforeseen situation. Re-sequencing allows the application to be transparent to runtime errors that are quirks of the distributed deployment of UIM.

Some of the concerns underlying the selection of inter-component communication methods are flexibility, performance, scalability and compliance with standards. Accordingly, the UIMA 100, as part of is technical interface descriptions, preferably identifies communication methods for component interaction. It is intended that UIMA 100 will exploit the application of existing distributing computing technologies as required in various parts of the architecture.

Generally, the UIMA 100 supports a loosely coupled (i.e., distributed) architecture where components may exist in distinct address spaces on separate machines and in different operating environments, and communicate via service-oriented methods. This approach is preferred for flexibility and scalability. However, tightly coupled architectures are also well within the scope of this invention, and the UIMA 100 supports tightly coupled system architectural models as well.

For example, various components may require tightly coupled communications to ensure high levels of performance. One example is the TAE 130, wherein the annotators 220 typically work in a series as they process a document stream.

The analysis structure is frequently accessed and updated throughout the operation of the TAE 130. Fast access, update and transmission to the next annotator could be critical especially for embedded text analysis applications that require fast response time or when analysis is done at query-time as a user waits for results. Under these conditions, tightly coupled communications between annotators 220 over an in-memory analysis structure may be used to achieve high, predictable performance levels.

Another consideration for loosely coupled systems is the development paradigm. Again, consider a TAE 130, that may contain many annotators 220, each evolving in their own right, each with their own prerequisites on the analysis structure. Ideally, the UIMA 100 supports the development of annotators 220 such that the developer can work independently of the component communication method, and then place the annotator in different containers ideally suited for requisite development or deployment environment.

Whether UIMA 100 components communicate in a loosely-coupled or tightly-coupled variant, their control independence is a distinct and important issue. Ideally, UIMA interfaces should restrict component logic from predicating on external control patterns. The implication of this tenet is that a component be written to operate without failure in an asynchronous control environment. It should operate regardless of the particular flow of the application 170 in which it may be embedded.

Expressed another way, the UIMA 100 is preferably data-driven. Components may fail to process an input because the input data does not satisfy certain pre-conditions, but the component should not dependent on a particular process flow. The data-driven focus also generally enables a highly distributed agent-based approach to UIMA 100 implementation.

Based on the foregoing it can be appreciated that the UIMA 100 provides a modular text intelligence system that includes application interfaces including the at least one document store interface 125 coupled to the at least one document store 120. The document store interface 125 receives at least one database specification and at least one data source and provides at least one database query command. The UIMA 100 further provides the at least one analysis engine interface 135 coupled to the at least one text analysis engine 130. The analysis engine interface 135 receives at least one document set specification of at least one document set and provides text analysis engine analysis results. Through the application interface the application 170 specifies how to populate the at least one document store 120, and specifies an application logic for selecting at least one document set and for specifying processing of the selected document set by the at least one text analysis engine 130. Also specified is the processing of the analysis results, as well as at least one user interface. The application specification occurs by setting at least one parameter that includes a specification of the common abstract data format for use by the at least one text analysis engine. Also included is at least one search engine interface 115 for receiving at least one search engine identifier of at last one search engine 110 and at least one search engine specification. The search engine interface 115 further receives at least one search engine query result.

One skilled in the art will recognize that the teachings herein are only illustrative, and should therefore not be considered limiting of the invention. That is, and as mentioned above, the UIMA 100 may be used with a variety of information sources, many of which are not discussed. For example, a document can include both text and images, either static or dynamic, and annotators can be provided for both text and image data.

Thus, it should be appreciated that the foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. However, all such modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A data processing system for processing stored data, comprising:
   data storage for storing a collection of data units; and
   coupled to the data storage, a search engine responsive to a query for retrieving at least one data unit from said data storage; where
   the query comprises a search operator comprised of a plurality of search sub-expressions each having an associated weight value, and where said search engine returns a data unit having a weight value sum that exceeds a threshold weight value sum, where at least one of the weight values and threshold weight value sum are variable during a search.

2. A data processing system as in claim 1, where said data units comprise documents.

3. A data processing system as in claim 1, wherein the search engine is configured to assimilate views of two levels.

4. A data processing system as in claim 3, wherein the two levels treats multiple views of a document as completely separate documents unrelated to each other unless they focus on a same document text.

5. A data processing system as in claim 3, wherein in the two levels treats the search engine is configured to enable queries to span multiple views of a document.

6. A data processing system as in claim 1, wherein the data processing system is configured to perform at least one analysis function and at least one access function.

7. A data processing system as in claim 6, wherein the at least one analysis function is configured to perform document-level analysis and collection-level analysis.

8. A data processing system as in claim 6, wherein the at least one access function is configured to perform semantic search access and structured knowledge access.

9. A computer program product embodied on a computer-readable medium and comprising program code for directing operation of a text intelligence system in cooperation with at least one application, comprising:
   a computer program segment for storing a collection of data units; and
   a computer program segment implementing a search engine that is responsive to a query for retrieving at least stored one data unit; where
   the query comprises a search operator comprised of a plurality of search sub-expressions each having an associated weight value, and where said search engine returns a data unit having a weight value sum that exceeds a threshold weight value sum, where at least one of the weight values and threshold weight value sum are variable during a search.

10. A computer program product as in claim 9, where said data units comprise documents.

11. A computer program product embodied on a computer-readable medium and comprising program code for directing operation of a text intelligence system in cooperation with at least one application, comprising :
   a computer program segment for storing a collection of data units; and
   a computer program segment implementing a search engine that is responsive to a query for retrieving at least stored one data unit; where
   the query comprises a search operator comprised of a plurality of search sub-expression each having an associated weight value, and where said search engine returns a data having a weight value sum that exceeds a threshold weight value sum, where the data unit having a weight value sum that exceeds a threshold weight value sum undergoes a detailed evaluation and where a value associated with the detailed evaluation is compared to minimum value.

12. A computer program product as in claim 11, where if the value associated with the detailed evaluation is above the minimum value, at least one of the associated weight values and threshold are modified.

13. A computer program product as in claim 11, where if the value associated with the detailed evaluation is above the minimum value, the data unit is added to a heap.

14. A computer program product as in claim 13, wherein the heap represents top scored data units.

15. A computer program product embodied on a computer-readable medium and comprising program code for directing operation of a text intelligence system in cooperation with at least one application, comprising:
   a computer program segment for storing a collection of data units; and
   a computer program segment implementing a search engine that is responsive to a query for retrieving at least stored one data unit; where the at least one data unit is stored in a heap if the heap is not full and where the query comprises a search operator comprised of a plurality of search sub-expressions each having an associated weight value, where said search engine returns a data unit having a weight value sum that exceeds a threshold weight value sum, where, if the heap is full, the data unit having a weight value sum that exceeds the threshold weight value sum replaces a data unit with the least weight value sum from the heap.

* * * * *